July 21, 1936.  W. H. ROBERTSON  2,048,200
CASH REGISTER
Filed Jan. 27, 1930   16 Sheets-Sheet 1

Inventor
William H. Robertson
By
Pearl Benst
His Attorney

July 21, 1936.   W. H. ROBERTSON   2,048,200
CASH REGISTER
Filed Jan. 27, 1930   16 Sheets-Sheet 2

Inventor
William H. Robertson
By
Earl Beust
His Attorney

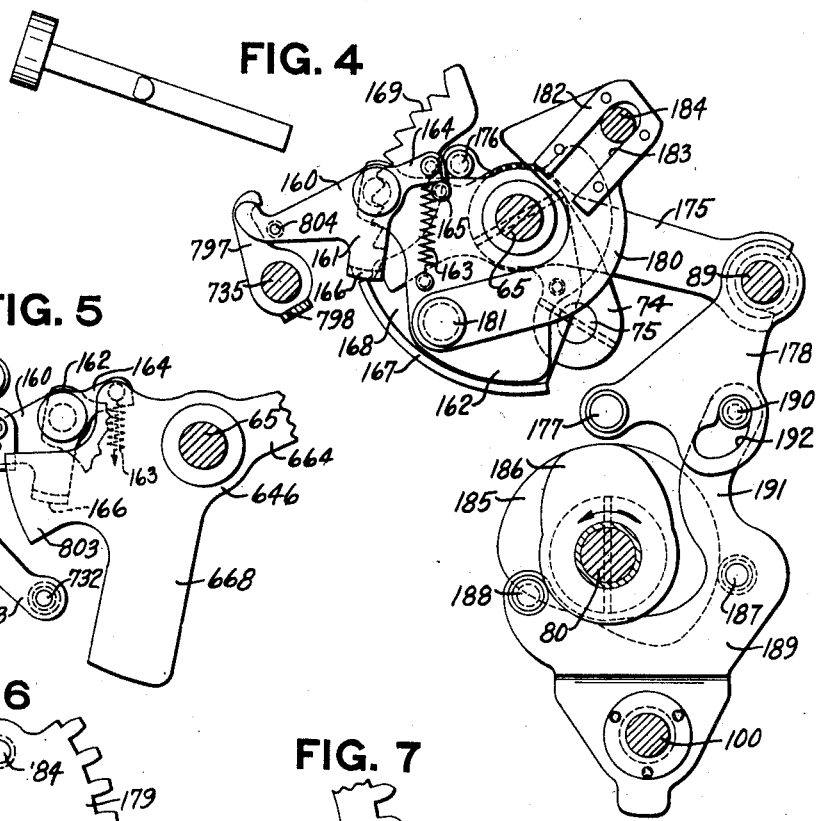

July 21, 1936.  W. H. ROBERTSON  2,048,200
CASH REGISTER
Filed Jan. 27, 1930   16 Sheets-Sheet 5
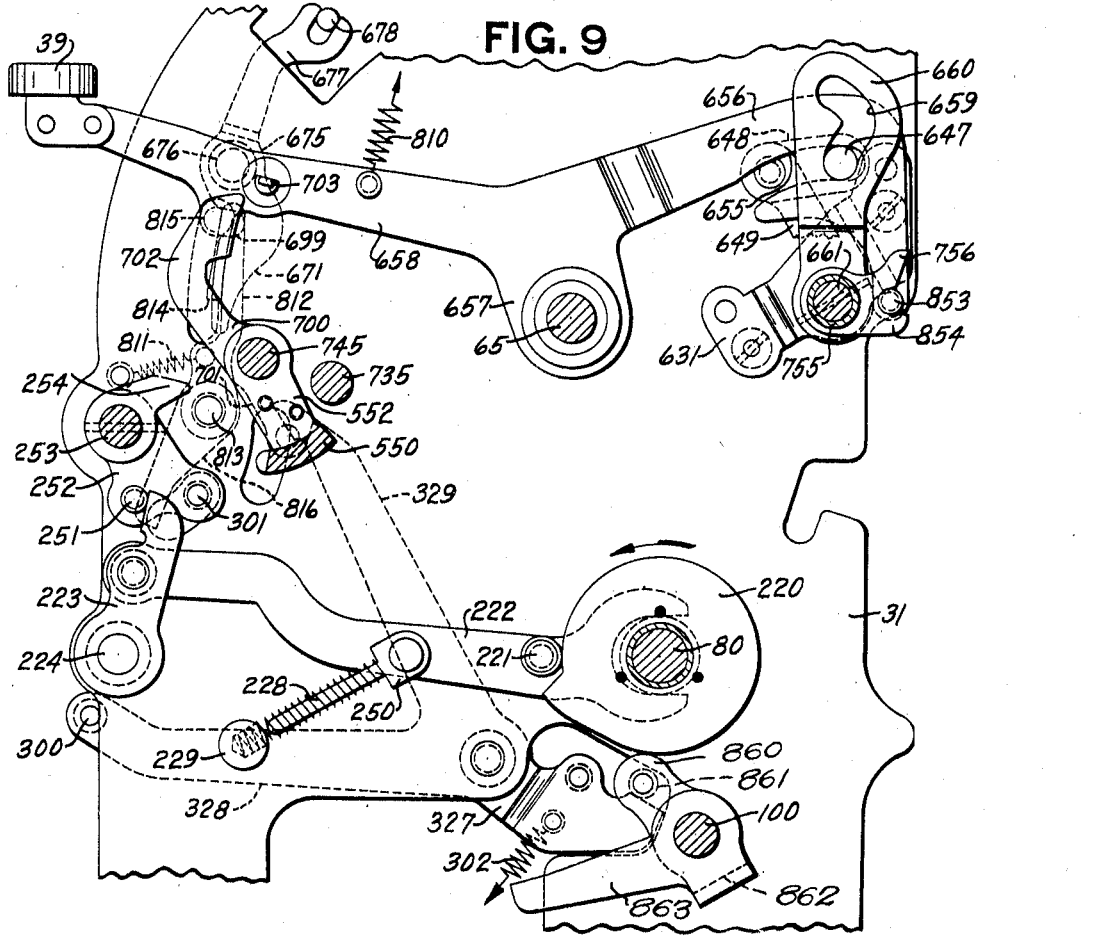
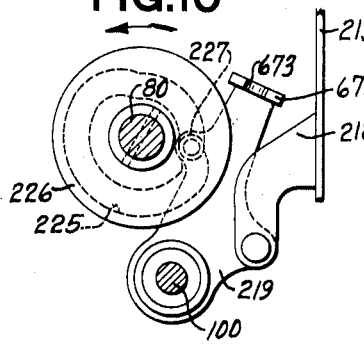
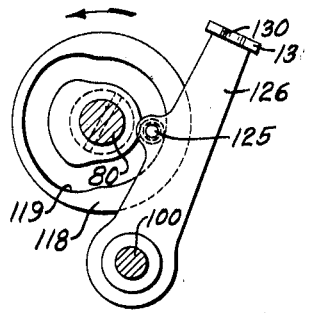
Inventor
William H. Robertson
By
Carl Beust
His Attorney

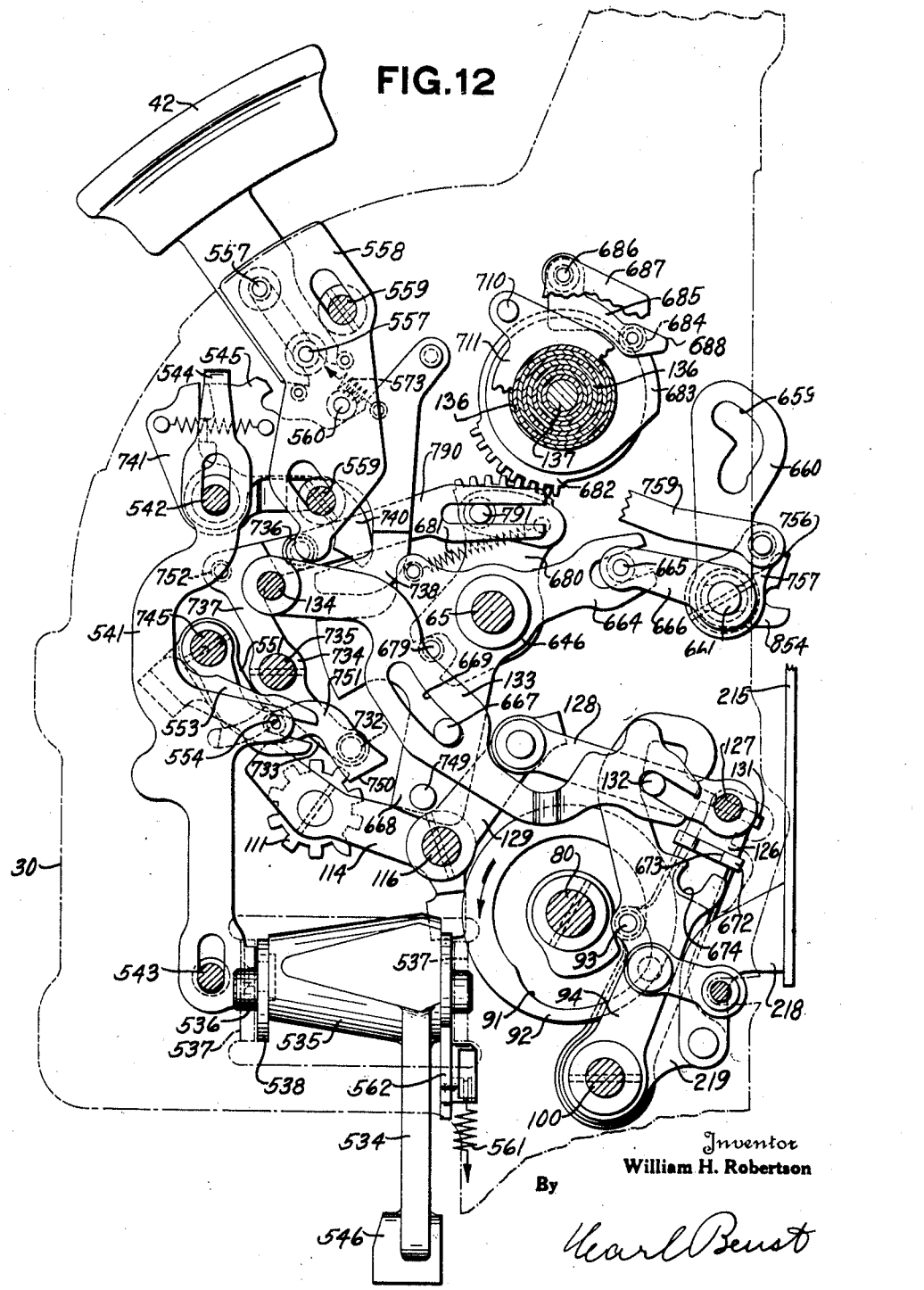

July 21, 1936. W. H. ROBERTSON 2,048,200
CASH REGISTER
Filed Jan. 27, 1930 16 Sheets-Sheet 7

Inventor
William H. Robertson
By
Earl Benst
His Attorney

Inventor
William H. Robertson
By Carl Beust
His Attorney

Inventor
William H. Robertson
By
His Attorney

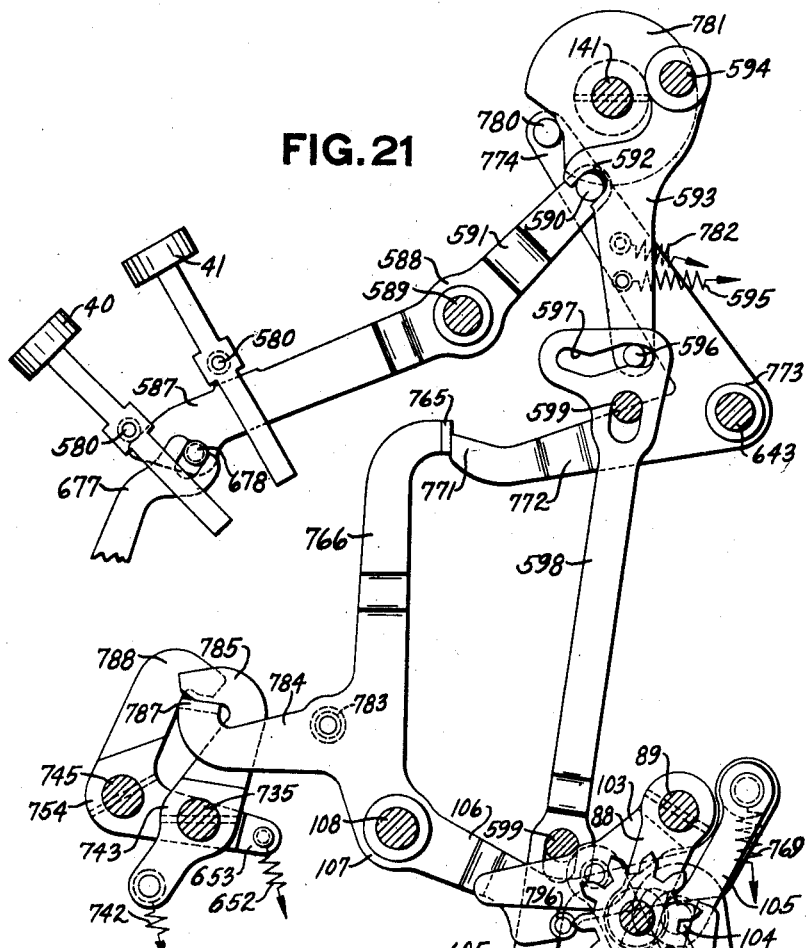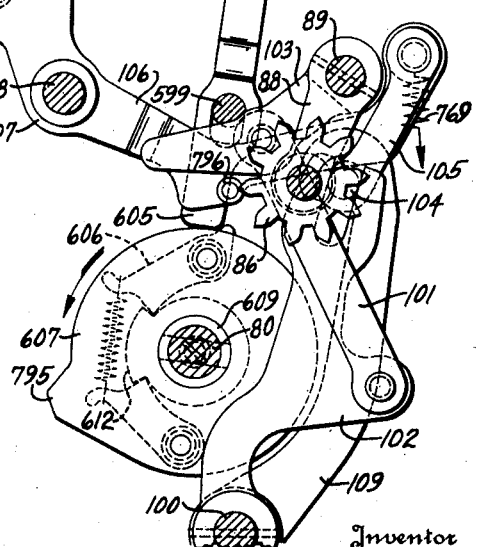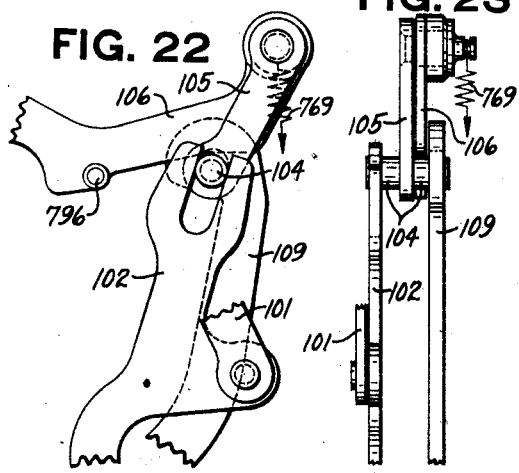

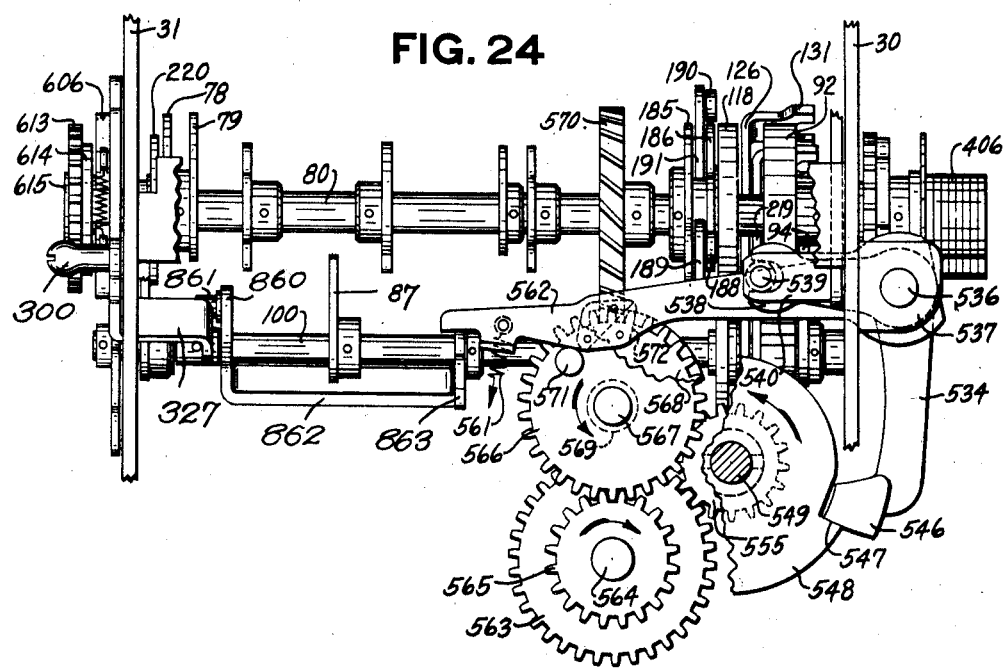

July 21, 1936.  W. H. ROBERTSON  2,048,200
CASH REGISTER
Filed Jan. 27, 1930   16 Sheets-Sheet 12
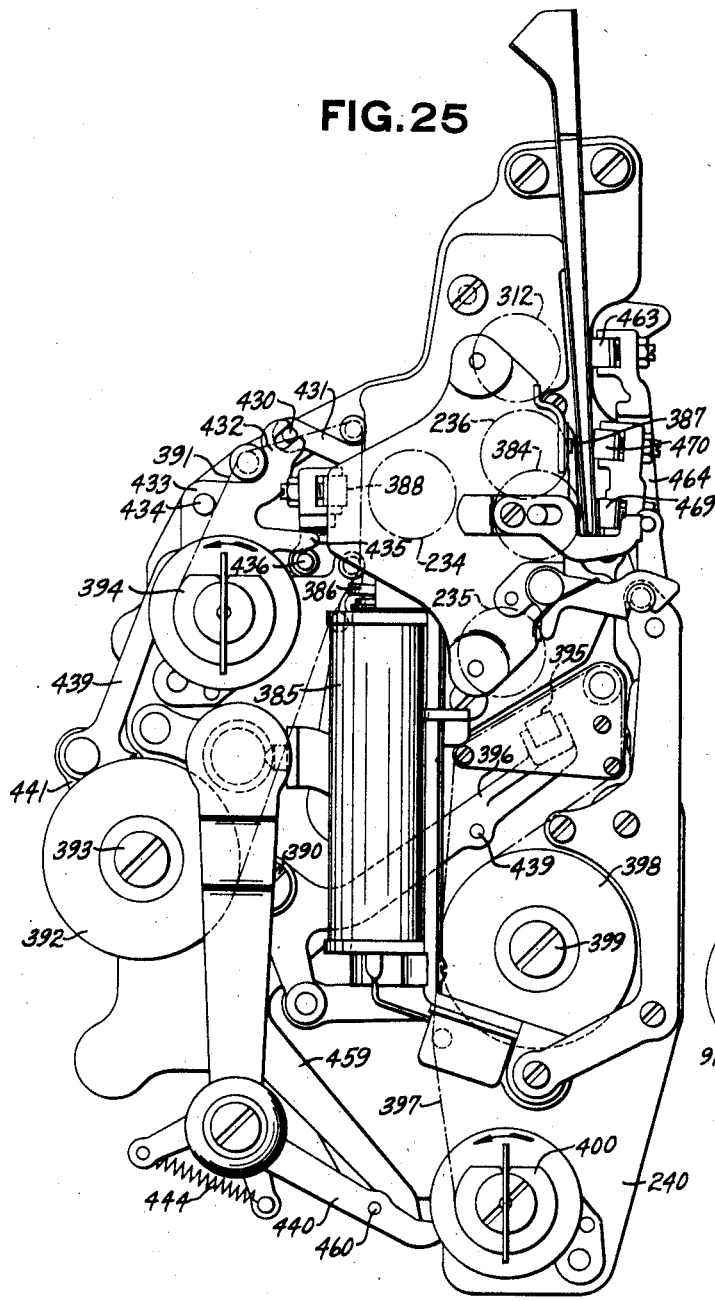
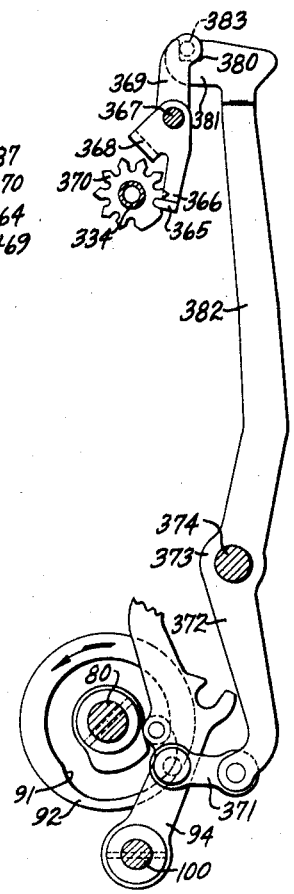
Inventor
William H. Robertson
By Karl Beust
His Attorney

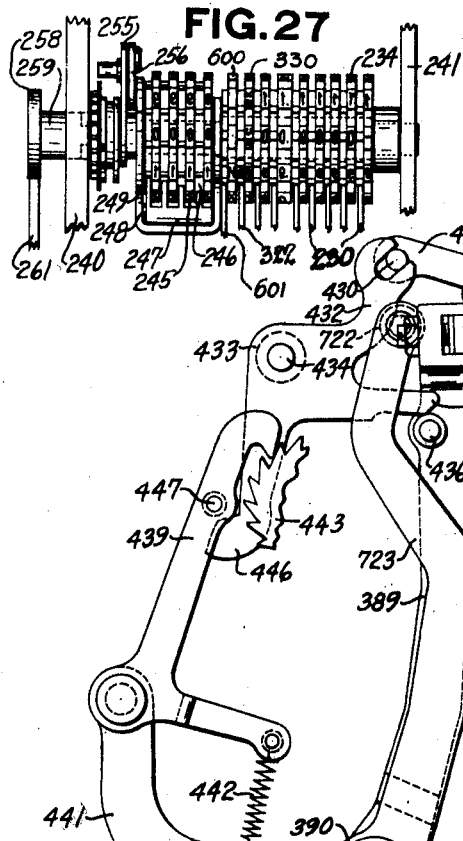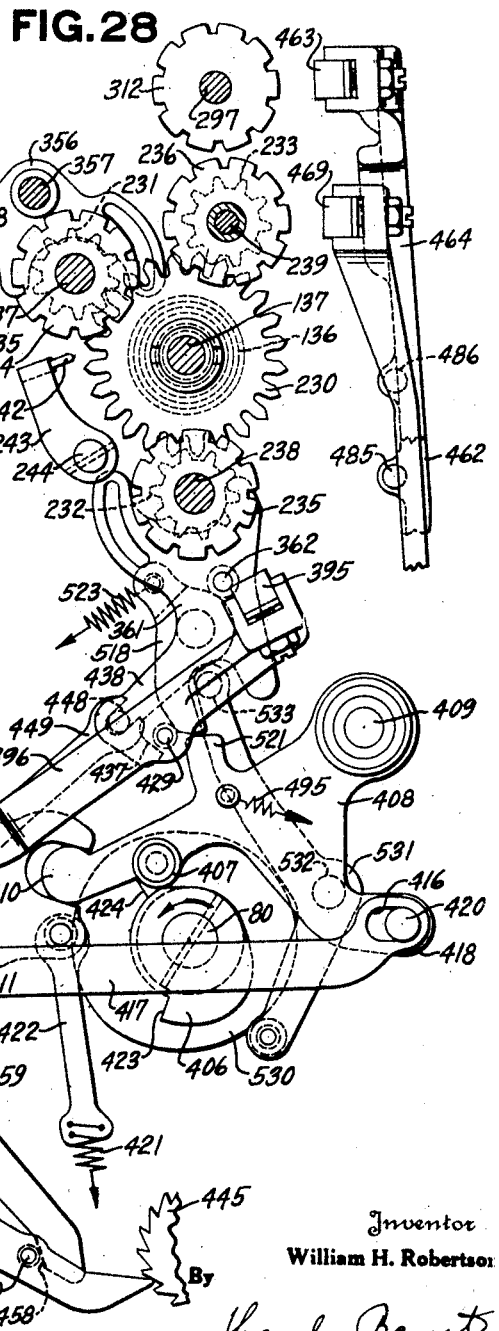

July 21, 1936.  W. H. ROBERTSON  2,048,200
CASH REGISTER
Filed Jan. 27, 1930   16 Sheets-Sheet 14
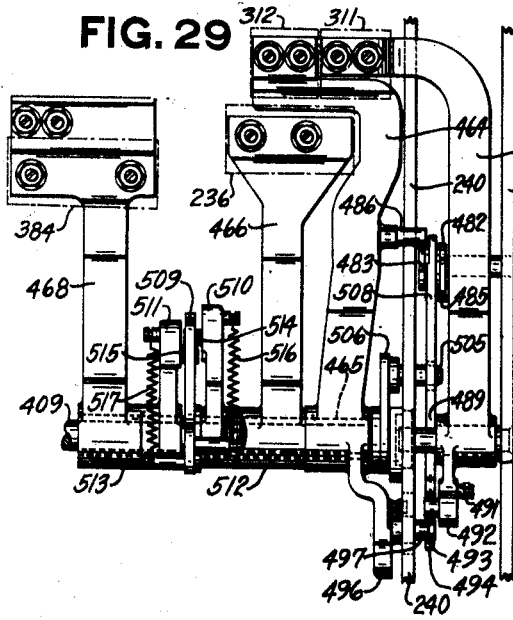
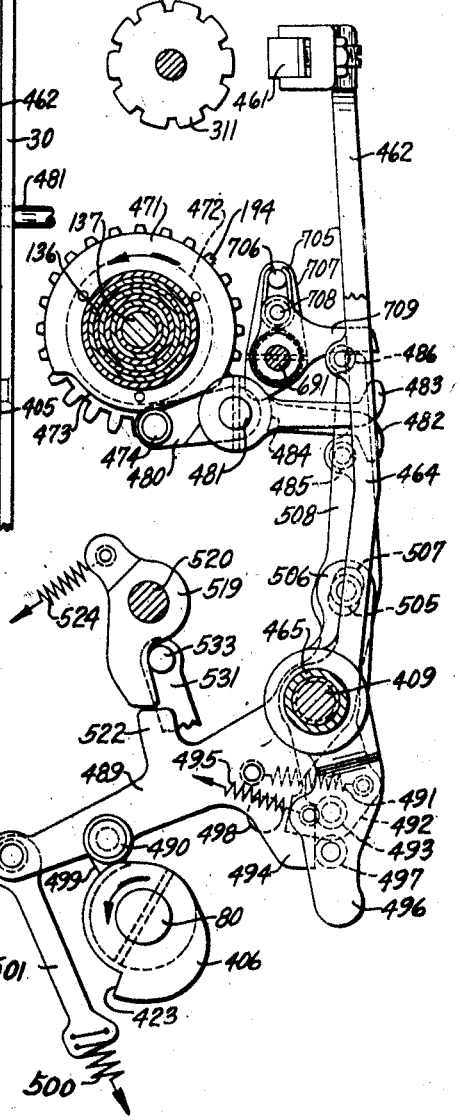
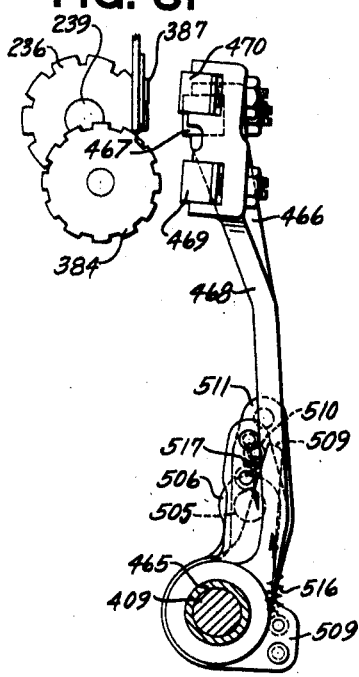
Inventor
William H. Robertson
By Carl Beust
His Attorney July 21, 1936.  W. H. ROBERTSON  2,048,200
CASH REGISTER
Filed Jan. 27, 1930   16 Sheets-Sheet 15

Inventor
William H. Robertson
By
Carl Benst
His Attorney

July 21, 1936.  W. H. ROBERTSON  2,048,200
CASH REGISTER
Filed Jan. 27, 1930  16 Sheets-Sheet 16

FIG. 36
FIG. 37
FIG. 38
FIG. 39
FIG. 40

Inventor
William H. Robertson
By Carl Beust
His Attorney

Patented July 21, 1936

2,048,200

UNITED STATES PATENT OFFICE 2,048,200

CASH REGISTER

William H. Robertson, Dayton, Ohio, assignor to The National Cash Register Company, Dayton, Ohio, a corporation of Maryland Application January 27, 1930, Serial No. 423,722

42 Claims. (Cl. 235—7)

This invention relates to registering or accounting machines, and has more particular relation to machines of the type disclosed in the application for Letters Patent of the United States, Serial No. 419,938, filed January 10, 1930, by William H. Robertson, and in Letters Patent of the United States Nos. 1,816,263, 1,924,290, and 1,929,652 issued respectively July 28, 1931, August 29, 1933, and October 10, 1933, to William H. Robertson.

The machines disclosed in the above mentioned patents and applications are provided with the usual elements, such as totalizers, indicators, keyboard, differential mechanism, printing mechanism, etc. The chief characteristic of this type of machine is the compact arrangement of the several elements and the general adaptability of the machine to a wide range of uses, thus being admirably suited for use in retail stores, restaurants, department stores, motor buses, electric railways and other media of transportation, ticket offices, public utility offices, including telegraph offices, etc., and other commercial houses.

This invention is more specifically an improvement on the machine disclosed in the Robertson Patent No. 1,924,290, inasmuch as both it and the machine of the present application are adapted particularly for use in telegraph offices. However, the instant invention also embodies improvements in certain of the structures disclosed in the application of Robertson, Serial No. 419,938.

One of the objects of this invention is to provide novel mechanism to select automatically any one of a plurality of totalizers, whereas in the prior machines of this type, it was necessary to resort to manually operated mechanism to select the desired totalizer, either by means of a lever, or by the act of depressing selection keys.

Another object is the elimination of a manually-operated conditioning means, and the substitution of a key-set conditioning means to condition the machine to make reading or resetting operations.

Still another object is to provide mechanism in a machine of the type disclosed in the above mentioned applications to compel the transfer of the total or totals from certain of the totalizers into a grand totalizer when such certain totalizers are cleared.

A further object is to provide a novel non-add means to disable the totalizer engaging mechanism and parts of the printing mechanism.

A still further object is the provision of novel key-set means to control the machine to perform adding, sub-total, and total operations.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 4 is a detail view of the transaction bank differential mechanism.

Fig. 5 is a detail view of the mechanism for stopping the transaction differential in the grand total position on transfer total operations.

Fig. 6 is a detail view of the mechanism for operating the transaction differential aligner and for engaging and disengaging the totalizer on reset operations.

Fig. 7 is a detail view of the coupling pinion auxiliary engaging means.

Fig. 8 is a view in front elevation of the mechanism shown in Fig. 5.

Fig. 9 is a view in right elevation of the non-add key and of the amount key releasing mechanism.

Fig. 10 is a detail view of the cam and cam arm for engaging the totalizer on sub-totalizing operations.

Fig. 11 is a detail view of the cam and cam arm for engaging the totalizer on adding operations.

Fig. 12 is a transverse sectional view taken through the machine just inside the right side frame.

Fig. 21 is a detail view of the mechanism for compelling a transfer-total operation following certain totalizing operations.

Figs. 22 and 23 are detail views of a part of the mechanism illustrated in Fig. 21.

Fig. 24 is a view in front elevation of the main drive shaft and a part of the driving mechanism.

Fig. 25 is a view in right elevation of the printing mechanism used in connection with the machine.

Fig. 26 is a detail view of the transaction type wheel aligner and its operating mechanism.

Fig. 27 is a view in front elevation of the "B" group of detail record type wheels.

Fig. 28 is an enlarged detail view of the printing hammers and the operating mechanism therefor.

Fig. 29 is an enlarged fragmentary view in rear elevation of the slip printing hammers.

Fig. 30 is a detail view in right elevation of the slip printing hammers and their operating mechanism.

Fig. 31 is a view in side elevation of certain of the hammers appearing in Fig. 29.

Fig. 36 is a detail view of the consecutive number operating and disabling means.

Fig. 37 is a detail view of the consecutive number drive disabling means.

Fig. 38 is a fragmentary view of one of the consecutive number type wheel advancing means.

Fig. 39 illustrates a facsimile fragment of the "B" detail record strip.

Fig. 40 illustrates a facsimile fragment of the "A" detail record strip.

General description

Figure 1:
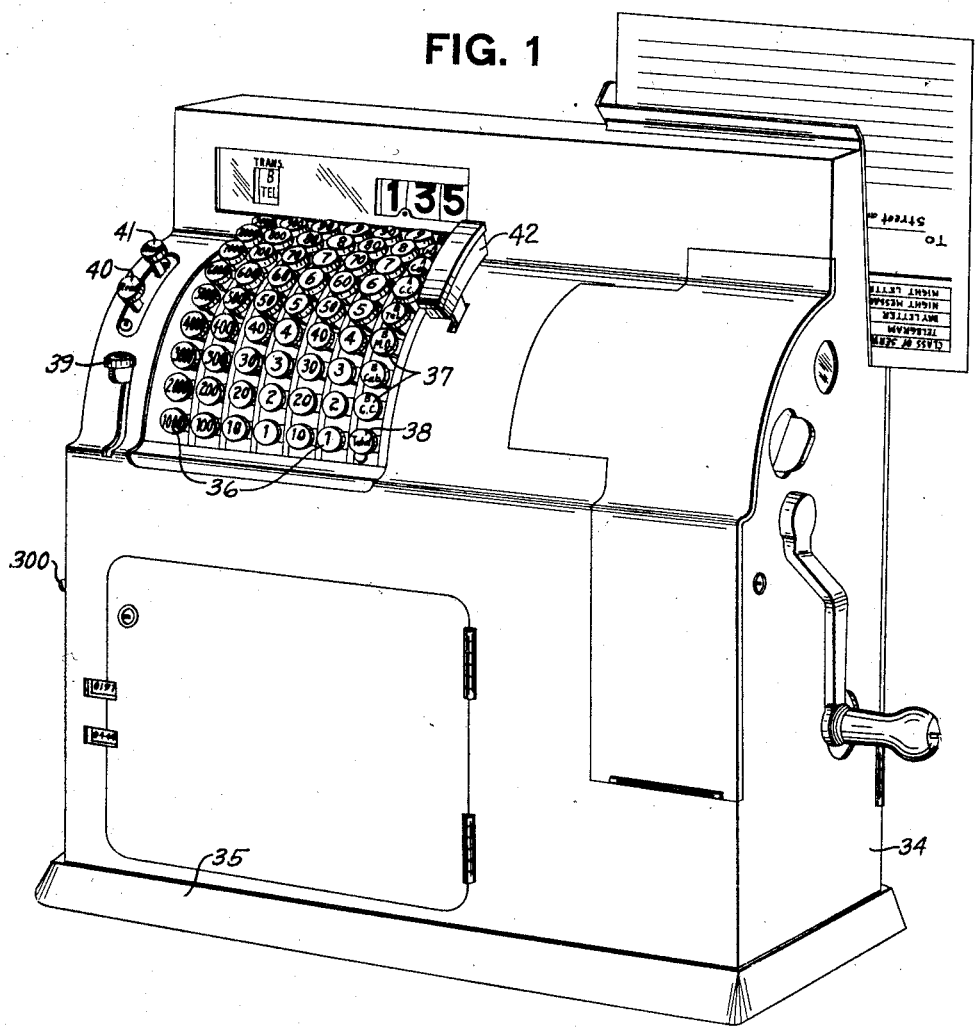
Fig. 1 is a perspective of the machine encased in its cabinet and having a blank form inserted in the slip chute.

The appearance of the machine disclosed in the present application is generally characterized by its compactness and the accessibility of the controls. It is encased in a suitable cabinet, through the upper right-hand corner of which extends a slip chute adapted to receive a blank telegram form, or other suitable record material, upon which printed impressions are to be made. Reference is made above and throughout the specification to "telegram blanks", because the machine disclosed herein is arranged for use in telegraph offices. It is to be understood, however, that the machine is readily susceptible to many other uses, certain of which are indicated from time to time in the specification below.

The keyboard of the machine includes a plurality of banks or rows of amount keys on which may be set up the amount of charge for a telegram, cable, etc., and to the right, a bank of transaction keys to select any one of the plurality of totalizers with which the machine is provided. To the left, and slightly removed from the main keyboard, is a group of two control keys, namely, a "Read" key to control the printing of sub-totals on the totalizers, and a "Total" key to control the printing of totals on the totalizers and resetting of the selected totalizers to zero. A "Non-Add" key projects through the cabinet just below the group of control keys. By use of this key amounts may be printed and indicated, but not accumulated in the totalizer.

All of the keys excepting the transaction key may be released manually by operation of a key release lever located at the left side of the machine and having its knob projecting through an opening in the cabinet. Also, all of the keys excepting the "Non-Add" key are flexible, that is, depression of a key in any bank releases the key already depressed in that bank.

After the proper amount and transaction keys are depressed, or, in case the operation is to be a totalizing operation, the proper control key is depressed and the machine is released for operation by depressing a starting bar projecting through the cabinet to the right of and spaced apart from the main keyboard.

Such machines are usualy operated by suitable electric motors, or in event of failure of the electric current, the machine may be operated manually by a crank provided for that purpose and located at the right side of the machine.

Indicators are provided and are set under control of the amount and transaction keys to display the amount and character of a transaction being recorded toward the front and rear of the machine through suitable sight openings in the cabinet.

Various doors and closable openings are arranged in the cabinet to provide access to the printing mechanism, to replenish the supply of record material and to the motor to replace blown fuses, or to make other necessary adjustments thereon.

The usual differential mechanism is provided in the machine, and is operated under control of the several manipulative devices to add the amounts on the keyboard onto the selected totalizers, set up the indicators, and to adjust the type carriers in the printing mechanism. The differential unit operated under control of the transaction keys selects the totalizer to receive the entry.

The machine is organized to perform operations of varying numbers of cycles, each of the operations being for a different purpose.

An accumulating operation comprises a single cycle to add amounts onto a selected totalizer, and print said amount and other data on the insertable slips and on record strips.

Totalizing operations comprise two cycles, the first cycle being merely a preparing cycle; the total or sub-total, depending upon which of the conditioning keys is depressed, being taken from the selected totalizer during the second cycle of a totalizing operation.

"Transfer total operations" comprise three cycles. The first two cycles of a transfer total operation are the same as those for totalizing operations. In addition, mechanism is set by depression of the total key to control the machine to make a third cycle of operation during which the total taken from a totalizer on the second cycle is reaccumulated on the grand totalizer automatically selected at the beginning of the third cycle.

It is to be understood that the two and three-cycle operations are continuous, that is, the machine does not stop at the end of each cycle, but continues operating through two or three cycles, depending upon which control or conditioning key is depressed. Means is provided to restrain the mechanism, which normally operates to stop the machine at the end of a cycle, from functioning on multiple-cycle operations until the end of the last cycle.

The printing mechanism is located at the right end of the machine and is enclosed in the machine cabinet. It prints the amount, a symbol indicating the classification of transaction, a symbol identifying the operator, a symbol identifying the kind of operation, and the consecutive number, on one of a pair of detail record strips selected under control of the particular transaction key depressed. These data are also printed on the inserted telegram blank, and in addition, the date, time, and a machine index number (there being several machines used in the larger offices) are printed near the top of the blank. The printing mechanism does not issue a receipt or check, the only printing, aside from the detail record strips, being on the blank telegram form or other suitable record material inserted in the chute provided for that purpose in the upper right-hand corner of the cabinet.

Main frame work

The main body of the machine is supported in a frame work comprising a right side frame 30 (Figs. 12, 16, 19 and 24), and a left side frame 31 (Figs. 2, 3, 9, 13, 16 and 19) mounted on a base (not shown), and joined by a back frame 32 (Figs. 2 and 3), and a cross bar 33 (Figs. 2 and 3) located at the front and lower part of the machine. A cabinet or casing 34 (Fig. 1) having suitable openings for the keys, operating crank, key release lever, and other control members, and sight openings for the indicators, etc., encloses the machine and is secured to the base (not shown). The entire machine is mounted on another base 35 (Fig. 1).

Keyboard

The keyboard of the machine selected to illustrate the present invention is similar in the arrangement of the keys to the keyboards disclosed in the above referred to Robertson applications.

In addition to a plurality of banks of amount keys 36 (Figs. 1 and 2), the keyboard includes a bank of transaction keys 37 (Figs. 1 and 3) to select a totalizer and to control the setting of indicators and type elements to indicate and print symbols designating the kind of transaction and operator identifying characters.

A total key 38 is located in the lowermost position in the bank of transaction keys to control the selection of the grand totalizer.

A non-add key 39 (Figs. 1 and 9) is also located to the left of and opposite the lower portion of the amount keyboard. This non-add key 39 differs in form and operation from the remainder of the keys in the present invention, in that the amount keys 36, the transaction keys 37, and the total key 38 are known as "press-in" keys, while the "non-add" key 39 is known as a "press-down" key. This difference will be brought out more fully later in the specification.

A group of keys comprising a "sub-total" key 40 (Figs. 1, 13, 14 and 21) and a "Total" key 41, is provided to condition the machine to perform totalizing and sub-totalizing operations. The conditioning keys 40 and 41 are located at the left of and slightly spaced apart from the main keyboard.

The stem of a starting bar 42 projects through a suitable opening in the cabinet 34 to the right of and slightly spaced apart from the bank of transaction keys 37. Depression of the starting bar 42 releases the usual clutch mechanism and closes the electric circuit through the drive motor and frees the mechanism for operation, it being necessary first to depress one of the transaction keys 37 or the total key 38.

Amount bank

The amount keys are the same in structure and in operation as the amount keys disclosed in the above-mentioned Robertson applications.

The keys 36 (Fig. 2) of each of the several banks of amount keys are slidably mounted in a key frame 43 shown partly broken away for clearness, having its upper end supported on a cross rod 44, and its lower end supported on a cross rod 50. Both cross rods extend between the main side frames 30 and 31 of the machine. Each of the keys 36 is provided with a spring 51 (only one being shown) coiled about its shank to normally hold the keys in their undepressed position, and to return the depressed keys to their undepressed position when they are released.

Each of the amount keys 36 carries a laterally projecting key pin 52, which, upon depression of its key, wipes along the beveled edge of a shouldered projection 53 on a flexible detent bar 54, slidable on studs 55 and 56 in the frame 43. There are as many projections 53 as there are keys 36, and the pin 52, as it wipes by its associated projection 53, slides the detent bar 54 toward the left against the tension of a restoring spring 57. When the key pin 52 has passed the shoulder on the projection 53, the spring 57 returns the detent bar 54 toward the right to hook the shoulder of its projection over the key pin 52 of the depressed key, thus retaining the key in depressed position until another key 36 in the same bank is depressed, or until the detent bar 54 is shifted toward the left to release the depressed key, as will be described later. When the key pin is released from the detent bar 54, the spring 51 returns the key to its normal undepressed position.

Each of the banks of amount keys is provided with a locking bar 58 (Fig. 2) slidable on the studs 55 and 56 to lock the depressed amount key in its depressed position and the undepressed amount keys against depression during operation of the machine. Mechanism, to be described later, is operated as soon as the machine is released for operation, to shift the locking bar 58 upwardly and toward the right to engage hooked projections 59 thereon with the key pins 52, the projection associated with the depressed key passing above the key pin 52 on this key to hold it in depressed position, and the projections associated with the remainder of the keys passing beneath the pins 52 to prevent depression of the undepressed keys during the operation of the machine. A restoring spring 60 normally holds the locking bar 58 in its normal position with the upper walls of the slots therein bearing against their respective studs 55 and 56.

Mechanism to be later described, operates near the end of the operation to shift both the detent bar 54 and the locking bar 58 toward the left to free the depressed key, which is immediately restored to its normal undepressed position by its spring 51.

Each bank of amount keys is provided with a zero stop arm 61 (Fig. 2) pivoted on a stud 62 in the key frame 43, to stop the differential mechanism at zero position when the machine is operated with no key depressed in the particular bank or banks. A spring 63 normally holds the stop arm 61 against a stop stud 64 projecting laterally from the detent bar 54. When the detent bar is shifted by depression of one of the keys 36, the stud 64 cams the stop arm 61 clockwise against the tension of a restoring spring 63 to ineffective position.

When the depressed key 36 is released near the end of the operation, and the detent bar 54 is restored to its normal position, the spring 63 rocks the zero stop arm 61 counter-clockwise to its normal position.

Amount differential

The amount keys 36 control differential mechanisms to set indicators and type carriers and to add amounts on the totalizer selected under control of the transaction keys. The amount differentials are mounted on a rock shaft 65 (Fig. 2) journaled in the side frames 30 and 31 of the machine. Since all of the amount differentials are alike, it is thought that the description of one will be sufficient.

Depression of one of the keys 36 thrusts its inner end into the path of a stop bar 66, slidably supported on studs 67 carried by a differentially movable adding segment 68 pivoted on the rock shaft 65. There is one segment 68 for each bank of amount keys, and one overflow segment. The key 36, when depressed, also displaces the zero stop arm 61, which normally prevents advance of the adding segment 68 beyond its zero position. A spring-pressed retaining pawl 69, pivoted on the inner one of the studs 67, holds the stop bar 66 in one of its positions.

Figure 17:
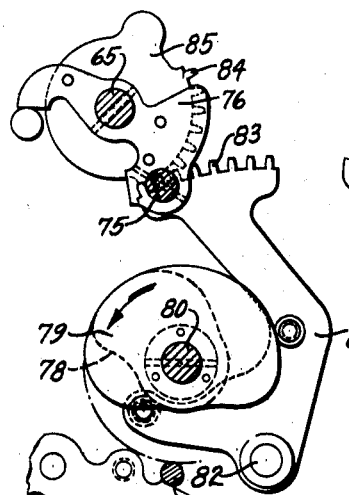
Fig. 17 is a detail view of the restraining and restoring rod operating mechanism.

A universal rod 75, carried by arms 76 and 74 (Figs. 2 and 4) fast on the rock shaft 65, normally restrains the adding segment 68 against the influence of a spring 77, which tends to advance the segment. The universal rod 75 is operated at the proper time during the operation of the machine by a pair of cams 78 and 79 (Fig. 17) fast on a drive shaft 80, journaled in the machine side frames 30 and 31.

The cams 78 and 79 rock a bell crank lever 81, pivoted on a stud 82, projecting laterally from the side frame 31, first counter-clockwise, and then clock-wise to normal through a constant extent of travel. Teeth 83 on one arm of the bell crank lever 81, mesh with teeth 84 on a disk 85 secured to the arm 76, to rock said arm, its companion arm 74, the rock shaft 65, and the universal rod 75, first clockwise and then counter-clockwise to home position.

As the cams 78 and 79 rock the universal rod 75 clockwise, the toothed adding segment 68 advances with the rod 75 under the influence of the spring 77 until it is arrested by the inner end of the depressed key or by the zero stop arm 61. The universal rod 75, however, completes its clockwise stroke.

Indicator segments 90 are provided to set the indicators differentially to their new positions, as determined by the particular set up on the keyboard. The indicator segments 90 are normally coupled to the adding segments 68 by broad coupling pinions 86.

Before the adding segment 68 can be set under the control of the depressed key 36 or the zero stop arm, and before the indicator segment 90 can be restored to zero position, it is necessary to disengage the coupling pinions 86 from those segments.

The pinions 86 are pivoted on a rod 87 carried by arms 88 (only one of which is shown) fast on a shaft 89, journaled in the machine side frames 30 and 31. The pinions 86 mesh with the adding segments 68 and with the indicator segments 90, also pivoted on the rock shaft 65.

Figure 13:
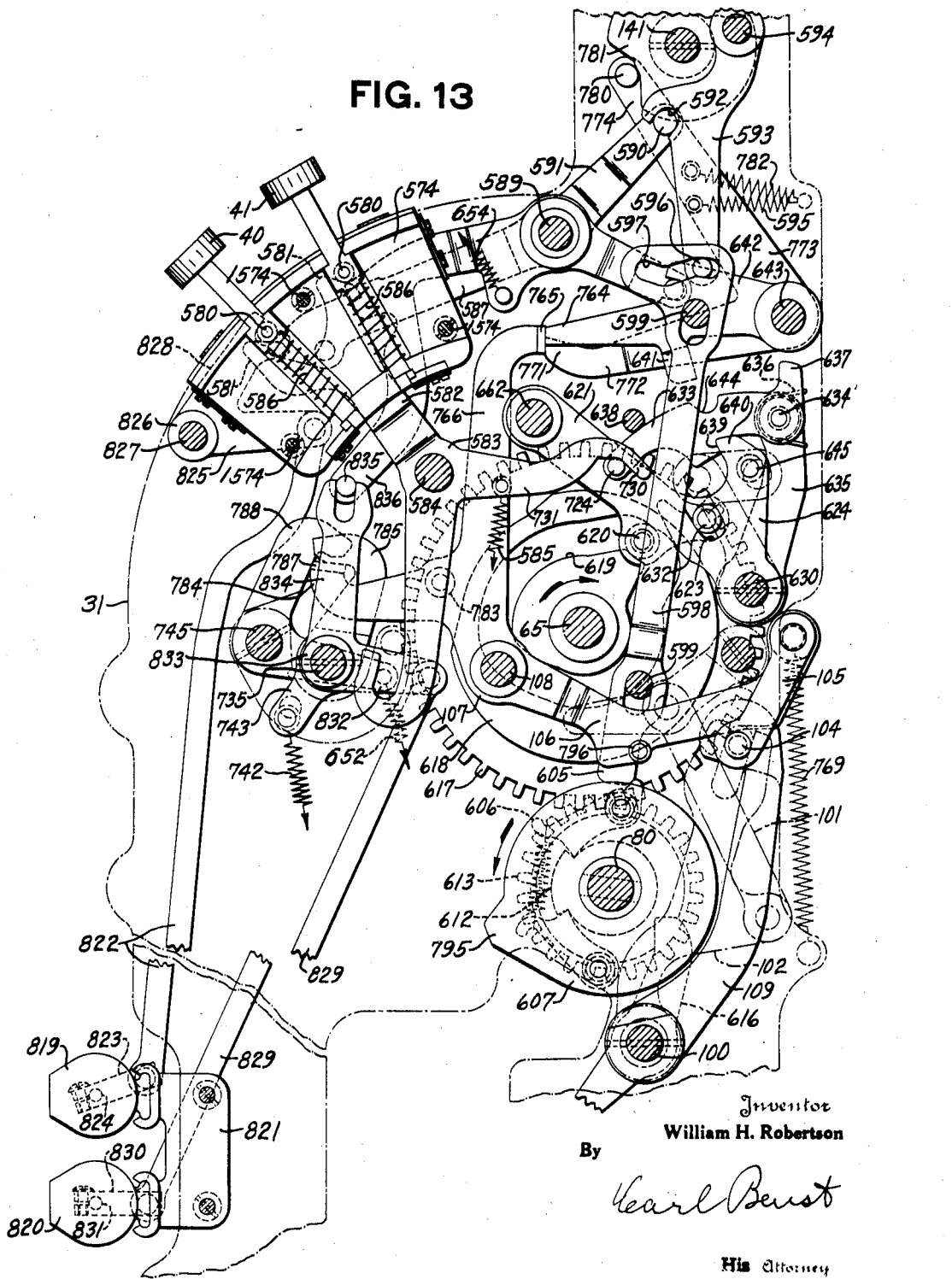
Fig. 13 is a transverse sectional view taken immediately outside the left side frame of the machine and looking away from the machine. The left side frame is indicated by dot-and-dash lines in this figure.
Figure 14:
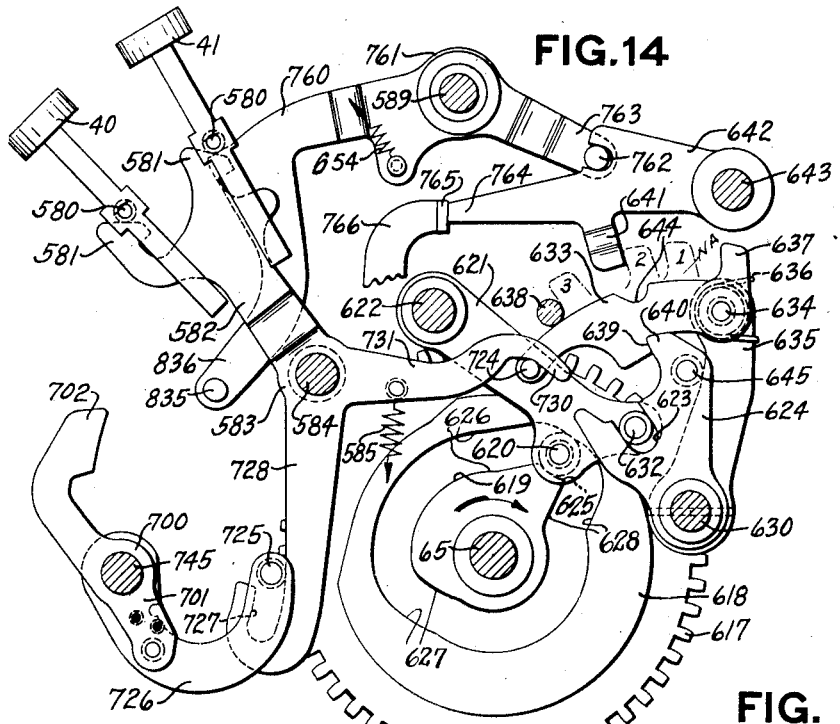
Fig. 14 is a detail view of the differential mechanism operated under the control of the conditioning keys to adjust automatically the total control lever.

At the beginning of the operation of the machine, just before the adding segment 68 commences its clockwise movement, mechanism disclosed in Figs. 12, 13 and 14, rocks the coupling pinions 86 out of mesh with the segments 68 and 90, to disconnect these segments so that when the spring 77 advances the adding segment 68 clockwise under the control of the rod 75, the indicator segment 90 may be restored to zero position by the universal rod 75 on its clockwise travel.

The coupling pinions 86 are disengaged from and re-engaged with the segments 68 and 90 by a cam groove 91 in a cam 92 (Fig. 12) fast on the drive shaft 80. The groove 91 embraces a roller 93 on a totalizer engaging arm 94 fast on the shaft 100 supported in the machine side frames. Counter-clockwise rotation of the cam 92 rocks the totalizer engaging lever 94 and the shaft 100 clockwise. A link 101 (Figs. 13 and 21) connects an arm 102 journaled on the shaft 100 to an arm 103 fast on the pinion shaft 89. The upper end of the arm 102 is bifurcated to embrace a coupling stud 104 projecting laterally from a link 105, depending from the free end of an arm 106 of a control lever 107 pivoted on a stud 108 projecting from the side frame 31. The coupling stud 104 also projects through the hooked end of an arm 109 fast on the shaft 100, thereby normally coupling the arms 102 and 109 so that they move in unison.

Figure 2:
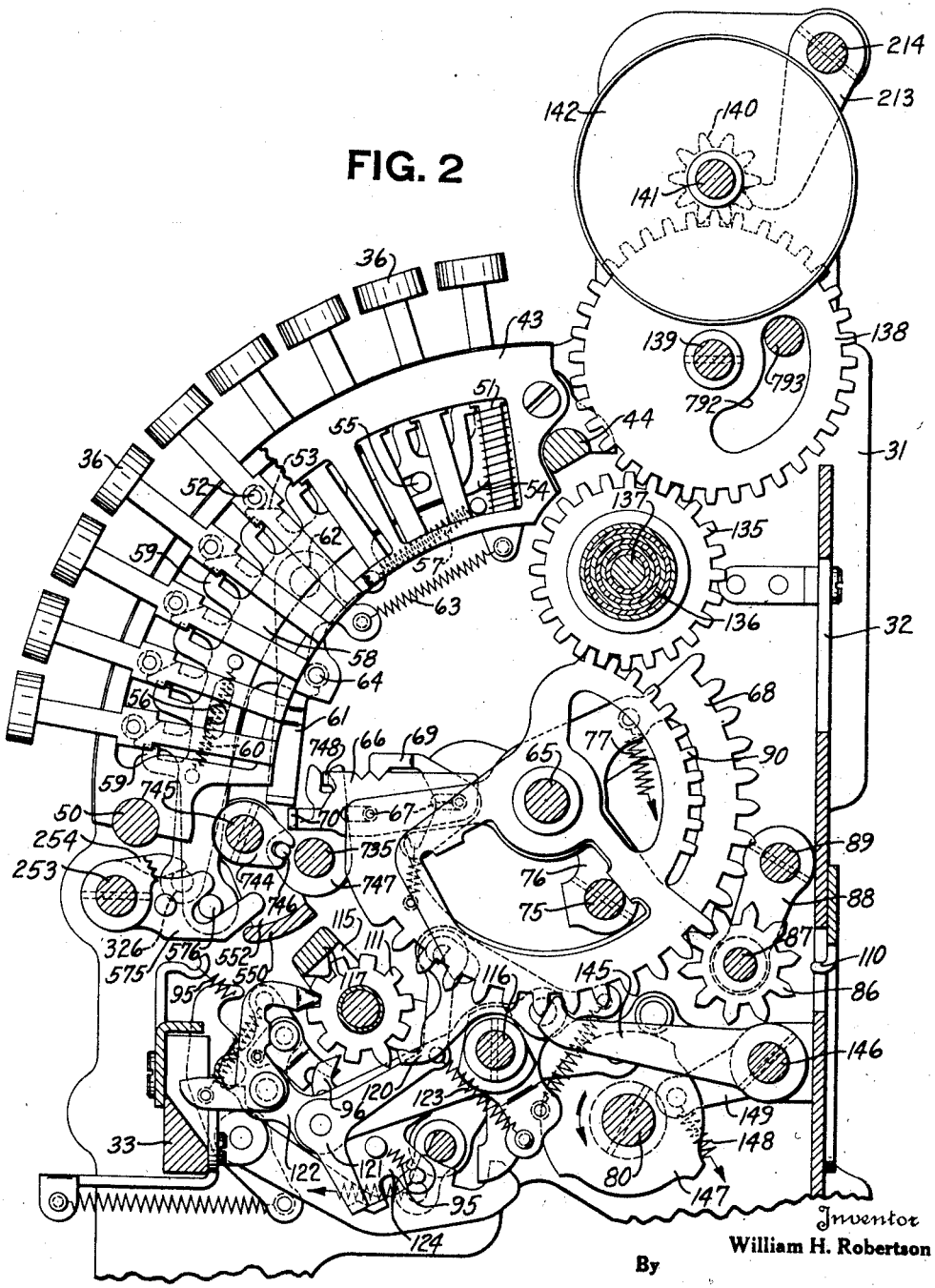
Fig. 2 is a transverse sectional view showing in right elevation a bank of amount keys and an amount differential unit.
Figure 3:
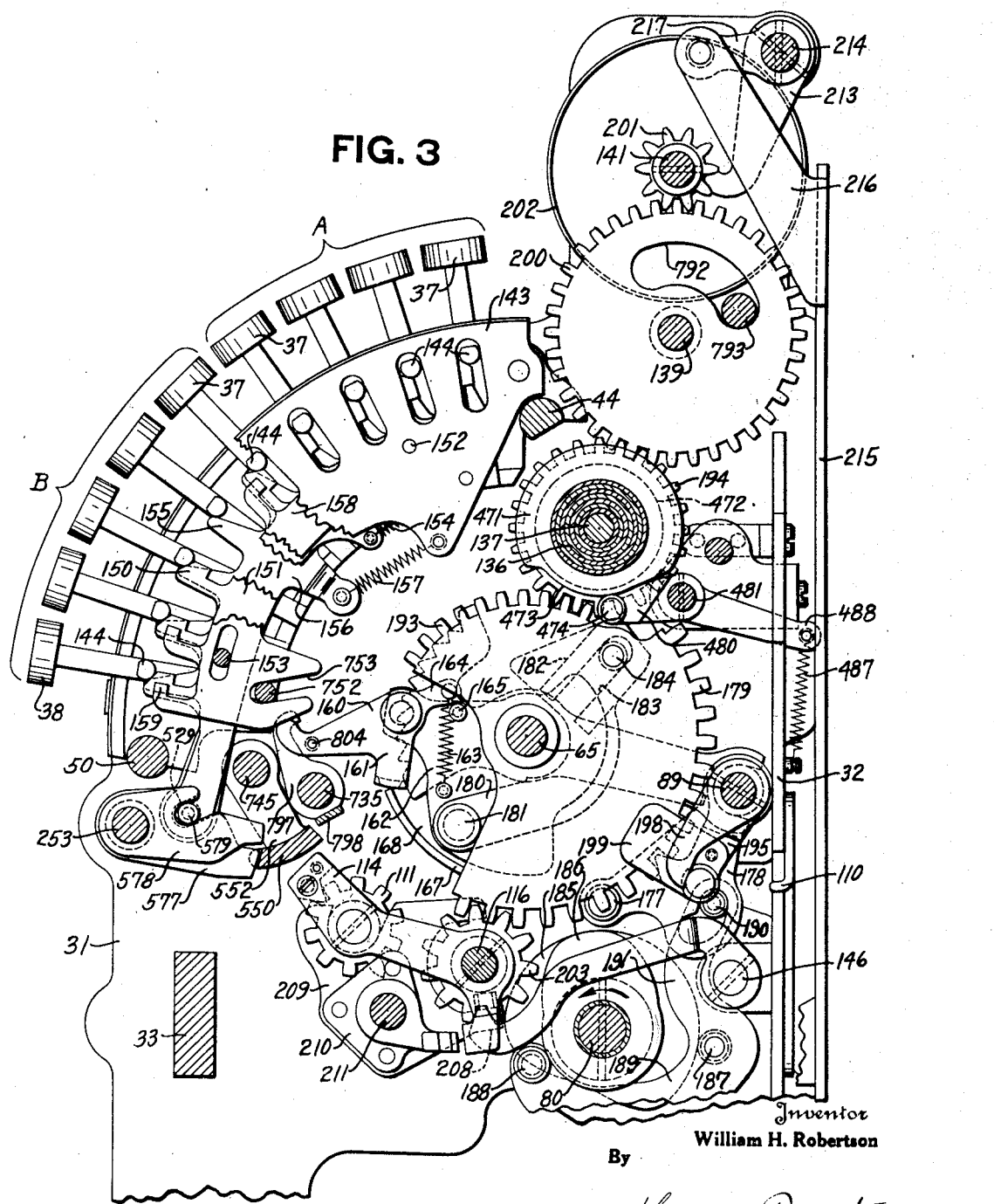
Fig. 3 is a transverse sectional view showing in right elevation the bank of transaction keys and the unit of differential mechanism associated therewith.

Clockwise movement of the arm 94 and shaft 100 (Fig. 12) by the cam 92, rocks the arm 109 (Fig. 21) clockwise and, by the coupling stud 104, rocks the arm 102 also clockwise, drawing the link 101 downwardly to rock the arm 103 and pinion shaft 89 counter-clockwise, thus disengaging the coupling pinions 86 from their respective segments 68 and 90 (Fig. 2). When the coupling pinions are disengaged from the segments 68 and 90, they are moved into engagement with an aligner comb 110 secured to the back frame 32 to hold the pinions against rotation while disengaged from the segments, thereby insuring proper meshing when the pinions are re-engaged with the segments.

As the toothed adding segment 68 travels clockwise under the influence of its spring 77, an ear 70 on the stop bar 66 strikes the inner end of the depressed key, thereby arresting the toothed adding segment 68. The restraining and restoring rod 75 continues its clockwise travel to restore the indicator segment 90 to its home position, and, as soon as this segment reaches its home position, the cam 92 (Fig. 12) actuates the coupling pinion operating mechanism to re-engage the coupling pinions 86 with their respective segments 68 and 90. An arm 73 (Figs. 7 and 24), also fast near the center of the shaft 100, engages the shaft 87 on the counter-clockwise movement of the shaft 100 to prevent twisting of the shaft 87 due to the application of the power by arm 102 (Fig. 21) and link 101 to one end thereof, when engaging the coupling pinion with the segments 68 and 69.

At the same time the coupling pinions 86 are reengaged with their segments, mechanism is operated to engage the selected totalizer with the adding segment 68, so that when the rod 75 rocks the segment 68 counter-clockwise, an amount equal in value to the value of the keys depressed, is accumulated thereon.

Totalizers

The totalizers provided in the machine are selected under the control of the transaction keys 37 and total key 38. Each totalizer comprises a group of totalizer wheels 111 (Figs. 2 and 19), one to cooperate with each of the adding segments 68. There is a totalizer wheel 111 in each totalizer for each of the key controlled segments 68, and one for the overflow segment 68.

The totalizer wheels 111 are rotatably mounted on a tube 112 slidable laterally in the machine for the purpose of selection, on a rod 113 rigidly supported between a pair of arms 114 and 115 fast on a totalizer shaft 116 journaled in the machine side frames 30 and 31. An aligner bar 117 joins the free ends of the arms 114 and 115 and this bar, together with the rod 113, totalizer shaft 116 and the arms 114 and 115, form a rockable totalizer frame.

At the proper time on adding operations, upon rotation of the shaft 80, a cam 118 (Fig. 11) fast thereon and having a cam groove 119 in the face thereof cooperating with a stud 125 on a totalizer engaging arm 126 pivoted on the shaft 100, rocks the totalizer engaging arm 126 first clockwise and then counter-clockwise. A stud 127 (Fig. 12), projecting from a link 128, the forward end of which is pivoted to the free end of an arm 129 fast on the totalizer shaft 116, projects into a slot 130 (Fig. 11) in an ear 131 bent at right angles to the upper end of the arm 126. Clockwise movement of the arm 126 draws the link 128 toward the rear and rocks the arm 129 and the shaft 116 clockwise, thereby rocking the totalizer frame to move the selected totalizer into engagement with the segments 68.

A stud 132 on the link 128 projects through the bifurcated end of a totalizer engaging control lever 133 pivoted on a stud 134 projecting from the machine side frame 30, to guide the link 128 in its reciprocating movement and to control the effectiveness of the totalizer engaging mechanism, as will be later described.

After the totalizer wheels are engaged with the segments 68, the cams 78 and 79 (Fig. 17) rock the universal rod 75 counter-clockwise to return the segments 68 to home position and, since the totalizer wheels 111 are now engaged with the adding segments, the wheels are rotated to accumulate thereon the amount set up on the keyboard. Also, the indicator segment 90 is rotated by the segment 68 through the coupling pinion 86 a number of steps equal to the number of steps of movement given the adding segment on its counter-clockwise movement, which corresponds to the value of the particular key depressed in the key bank.

After the toothed adding segment 68 arrives at its normal or home position, the cam 118 operates the arm 126 to disengage the totalizer from the adding segments 68.

The usual transfer or carry mechanism is provided to advance the totalizer wheel of higher order one step of movement when the wheel 111 of next lower order passes from "9" to "0". This transfer mechanism is fully disclosed in the above-mentioned William H. Robertson Patent No. 1,924,290. Only a brief description thereof will be included in this specification.

As the totalizer wheel 111 (Fig. 2) passes from "9" to "0", a tripping tooth thereon rocks a restraining pawl 120 (Fig. 2) to release a tripping pawl 121, pivoted on an arm 122 fast on the totalizer shaft 116, to the action of its spring 123, which immediately rocks the tripping pawl 121 clockwise to free a transfer arm 124 pivoted on the totalizer shaft 116, to the influence of a spring 95. This spring rocks the arm 124 clockwise, as viewed in Fig. 2, and, by a transfer pawl 96 pivotally carried by the transfer arm 124, advances the totalizer wheel 111 of next higher order one step of movement.

However, since this tripping of the transfer device occurs while the totalizer is in engagement with the adding segment 68, mechanism, fully described in the above-mentioned Robertson Patent No. 1,924,290, is provided to delay the transfer until after the totalizer is disengaged from the adding segment 68.

The indicator segment 90, on its counter-clockwise travel, sets type carriers and indicators to indicate the amount added on the totalizer, and to set the type carriers to present a similar character to the printing line where an impression or impressions may be made therefrom. Teeth on the indicator segments 90 mesh with a gear 135 fast on the end of one of a plurality of nested tubes 136, surrounding a shaft 137 suitably supported in the machine. The gear 135 meshes with a gear 138 fast on a shaft 139 journaled in the machine side frames 30 and 31, and this gear meshes with an indicator gear 140 journaled on an indicator shaft 141 supported in the machine side frames 30 and 31. The indicator gear 40 is secured to the side of a roller indicator 142 also journaled on the indicator shaft 141.

The movement of the indicator segments 90 by the adding segment 68 through the coupling pinion 86 when the segment 68 is returned to home position by the rod 75, through the train of gears 135, 138 and 140, just described, sets the indicator 142 to display an amount equal to the value of the key depressed in that particular bank.

A series of aligners 145, fast on a shaft 146, journaled in ears projecting from the back frame 32, operates under the influence of a cam 147 fast on the drive shaft 80 and a spring 148 having one of its ends secured to an arm 149 fast on the shaft 146, cooperate with the indicator segments 90 and adding segments 68 to hold the segments against movement when the coupling pinions 86 are reengaged therewith, when the totalizer is engaged with the adding segment 68 and when the machine is at rest.

Transaction bank

The transaction keys 37 (Figs. 1 and 3) and the total key 38 control a differential mechanism to select the totalizers, set indicators and type wheels, and to otherwise control the operation of the machine.

These keys, 37 and 38, are slidably mounted in a key frame 143 supported on the cross rods 44 and 50. Each of the keys 37 and 38 carries a laterally projecting key pin 144 which, upon depression of its key, wipes along the beveled edge of a shouldered projection 150 on a flexible detent bar 151 slidable on studs 152 and 153 in the key frame 143. There are as many projections 150 as there are keys 37 and 38, and the key pin 144, as it wipes by its associated projection 150, slides the detent bar 151 downwardly and toward the left against the tension of a restoring spring 154.

When the key pin 144 has passed the shoulder on the projection 150, the spring 154 restores the detent bar upwardly and toward the right to hook the shoulder of the particular projection 150 over the key pin 144 of the depressed key, thus retaining the key in its depressed position until another key 37 or 38 is depressed, the transaction and total keys being released only by depression of another key in the same bank. Means, to be hereinafter described, is provided to lock the detent bar 151 against movement during operations of the machine, thereby locking the depressing key in its depressed position and preventing depression of another key during said operation.

When one of the keys 37 or 38 is depressed, the key pin 144 also wipes along the inclined edge of a projection 155 of a control bar 156, also slidably mounted on the studs 152 and 153, and slides the control bar 156 downwardly and toward the left against the tension of a restoring spring 157 to control the release of the machine for operation, as will be hereinafter described.

A special locking bar 158 (Fig. 3), also slidably mounted on the studs 152 and 153, carries a plurality of hooked projections 159, one associated with each of the key pins 144. This special locking bar does not function on adding operations, but is operated on all multiple-cycle operations to lock the keys against release or depression during that period near the end of the first cycle when the keys 37 and 38 are otherwise free for manipulation. The means for actuating the special locking bar 158 will be described later in connection with the multiple-cycle operation.

*Transaction differential*

The bank of transaction keys is provided with a differential mechanism including a differentially movable arm 162 journaled on the rock shaft 65. Depression of any one of the transaction keys 37 or the total key 38 interposes its end in the path of a latch arm 160 projecting forwardly from a latch 161 pivotally supported on the differential arm 162. A restoring spring 163 normally holds the latch 161 in the position in which it appears in Figs. 3 and 4 with a rearwardly extending tail 164 resting against a stud 165 projecting from the differential arm 162. In this position of the latch 161, an ear 166, bent at right angles thereto, projects across the path of an arcuate flange 167 on an actuator 168 fast on the rock shaft 65, which, it will be recalled, is rocked an invariable extent of travel first clockwise and then counter-clockwise to normal position at each operation of the machine by the mechanism illustrated in Fig. 17.

On the clockwise travel of the actuator 168, its flange 167 pressing against the ear 166, carries the latch 161 and the differential arm 162 therewith until the forwardly extending latch arm 160 strikes the inner end of the depressed key, whereupon, continued rotation of the actuator 168 rocks the latch 161 counter-clockwise to disengage the ear 166 from the flange 167 and engage it with the proper one of a series of notches 169 in the arcuate forward end of a tie bar 175 supported on the rock shaft 65, and having its rear end bifurcated to embrace a collar fast on the coupling pinion shaft 89.

When the ear 166, as it moves into the particular notch 169, clears the flange 167, the inner periphery of said flange, as the actuator 168 continues its clockwise travel, wipes along the left edge of the ear, thereby locking said ear between the flange 167 and the particulalr notch 169, and locking the differential arm 162 in that position at which the latch arm 160 encounters the inner end of the particular transaction key 37 or 38 depressed. The flange 167, as the actuator 168 continues its clockwise travel, maintains the latch 161 in locked position against the tension of its restoring spring 163

The differential arm 162 is thus differentially positioned according to the particular transaction key 37 or 38 depressed. On the return movement of the actuator, a laterally projecting stud 176 on the actuator 168 picks up the differential arm 162 and restores the arm to its home position. As the actuator flange 167 on the return of the actuator 168, clears the ear 166, the restoring spring 163 disengages the ear from the notch 169 and rocks the latch 161 clockwise to its normal position, the clockwise movement of the latch 161 being arrested by the tail 164 thereof striking the stud 165.

The differential arm 162, assisted by a roller 177 on a drive arm 178 pivotally supported on the shaft 89, transmits its differential movement to a setting and selecting segment 179 (Fig. 3) journaled on the rock shaft 65 through a minimum movement beam 180 having its forward end pivoted at 181 to the differential arm 162.

A U-shaped block 182 secured to the rear of the beam 180 forms a slot 183 embracing a stud 184 projecting laterally from the setting and selecting segment 179. A pair of cams 185 and 186 fast on the drive shaft 80 cooperate with rollers 187 and 188 projecting from the opposite side of a cam arm 189 pivoted on the shaft 100 to rock the cam arm first counter-clockwise and then back to home position. This movement of the cam arm 189 by a roller 190 carried by an upwardly extending arm 191 of the cam arm 189, being embraced by a slot 192 in the drive arm 178, rocks said drive arm first clockwise and then back to home position. The clockwise movement of the drive arm assists in positioning the beam 180 under the control of the particular transaction key 37, or the total key 38, which is depressed.

The movement of the beam 180 is transmitted to the segment 179 (Fig. 3) by the connection 183—184 correspondingly rotating this segment to set the associated indicator, set type wheels, and to shift the totalizers laterally in the machine for the purpose of selecting the particular totalizer corresponding to the key depressed.

Teeth 193 on the segment 179 mesh with a gear 194 fast on the inner end of a particular one of the tubes 136 surrounding the shaft 137. The gear 194 meshes with an intermediate gear 200 journaled on the shaft 139, which gear 200 meshes with an indicator gear 201, fast on the indicator shaft 141 and having secured to the side thereof the web of a roller indicator 202. Thus the setting and selecting segment 179, by the train of gears 194, 200 and 201, sets the indicator 202 to a position corresponding to the key 37 or 38 depressed.

The particular tube 136 attached to the gear 194 extends into the printing mechanism to set the transaction type carriers, as will be described later.

Totalizer selection

The setting and selecting segment 179 also meshes with a totalizer selecting gear 203 (Figs. 3 and 19) rotatively mounted on the totalizer shaft 116, and having a totalizer selecting cam 204, also rotatively mounted in the shaft 116 secured thereto. A spacing collar 205 (Fig. 19) fast on the shaft 116, and the arm 114 of the totalizer frame, prevents lateral movement of the selecting gear 203 and the selecting cam 204 relative to the shaft 116, at the same time permitting rotation of these members about the shaft. A spiral cam groove 206 in the cylindrical face of the drum cam 204 embraces a roller 207 on a rearwardly extending arm 208 of a guide bracket 209 secured to a slide 210 mounted on a stud 211 projecting inwardly from the side frame 30. The setting and selecting segment 179 transmits its differential movement to the gear 203 and drum cam 204 to rotate these members differentially according to the transaction key depressed. Rotation of the drum cam 204, due to the cooperation of the spiral cam groove 206 with the roller 207, slides the bracket 209 and the slide 210 laterally on the stud 211, and due to engagement of the bracket 209 with an annular groove 212 in the tube 112, slides the group of totalizer wheels 111 laterally on the rod 113 to select the particular one of the totalizers to be moved into engagement with the adding racks 68.

The segment 179 is known as a "minimum movement device", that is, the segment is left standing at the end of an operation in the position to which it was moved during the operation and, on the next succeeding operation, the segment is moved the shortest distance to its new position without passing through a zero position.

It can be seen that the segment 179 is differentially set by the rock shaft 65 on its clockwise movement, whereas the indicator segment 90 associated with the amount bank, is restored to home position at this movement of the rock shaft, and is then set to its new position on the counter-clockwise movement of the rock shaft 65. Thus the transaction indicators and type wheels are set to their new position at the same time the amount indicators and type wheels are being restored from the position to which they were set on the previous operation to their home position.

It will be remembered that the amount differential aligner disengages before the adding segments 68 are advanced clockwise by their springs 77 under the control of the universal rod 75, and that these aligners are reengaged after the adding segments 68 are differentially adjusted and while the totalizer is being engaged, after which they are again disengaged to permit the return movement of the segments 68 and 90, finally after the adding segments 68 are restored and the indicator segments set differentially, the aligners 145 are again made effective and remain so until the beginning of the next succeeding operation.

This timing of the movement of the aligner shaft 146 is, therefore, not suitable to operate an aligner for the segment 179 (Fig. 3) associated with the transaction keys, for which reason a special aligner 195 (Figs. 3 and 6) journaled on the coupling pinion shaft 89 is provided for the segment 179. A hooked projection 196 on the totalizer engaging lever 94 (Fig. 6), embraces a stud 197 projecting laterally from the aligner 195. The lever 94, it will be remembered, operates the shaft 100, and through the mechanism appearing at the bottom of Fig. 21, operates the pinion shaft 89 to disengage and then reengage the coupling pinions 86 with the adding segments 68 and the indicator segments 90. An arm 198 fast on the shaft 89 cooperates with the stud 197 to assist in disengaging the aligner 195. Since the movement of the lever 94 occurs at the proper time, before the segment 179 is adjusted differentially by the rock shaft 65, and under the control of the particular transaction key depressed, advantage is taken of said movement of the lever 94 to operate the special aligner 195 for the segment 179, associated with the bank of transaction keys. A guide plate 199 provides for the proper lateral position of the aligner 195.

A series of indicator aligners 213, fast on an aligner shaft 214, supported in the side frames 30 and 31 of the machine, cooperate with the indicator gears 140 for the amount indicators and with the indicator gear 201 for the transaction indicator to align the indicators after they are differentially set under the control of the amount and transaction keys respectively.

An aligner operating link 215 (Figs. 3, 10 and 12) having a bend 216 at its upper end, pivoted to an arm 217 fast on the indicator shaft 214, also has a bend 218 at its lower end, pivoted to a totalizer engaging arm 219, journaled on the shaft 100 to operatively connect the arms 217 and 219.

A cam groove 225 (Fig. 10) in the face of a cam 226 fast on the drive shaft 80, embraces a stud 227 on the arm 219, and, at the proper time, the cam groove 225 rocks the arm 219 clockwise to lower the link 215, thereby rocking the indicator aligner shaft 214 counter-clockwise to disengage the aligner arms 213 from the indicator gears 140 and 201. Later in the operation, the cam groove 225 rocks the engaging arm 219 counter-clockwise, raising the link 215 to reengage the aligners 213 with their respective indicator gears to align the indicators in their adjusted positions.

Key release

Near the end of the operation the depressed amount keys 36 are released, and their springs 51 immediately restore them to their normal outward position. This releasing mechanism includes a cam 220 (Fig. 9) secured to the cam 78 (Figs. 17 and 24), the hub of which is fast on the drive shaft 80. The cam 220 is thereby given one counter-clockwise rotation at each operation of the machine. Near the end of each rotation of the cam 220, a lobe on the periphery thereof strikes a roller 221 on a pitman 222, bifurcated at its right-hand end, as viewed in Fig. 9, to straddle the shaft 80, and having its opposite end pivoted midway of an arm 223 journaled on a stud 224 projecting from the frame 31, and moves the pitman 222 toward the left to rock the arm 223 counter-clockwise.

A spring 228 compressed between the bottom of a spring seat in a stud 229 projecting from the frame 31 and shoulders on a spring pilot 250, pivotally connected to the pitman 222, returns the pitman toward the right, as soon as the lobe on the cam 220 has passed. The counter-clockwise movement of the arm 223, by a face on the upper end thereof engaging a stud 251 on an arm 252, fast on a release shaft 253, rocks this shaft clockwise, whereupon a series of fingers 254 (Figs. 2 and 9) fast on the shaft 253, cooperating with studs 326 projecting from the lower ends of the detent bars 54 for the amount banks, draws the detent bars downwardly to free the shouldered projection thereon from the key pins 52 of the depressed amount keys, thereby releasing the depressed keys 36 to the action of their springs 51.

After the depressed keys 36 are thus released and restored to their normal outward position, the detent bars 54 (Fig. 2) are restored upwardly by their restoring springs 57 rocking the fingers 254 and the shaft 253 therewith, to restore the arm 252 (Fig. 9) to its normal position, with the stud 251 resting against the arm 223.

Should a key or keys be depressed erroneously, they may be released manually by rocking a bell crank 327 (Fig. 9), pivoted on a stud projecting from the frame 31, counter-clockwise. This bell crank comprises two arms 328 and 329, the arm 328 being provided with a knob 300 projecting through the machine cabinet at the left side of the machine (see Fig. 1).

The arm 329 is provided with a face on the free end thereof adapted to contact a stud 301 on the arm 252, which stud 301 projects through a concentric slot in the frame 31 and into the path of travel of the arm 329. Counter-clockwise rotation of the bell crank 327 engages the arm 329 with the stud 301 and rocks the arm 252, shaft 253 and fingers 254 clockwise to release the depressed keys. As soon as the operator releases the knob 300, a restoring spring 302 restores the bell crank 327 clockwise to its normal position.

*Printer*

The printer provided in the machine chosen to illustrate a preferred form of the present invention is similar, in a general way, to the printer disclosed in the Robertson Patent No. 1,924,290, referred to above. It includes, generally, a plurality of groups of type wheels and printing hammers to take impressions therefrom on two record strips, the record strips being selected for operation under the control of the transaction keys. The transaction keys also control the selection of the record strip hammers. Other printing hammers cooperate with the several other groups of type wheels, to be hereinafter described in detail, to take impressions therefrom on the inserted telegram blank or other suitable record material.

There are four separate groups of consecutive numbering type wheels, a group to print on the "A" record strips under the control of the "A" transaction keys, a group to print on the "B" record strip under the control of the "B" transaction keys, and an "A" group and a "B" group of consecutive numbering type wheels to print on the telegram blank under the control of the "A" and "B" transaction keys respectively.

The consecutive numbering types provided to print on the record strip are located on the same line with the amount and transaction type wheels and a single hammer takes the impression of the amount, transaction and consecutive number type wheels, but the two groups of consecutive number type wheels for printing on the slip or telegram blank are located on a separate line from the amount and transaction types for the slip and an individual hammer is provided for each of the slip consecutive number type wheel groups. In the case of the "A" and "B" record strips, two hammers are provided, one to take the impression on the "A" record strip, and the other to take the impressions on the "B" strip. Each of these hammers, when operated, takes the impression from its entire group of type carriers, including the amount type wheels, transaction type wheels, the type wheels set under the control of the conditioning keys, and the consecutive number type wheels, on its associated record strip.

Another group of type wheels is provided to print the date and time on the inserted record strip. These wheels are operated by a solenoid connected to telegraph wires, the solenoid being energized every minute to advance the date and time wheels.

The amount and transaction type wheels are set by the differential mechanism under the control of their respective keys 36 and 37. The tubes 136 (Figs. 2, 3 and 28), it will be recalled, extend into the printer where gears 230, fast to the ends thereof, mesh with gears 231, 232 and 233, each fast to the side of type wheels 234, 235 and 236, respectively, journaled on rods 237, 238 and 239, supported between a printer frame 240 and a printer bracket 241. An aligner 242, carried between two arms 243 (only one of which appears in the drawings) yoked together and fast on a shaft 244, is adapted to be rocked by any suitable means, at the proper time, into the inter-tooth spaces on the gear 230 to align the amount type wheels 234, 235 and 236; and on a gear 322 to aline the transaction type wheels, in their adjusted positions while the impressions are being made therefrom. The aliner 242 also engages a gear 601 (Fig. 27), similar to the gears 230 and 322, to aline the type wheels for printing a character to indicate when "totals" and "sub-totals" are printed, or a "non-add" operation is performed. These functions are hereinafter described. As viewed in Fig. 28, the type wheels 234 are adapted to print on the "B" record strip, the type wheels 235 print on the "A" record strip, and the type wheels 236 print the amounts on the insertable slip.

Figure 33:
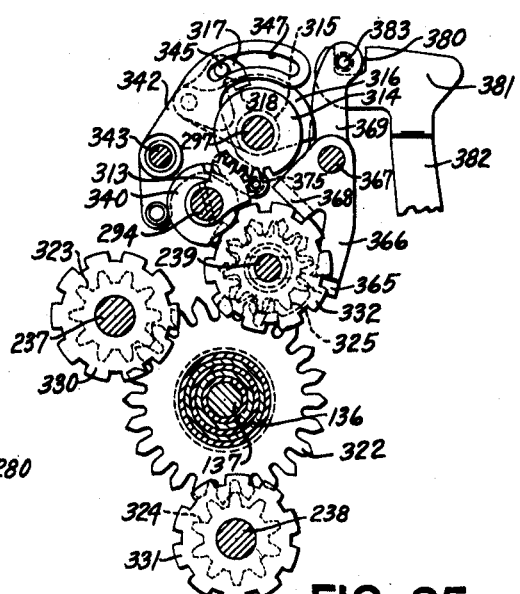
Fig. 33 is a detail view of the transaction type wheels and the aliner therefor.

A group of consecutive number type wheels 245 (Fig. 27) is assembled on each of the "A" and "B" record type wheel lines. These type wheels do not appear in Figs. 28 and 33, as they lie directly behind the amount type wheels 234 and 235. These groups of consecutive number type wheels are alike, and are operated in a similar manner, therefore, only the group on the "B" record type wheel line (Fig. 27) will be described.

Figure 32:
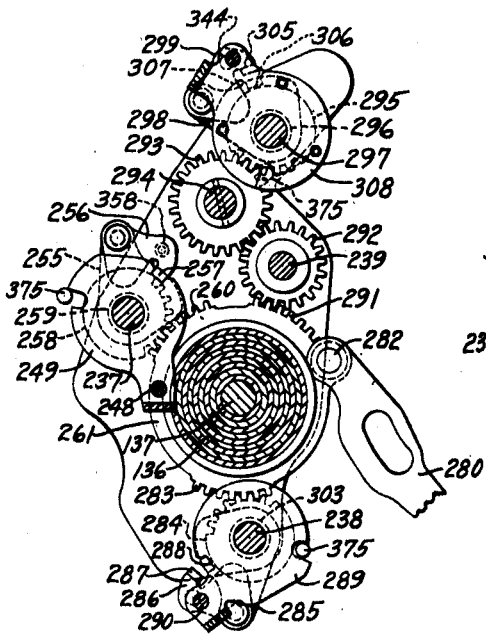
Fig. 32 is a fragmentary detail view of the consecutive number advancing means.

The type wheels 245 of this group are rotatably mounted on the rod 237 (Figs. 27, 32 and 33) and each wheel 245 has a ratchet wheel 246 fast to the side thereof. A spring-pressed, tined pawl 247, pivoted on a rod 248 carried between a pair of yoked arms 249, straddling the group of type wheels 245 and journaled on the rod 237, cooperates with the ratchet wheels 246 to advance the consecutive number type wheels one step each time the machine is operated under the control of "B" transaction keys. The means for rocking the tined pawl 247 to advance the consecutive number type wheels, includes a driving arm 255 (Figs. 27 and 32) journaled on the rod 237 alongside the left one of the arms 249, as viewed in Fig. 27. The driving arm 255 carries a coupling pawl 256 having an ear 257 bent at right angles thereto, nesting in a suitable recess in the periphery of the arm 249.

A partial gear 258 fast on one end of a sleeve 259 surrounding the rod 237, to the other end of which sleeve is secured the drive arm 255, meshes with teeth 260 on a mutilated gear 261 journaled on the largest one of the nested tubes 136. At the proper time during each operation of the machine, the mutilated gear 261 is rocked first counter-clockwise, and then clockwise to normal, to rock the partial gear 258 and the drive arm 255 first clockwise and then counter-clockwise, which rocking movement through the coupling pawl 256, rocks the yoke arm 249 first clockwise to advance the consecutive number type wheels, and then counter-clockwise to retract the tined pawl 247.

To rock the mutilated gear 261 a pair of cams 262 and 263 (Fig. 36), joined by a hub 264 pinned to the drive shaft 80 cooperates with rollers 265 and 266, respectively on a cam arm 267 journaled on a stud 268 projecting from the right side frame 30 of the machine. A stud 269 in the cam arm 267 projects through a recess 270 in a link 271 depending from the free end of an arm 272 of a bell crank journaled on a stud 273 (Fig. 37) projecting from the right side frame 30 of the machine. The other arm 274 of the bell crank carries a stud 275 projecting through the bifurcated end of an arm 276 fast on a shaft 277 in axial alignment with the stud 273, the shaft 277 being supported in the printer frame 240 and in the printer bracket 241. A link 280, pivotally connected to the free end of a curved arm 281 fast on the shaft 277 is pivoted at 282 to the mutilated gear 261.

The drive shaft 80 makes one rotation in a counter-clockwise direction at each operation of the machine. The cams 262 and 263 (Fig. 36) secured to the shaft 80, make the same rotation at each operation of the machine to rock the cam arm 267 first clockwise and then counter-clockwise to normal. This movement through the stud 269, link 271, bell crank 272—274, arm 276, shaft 277, arm 281 and link 280, transmits the rocking movement to the mutilated gear 261 to operate the tined pawl to advance the consecutive number type wheels.

The consecutive number type wheels (not shown) for the "A" group are advanced in a manner similar to that just described for advancing the consecutive number type wheels of the "B" group. Teeth 283 (Fig. 32) on the mutilated gear 261, mesh with a partial gear 284 on a sleeve 303 surrounding the rod 238. A drive arm 285 secured to the opposite end of the sleeve 303 carries a coupling pawl 286 having an ear 287 bent at right angles thereto adapted to cooperate with a recess 288 in an arm 289 of a pair of yoke arms (only one of which, 289, is shown). The yoke arms 289 carry a tined pawl (not shown) between them, similar to the tined pawl 247 for the "B" group. This tined pawl cooperates with ratchets (not shown) fixed to the "A" group of consecutive number type wheels to advance these type wheels one step at each operation of the machine under the control of the "A" transaction keys.

It is to be understood that only one of the groups "A" or "B" of consecutive number type wheels is advanced at each operation of the machine, the other remaining idle. In this connection it will be noted that the ear 257 on the coupling pawl 256 for the "B" group is engaged with its recess in the arm 249, whereas the ear 287 on the coupling pawl 286 for the "A" group is disengaged from its recess 288 in the arm 289. These coupling pawls are alternately rocked into or out of engagement with their respective arms under the control of the particular group of transaction keys in which a key is depressed.

The mechanism for selecting which one of the consecutive number type wheel groups "A" or "B" is to be operated, will be described later.

As stated above, the "A" or "B" groups of consecutive number type wheels are adapted to print on the record strips "A" and "B" respectively. Two other groups of consecutive number type wheels known as "slip group A" and "slip group B", are provided to print the consecutive number on the inserted slip. These groups of consecutive number type wheels are located on the same shaft, but are operated in a manner similar to the operation of the record consecutive number type wheels.

Figure 35:
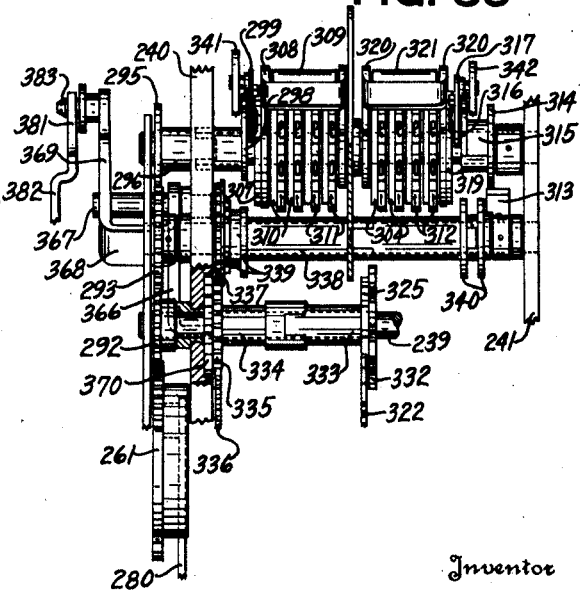
Fig. 35 is a view in front elevation of the slip consecutive numbering devices.

Teeth 291 on the mutilated gear 261 mesh with an idler gear 292 (Figs. 32 and 35) journaled on the rod 239, and this gear 292 meshes with a gear 293 fast on a shaft 294 supported in the printer frame 240 and in the printer bracket 241. This gear in turn meshes with a partial gear 295 fast on one end of a sleeve 296 (Fig. 35) surrounding a rod 297 supported in the printer frame 240 and in printer bracket 241, and having a drive arm 298 secured to the opposite end thereof. A coupling pawl 299 (Fig. 32) pivoted on the drive arm 298 has an ear 305 adapted to be either in or out of engagement with a recess 306 in the periphery of a disk 307, secured to one arm of a pair of yoked arms 308. These yoked arms between them carry a tined pawl 309 cooperating with ratchets 310 secured to the sides of the slip group "A" consecutive number type wheels 311, rotatably mounted on the rod 297.

The rocking movement of the mutilated gear 261 is transmitted through the gears 292 and 293 to the partial gear 295, to rock this gear, the sleeve 296, and the drive arm 298, first clockwise and then back to home position. If an "A" transaction key is depressed and, as will be described later, the ear 305 rests in its recess 306 in the disk 307, the clockwise travel of the drive arm 298, due to the coupling 299, carries the yoked arms 308 and the tined pawl 309 therewith to advance the slip group "A" consecutive number type wheel 311 of lowest order one step of movement.

The slip group "B" consecutive number type wheels 312 for the slip (Fig. 35) are advanced in a manner similar to the type wheels 311 for the slip group "A" consecutive number. The gear 293 is fast on the shaft 294. This shaft is consequently rocked under the influence of the mutilated gear 261. A segment 313 (Figs. 33 and 35) fast on the shaft 294 meshes with a partial gear 314 journaled on the rod 297. The partial gear 314 is joined by a hub 315 to a drive arm 316 carrying a coupling pawl 317. An ear 318 on the coupling pawl 317 is adapted to co-operate with a recess in a disk 319 secured to one of a pair of yoked arms 320 journaled on the rod 297. The yoked arms 320 carry between them a tined pawl 321 cooperating with ratchets 304 secured to the sides of the type wheels 312. The rocking movement of the mutilated gear 261 is transmitted through the gears 292 and 293 to the shaft 294 to rock this shaft and the segment 313 first counter-clockwise and then clockwise to normal, thereby rocking the partial gear 314 and the drive arm 316 first clockwise and then back to home position.

If a "B" transaction key is depressed, and the ear 318 rests within its recess in the disk 319, the clockwise travel of the drive arm 316 carries the disk 319 and the yoke arm 320 therewith to advance the consecutive number type wheel 312 of lowest order one step of movement at this operation of the machine.

Consecutive number selection

As was stated above, it is desired that only one of the consecutive numbering devices, adapted to print on the record materials retained in the machine, be advanced one unit at a given operation of the machine. Likewise, it is desired that only one of the consecutive numbering devices "A" or "B" (Fig. 35) adapted to print the consecutive number on the inserted slip, be advanced one unit at a given operation of the machine. The mechanism for selecting which of the consecutive number groups is to be advanced one unit at a particular operation of the machine, is determined by the group "A" or "B" of transaction keys in which a key is depressed. The mechanism for so selecting the consecutive number will now be described.

The keys 37 of the transaction bank (Fig. 3), it will be remembered, are divided into two groups, the upper four keys being known as the "A" group, and the keys occupying the first, second, third, fourth and fifth positions from the bottom being known as the "B" group keys.

It will also be remembered that the differential mechanism controlled by these transaction keys differentially sets one of the tubes 136 extending into the printing mechanism. The particular tube 136 associated with the transaction bank of keys has fast to the printer end thereof a gear 322 (Figs. 33 and 35) meshing with gears 323, 324 and 325 (Fig. 33) fast to the side of transaction type wheels 330, 331 and 332, respectively, mounted on the rods 237, 238 and 239. Thus the transaction differential sets the type wheels 330 to print the character indicating the kind of transaction on the "B" detail record strip and the type wheel 331 prints the same indicia on the "A" detail record strip. The type wheel 332, rotatably mounted on the rod 239, prints this indicia on the inserted slip.

Figure 34:
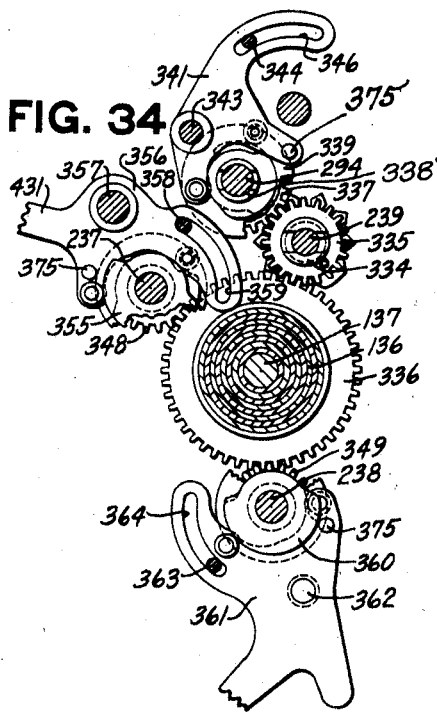
Fig. 34 is a detail view of the consecutive number control means.

The gear 325 fast on the transaction type wheels 332 is also fast on the end of a sleeve 333 journaled on the rod 239 and clutched to a similar sleeve 334 also journaled on the rod 239 and having a gear 335 secured to its opposite end. The gear 335 meshes with a large gear 336 (Figs. 34 and 35) journaled on the nested tubes 136, and also meshes with a gear 337 journaled on the rod 294 and being secured to the end of a sleeve 338. Also secured on the sleeve 338 are two pairs of small cams 339 and 340 co-operating with rollers on control arms 341 (Fig. 34) and 342 (Fig. 33), respectively, pivoted on a rod 343, supported in the printer frame 240 and in the printer bracket 241. The coupling pawls 299 and 317 carry studs 344 and 345, respectively, projecting through curved slots 346 and 347 in the tails of the control arms 341 and 342.

When the cams 339 and 340 on the sleeve 338 are rotated differentially under the control of the "A" transaction keys, the pair of cams 339 rock the control arm 341 clockwise to rock the coupling pawl 299 clockwise to enter the ear 305 thereon into its recess 306, whereby the "A" consecutive number wheels 311 are advanced one step. At the same time the pair of cams 340 rocks the control arm 342 counter-clockwise to disengage the ear 318 on the coupling pawl 317 from the notch in the disk 319, thereby uncoupling the yoked arms 320 from their drive arm 316.

If, however, the machine is operated with a "B" transaction key depressed, the cams 340 rock the control arm 342 clockwise to reengage the ear 318 with its recess, thereby coupling the "B" consecutive number advancing means with its drive means, and disconnecting the "A" consecutive number advancing means from its drive means.

The consecutive number advancing means associated with the consecutive number for the "A" and "B" record strips are similarly controlled. The gear 336 meshes with a gear 348 rotatably mounted on the rod 237, and also meshes with a gear 349 rotatably mounted on the rod 238. A pair of cams 355 (Fig. 34), secured to the gear 348, cooperates with rollers on a control arm 356 pivoted on a rod 357 supported in the printer frame 240 and in the printer brackets 241. A stud 358 on the coupling pawl 256 projects through a slot 359 in a tail of the control arm 356.

Likewise, a pair of cam plates 360 (Fig. 34) secured to the gear 349 cooperate with rollers on a control arm 361, journaled on a stud 362 projecting from the printer frame 240. A stud 363 on the coupling pawl 286 projects through a slot 364 in an arm projecting from the control arm 361. When the gear 336 is differentially rotated under the control of the "A" transaction key, it simultaneously rotates the gears 348 and 349 and the cams 355 and 360, to rock the control arms 356 and 361 simultaneously to disengage the ear 257 on the coupling pawl 256 from its recess in the arm 249, and to engage the ear 287 on the coupling pawl 286 with its recess 288 in the arm 289 to thereby select the "A" consecutive number advancing means for operation, and to disable the "B" consecutive number advancing means.

Similarly, when the gear 336 is differentially rotated under the control of the "B" transaction gears, the gears 348, 349, and their respective cams 355 and 360, are simultaneously rotated to rock the control arms 356 and 361 to reengage ear 257 on the coupling pawl 256 with its recess in the yoked arm 249, and to disengage ear 287 on the coupling pawl 286 from its recess in the yoke arm 289, thereby rendering the advancing means for the "B" consecutive number effective, and disabling the advancing means for the "A" consecutive number.

Each of the control arms 341, 342, 356 and 361 carries a stud 375 adapted, when the control arm is rocked to disengage its coupling pawl, to enter a recess in the associated yoked arm to hold the arm against movement until the coupling pawl is again engaged with its recess to couple the yoked arm with its drive arm.

It will be recalled that the transaction type wheels and the consecutive number selecting cams just described, are set up through the tube 136 associated with the transaction differential (Fig. 3) under the control of the transaction keys 37 and 38, and therefore the setting of the transaction type wheels and consecutive number selecting cams is completed before the amount type wheels are set through the tubes 136 associated with the amount banks. However, the aligner 242 (Fig. 28), cannot engage to align the type wheel gears until after the amount type wheels are set differentially. It can, therefore, be seen that the friction of the tubes 136 for the amount wheels, as they are set differentially, may displace the previous setting of the transaction type wheels and the consecutive number selecting cams.

To obviate such accidental displacement of the transaction type wheels and the consecutive number selecting cams, and to insure that these parts are in their proper positions, an aligner 365 (Figs. 26 and 33) carried by an arm 366 pivoted on a stud 367 supported in the printer frame 240 and in the printer bracket 241, and connected by a yoke 368 to an upwardly extending arm 369 also journaled on the stud 367 cooperates with a toothed aligner disk 370 secured to the gear 335 and to the sleeve 334.

Since the transaction type wheels 330, 331 and 332 (Fig. 33) are rotating at the same time the setting and selecting segment 179 (Fig. 3), is rotating, it is desirable to operate the aligner 365 for the transaction type wheels at the same time the aligner 195 (Figs. 3 and 6) for the segment 179 is operated.

To accomplish this, the aligner 365 is operated from the same source as the aligner for the segment 179, that is, the totalizer engaging arm 94 (Figs. 6 and 26). A link 371 connects the arm 94 to an arm 372 of a lever 373 pivoted on a stud 374 projecting from the printer frame 240. A recess 380 in the upper edge of a finger 381 of the other arm 382 of the lever 373 embraces a stud 383 projecting laterally from the arm 369.

When the cam 92 (Figs. 6 and 26) rocks the totalizer engaging arm 94 clockwise to disengage the aligner 195 from the segment 179 (Fig. 3), it also simultaneously, and through the link 371, rocks the lever 373 counter-clockwise to rock the yoked lever 366—369 counter-clockwise to disengage the aligner 365 from the aligner disk 370 thereby freeing both the segment 179 and the transaction type wheels to be differentially set under the control of the transaction keys. After the transaction differential adjusts the segment 179, and therethrough the transaction type wheels and consecutive number selecting cams, the cam 92 rocks the arm 94 counter-clockwise to, through the link 371, rock the lever 373 clockwise, thereby rocking the yoked lever 369—366 clockwise to reengage the aligner 365 with the aligning disk 370. This holds the transaction type wheels against any frictional movement developed between the tube 136 for the transaction bank and the tubes 136 associated with the amount bank.

Date and time type wheels

Another group of type wheels 384 (Figs. 25 and 31) is provided to print the date and time of the operation. These type wheels are operatively connected to a solenoid 385 suitably supported in the printing mechanism, and which may be connected to telegraph wires, whereby it is energized once every sixty seconds to rock an armature 386 suitably supported in the machine, to advance the units-of-minutes type wheels one step. This type wheel transfers into the tens-of-minutes wheel, which in turn transfers into the hour wheel. The hour wheel at the end of each twelve-hour period, transfers into a wheel bearing the characters "AM" and "PM" on its periphery, and this wheel transfers into a day wheel having the numerals 1 to 31 inclusive spaced about its periphery. The month and year wheels are set manually, and manual means is also provided to set the day wheel to compensate for the months of 28, 29 and 30 days' length. None of these type wheels are shown herein except as indicated in dot and dash lines in Fig. 25, and no further description thereof is included in this specification, inasmuch as any suitable one of a number of such date and time printing devices may be used, and such devices form no part of the present invention.

In addition to the above described type wheels, a machine number electro 387 (Fig. 25) is provided to print the index number of the machine on the inserted slip.

Printing hammers

Printing hammers are provided to take impressions from the several groups of type carriers on the record materials enumerated above. One of these hammers operates to make the impression on the "B" record strip (Fig. 39), and another operates to make the impression on the "A" record strip (Fig. 40). A group of four hammers (Fig. 29) is provided to print the date, time, machine number, amount, transaction and consecutive number on the inserted slip. The hammers provided to print on the detail record strips will be described first.

A platen 388 carried in the head of a hammer arm 389 pivoted on a stud 390 projecting from the side frame 30, is adapted to be thrown into contact with the "B" group of type wheels to take impressions therefrom on the "B" record strip 391 (Fig. 25). This record strip is adapted to be unwound from a supply roll 392 rotatably mounted on a stud 393 projecting from the printer frame 240. After passing around a plurality of guide studs, the record strip 391 is wound on a receiving roll 394, suitably mounted on the printer frame 240.

Similarly, a platen 395 (Fig. 28) carried in the head of a hammer arm 396, also pivoted on the stud 390, is adapted to be thrown into contact with the "A" group of type wheels to take the impressions therefrom on the "A" detail record strip 397 (Fig. 25). This "A" record strip is unwound from a supply roll 398 rotatably mounted on a stud 399 projecting from the printer frame 240. After passing several guide rollers, the record strip 397 is wound on a receiving roll 400 suitably supported on the printer frame 240.

To operate the "A" and "B" record hammers, a cam 406 (Fig. 28) fast on the drive shaft 88 cooperates with a roller 407 carried by a hammer drive arm 408 pivotally supported on a stud 409 projecting from the right side frame 30 of the machine. The rounded end 410 of the arm 408 projects into a recess in an arm 411 of a multiple-armed lever 412 pivoted on the stud 390. A spring 413 normally holds a stud 414 in the arm 389 against a downwardly extending arm 415 of the multiple-armed lever 412.

The weight of the hammer arm 396 normally tends to rock this arm clockwise about the stud 390, thereby maintaining the right-hand wall of a slot 416 in a link 417, connecting a projection 418 of the drive arm 408 and a downwardly extending arm 419 on the hammer arm 396, against a stud 420 projecting laterally from the projection 418. A strong spring 421 having one of its ends secured to a link 422, anchored to the arm 411, normally urges the multiple-armed lever 412 in a clockwise direction, and through the connection 418 urges the drive arm 408 in a counter-clockwise direction to maintain the roller 407 in contact with the periphery of the cam 406.

The cam 406, as it rotates in a counter-clockwise direction, first permits the spring 421 to rock the lever 412 slightly clockwise, thereby drawing the platens 388 and 395 nearer their respective groups of type wheels. This is for the purpose of selecting the hammer, etc., as will be described later. Next, the cam 406 rocks the drive arm 408 clockwise, rocking the multiple-armed lever 412 counter-clockwise to permit the spring 413 to retract the hammer arm 389. At the same time the arm 408 rocking clockwise permits the force of gravity to retract the hammer arm 396. As the cam 406 continues its counter-clockwise rotation, a shoulder 423 thereon passes from beneath the roller 407, whereupon a nose 424 takes the strain of the spring 421, and at the proper time the shoulder 423 passes from beneath the nose 424, whereupon the spring 421 rocks the multiple-armed lever 412 sharply clockwise to throw the hammer 389 to bring the platen 388 into contact with the group "B" type wheels 234, 245 and 330, to take the impression therefrom on the "B" record strip 391. At the same time the lever 412, through the connection 410, rocks the drive arm 408 counter-clockwise, which, through the link 417, throws the hammer 396 sharply counter-clockwise to bring the platen 395 into contact with the group "A" type wheels to take the impression therefrom on the group "A" record strip 397.

However, it is only desired to print on but one of the record strips 391 or 397 (Fig. 25) at each operation of the machine, depending upon whether an "A" key or a "B" key (Fig. 3) is depressed.

It will be recalled that the transaction differential mechanism under the control of the group "A" and group "B" keys rocks the control arms 356 and 361 (Figs. 28 and 34) to select the particular one of the group "A" or group "B" consecutive numbering devices to be advanced, rendering the advancing means for one of the consecutive numbering devices effective and disabling the other. This movement of the control arms 356 and 361 is utilized to determine which one of the detailed record hammers 389 or 396 is to be operated to take impressions from its respective group of type wheels.

As stated above, the cam 406 first permits the spring 421 to rock the multiple-armed lever 412 slightly clockwise and the drive arm 408 counter-clockwise to rock the hammer arms 389 and 396, respectively, clockwise and counter-clockwise slightly nearer to their respective groups of type carriers. While the hammers are in these positions the transaction type carriers are adjusted differentially, and the selecting arms 356 and 361 are rocked to determine which one of the record strip consecutive number devices is to be advanced. If a key in group "A" is depressed and the machine operated, the selecting arm 356 (Fig. 28) rocks counter-clockwise to uncouple the consecutive number drive arm 255 (Fig. 32) from the yoke arm 249 to prevent operation of the "B" consecutive number advancing means. This movement of the lever 356 is utilized to disable the group "B" hammer 388, 389.

A stud 430 on a forwardly extending arm 431 (Fig. 28) of the arm 356 projects through an open slot in the free end of an arm 432 of a bell crank 433 pivoted on a stud 434 projecting from the printer frame 240. When the selecting arm 356 rocks counter-clockwise to disable the group "B" consecutive number device, the stud 430 rocks the bell crank 433 clockwise to position a finger 435 on the bell crank 433 in the path of a stud 436 on the hammer arm 389, thereby preventing retraction of the "B" hammer 388, 389 when the cam 406 rocks the multiple-armed lever 412 counter-clockwise.

At the same time the selecting arm 361 (Fig. 28) rocks clockwise to couple the consecutive number drive arm 285 (Fig. 32) with the yoke arm 289, removing a hook 437 (Fig. 28) on an arm 438 extending downwardly from the selected arm 361, from beneath a stud 429 on the hammer arm 396 to permit retraction of the arm group "A" hammer 395—396 when the cam 406 rocks the drive arm 408 clockwise.

*Record strip feed and control*

It is also desired to advance but one of the detail record strips at each operation of the machine. The group "B" and group "A" record strips are fed at each operation of the machine by feed pawls 439 and 440 (Fig. 28), respectively, pivoted on an arm 441 and on the arm 415, respectively, of the multiple-armed lever 412. A spring 442 normally holds the pawl 439 in operative relation with a ratchet 443 secured to the inner end of the receiving roll 394 for the "B" record strip 391 and a spring 444 normally holds the pawl 440 in operative relation with a ratchet 445 secured to the inner end of the receiving roll 400 upon which the "A" record strip 397 is wound.

When the machine is operated with an "A" key depressed, the counter-clockwise movement of the multiple-armed lever 412 by the cam 406 and drive arm 408, draws the pawl 439 downwardly to rotate the ratchet 443 and the receiving roll 394, thereby feeding the "B" record strip 391 one space. The arm 415 of the multiple-armed lever 412 at the same time shoves the pawl 440 toward the right (as viewed in Fig. 28) in the direction of its length to rotate the ratchet 445 and feeding roll 400 counter-clockwise one step of movement to feed the record strip 397 one space. However, when the selecting arm 356 (Figs. 28 and 34) for the "B" printing mechanism rocks counter-clockwise to unlatch or uncouple the drive arm 255 (Fig. 32) from the yoke arm 249, and to position the finger 435 of the bell crank 433 (Fig. 28) behind the stud 436 to disable the "B" printing hammer 388—389, a downwardly extending arm 446 of the bell crank 433, as this bell crank rocks clockwise, places a shoulder thereon in the path of a stud 447 in the feed pawl 439, so that when the lever 412 is operated, the stud 447 cams the pawl counterclockwise out of operative relation with the ratchet 443, thereby disabling the feeding mechanism for the "B" record strip 391.

At the same time, it will be remembered, the selecting arm 361 (Fig. 28) for the "A" group rocks clockwise to couple the drive arm 285 (Fig. 32) with its yoke arm 289 to render the "A" group consecutive number advancing means effective, and to withdraw the hook 437 (Fig. 28) from beneath the stud 429 to render the "A" group hammer 395—396 effective.

The clockwise movement of the selecting arm 361 by a stud 448 on the arm 438 thereof projecting through an open slot in the end of an arm 449 of a bell crank 456 pivoted on a stud 457 projecting from the printer frame 240, rocks the bell crank 456 counter-clockwise to remove a beveled edge 458 of an arm 459 of the bell crank 456 from the path of travel of a stud 460 projecting laterally from the pawl 440, thereby permitting the pawl to function to rotate the ratchet 445 for the "A" record strip.

If a key in group "B" is now depressed, and the machine operated, the transaction differential (Fig. 3) under the control of the depressed key, sets the gear 322 (Fig. 33), and through the gear 325 (Fig. 35), sleeve 333 and 334, gears 335, 336, 348 and 349 (Fig. 34), rotates the cams 355 and 360 correspondingly. The cams 355 rock the control arms 356 clockwise to couple the group "B" consecutive number advancing means with its drive means, remove the obstructing finger 435 from the path of its stud 436, and remove the arm 446 from the path of the stud 447 on the group "B" feed pawl 439.

At the same time the cams 360 rock the control arm 361 counter-clockwise to disconnect the group "A" consecutive number advancing means from its drive means, position the hook 437 in the path of the stud 429 to disable the group "A" hammer, and rocks the bell crank 456 to position the beveled shoulder 458 on the arm 459 in the path of the stud 460 on the feed pawl 440, so that when the pawl is operated, the shoulder 458 cams the pawl away from the ratchet, thereby disabling the group "A" record strip feeding means.

Thus it can be seen that the type wheel gear 322 (Figs. 33 and 35) when it is differentially positioned under the control of the transaction keys 37 and 38 select either the group "A" or group "B" consecutive number type wheels to be advanced, the group "A" or group "B" hammers for operations, and the group "A" or group "B" record strips to be fed, depending upon the group in which the key was depressed.

Another group of printing hammers is provided to print the several data enumerated above on the inserted slip. This group of hammers includes a platen 461 (Fig. 30) carried on a hammer arm 462 pivoted on the stud 409, which platen 461 is adapted to be thrown against the type wheels 311 of the "A" group of slip consecutive number type wheels 311 to take the impression therefrom on the inserted slip. Another platen 463 (Fig. 28) on an arm 464 pivoted on a sleeve 465 (Fig. 30) surrounding the stud 409, is adapted to be thrown into contact with the type wheels 312 comprising the "B" group of slip consecutive number type wheels. Another hammer arm 466, (Fig. 31) also pivoted on the sleeve 465, carries a platen 467 adapted to cooperate with the amount type wheels 236 and transaction type wheel 332 (Fig. 33) to take impressions therefrom on the inserted slip. The fourth hammer arm 468 of this group, likewise journaled on the sleeve 465, carries two platens 469 and 470 adapted to contact with the time stamp type wheels 384 and with the electro 387, respectively, to take the impressions from these types on the inserted slips.

One of the consecutive number hammers is selected for operation by a selection disk 471 (Figs. 3 and 30) connected by a hub 472 to the gear 194 (Fig. 3) set differentially under the control of the transaction keys 37 and 38, the disk being provided with a recess 473 in its periphery adapted to be brought into operative relation with a roller 474 on an arm 480 fast on a shaft 481 journaled in the right side frame 30 of the machine and in the printer frame 240, when the gear 194 is set under the control of the "B" keys 37 and 38. Restraining arms 482 and 483, secured to a hub 484 fast on the shaft 481, coact with studs 485 and 486 respectively on the hammer arms 462 and 464 to restrain one of said hammer arms against retraction at each operation of the machine.

A spring 487 (Figs. 3 and 37), attached to the free end of an arm 488 fast on the shaft 481, constantly urges the arm and the shaft 481 in a clockwise direction to maintain the roller 474 in constant contact with the periphery of the cam 471. So long as one of the keys in the group "B" is depressed, the recess 473 remains opposite the roller 474, and the spring 487 maintains the restraining arm 482 in operative relation with its stud 485 on the hammer arm 462 for the "A" group of consecutive number type wheels, thereby disabling this hammer and rendering the "B" hammer effective.

When, however, the machine is operated with one of the keys of the "A" group depressed, the gear 194 and cam 471 are rotated to bring the periphery of the cam 471 into cooperative relation with the roller 474, thereby rocking the arm 480, shaft 481, and the restraining arms 482 and 483 counter-clockwise, as viewed in Fig. 30, to engage the restraining arm 483 with its stud 486 in the hammer arm 464 for the "B" group hammer, thereby disabling this hammer at the same time removing the restraining arm 482 from cooperative relation with its stud 485, thereby freeing the hammer arm 462 to print the "A" consecutive number on the inserted slip.

After the consecutive number hammer 462 or 464 has been selected in the manner above described, the selected consecutive number hammer, the amount hammer 466, and electro and time stamp hammers 468, are operated simultaneously to take the several impressions on the inserted slip. The slip hammers above described are operated by the cam 406 which operates the selected record strip hammer. A strong spring 500 (Fig. 30), attached to one end of a link 501, pivotally connected to the free end of a hammer operating lever 489 pivoted on the stud 409, holds a roller 490 on the hammer operating lever 489 in contact with the cam 406. A spring 491 (Fig. 30) attached to a projection 492 of the hammer arm 462 holds a stud 493 on the projection 492 in contact with a foot 494 of the hammer operating lever 489. Likewise, a spring 495 attached to a projection 496 on the hammer arm 464 holds a stud 497 on the projection 496 in contact with the foot 494.

The counter-clockwise rotation of the cam 406 first permits the spring 500 to rock the hammer operating lever 489 slightly counter-clockwise and then rocks the arm 489 clockwise, the selected hammer arm 462 or 466 rocking clockwise therewith under the influence of its spring 491 or 495, respectively, until the projection 492 strikes a stud 498 projecting from the machine side frame 30. The clockwise movement of the hammer arm 462 is limited by the stud 497 striking the wall of a slot in the printer frame 240 through which this stud projects. At the proper time during the rotation of the cam 406, the shoulder 423 passes the roller 490, whereupon a nose 499 assumes the strain of the spring 500 and, as the shoulder 423 moves from beneath the nose 499, the spring 500 rocks the operating lever 489 sharply counter-clockwise, the foot 494 picking up the studs 493 and 497 and throwing the selected hammer arm 462 or 464 sharply into contact with its respective group of type wheels 311 or 312 to take the impression therefrom.

It will be recalled that only one of the arms 462 or 464 is retracted at each operation of the machine due to the restraining arms 482 and 483. As illustrated in Fig. 30, the restraining arm 482 is in the proper relation with its stud 485 on the hammer arm 462 for the "A" group, thereby preventing retraction of this hammer, but permitting free clockwise movement of the hammer arm 464 for the "B" group of consecutive number type wheels.

Therefore, when the hammer operating lever 489 is discharged, as above described, the impression will be taken from the "B" consecutive number on the slip.

If, however, a group "A" transaction key is depressed, at the subsequent operation of the machine the disk 471 (Fig. 30) is rotated to bring the periphery of the disk 471 into operative relation with the roller 474 on the arm 480. This, as above described, rocks the arm 480, shaft 481, and the restraining arms 482 and 483 counter-clockwise, removing the arm 482 from cooperative relation with the stud 485, and moving the restraining arm 483 into cooperative relation with its stud 486. When, under this condition, the drive arm 489 is rocked clockwise by the cam 406, the hammer arm 462 for the "A" hammer will be retracted and discharged to take the impression from the "A" consecutive number on the inserted slip.

The hammer arms 466 and 468 (Figs. 29 and 31) are retracted and released at the same time the selected arm 464 or 466 is operated to take impressions from their respective groups of type wheels on the inserted slip.

A stud 505 (Figs. 29 and 30) in an arm 506 secured to the inner end of the sleeve 465 surrounding the stud 469 projects through an opening (not shown) in the printer frame 240 and through a slot 507 in an upwardly extending arm 508 of the hammer operating lever 489. An arm 509, secured to the sleeve 465 between upwardly extending arms 510 and 511 secured to hubs 512 and 513 respectively of the hammer arms 466 and 468, cooperate with studs 514 and 515 projecting respectively from the arms 510 and 511 across the path of said arm 509. Springs 516 and 517 normally hold the studs 514 and 515 against the left-hand side of the arm 509, as viewed in Fig. 31.

When the cam 406 (Fig. 30) rocks the hammer operating lever 489 clockwise, the upwardly extending arm 508 thereof, through the pin and slot connection 505—507, rocks the arm 506, sleeve 465 and the operating arm 509 clockwise, and the springs 516 and 517 draw the hammer arms 466 and 468 therewith. Now when the shoulder 423 passes from beneath the nose 499, the spring 487 rocks the hammer operating lever 489 counter-clockwise to throw the selected hammer 462 or 464 sharply counter-clockwise to bring the platen 461 or 463 against its associated group of type wheels.

Also, through the pin and slot connection just described and the arm 509, the spring 500 throws the hammer 466 sharply counter-clockwise to bring the platen 467 against the amount and transaction type wheels, and throws the hammer arm 468 counter-clockwise to bring the platens 469 and 470 against the date and time stamp wheels and against the electro 387 to take the impressions therefrom on the inserted slip.

In this type of printing hammer, that is, a blow hammer, the hammer after making the impression sometimes rebounds against the operating spring and causes a second impression or a smudge. Mechanism is provided to prevent this rebound of the hammers.

This mechanism includes a pair of locking pawls 518 and 519 (Figs. 28 and 30) pivoted on a stud 520 projecting from the side frame 30 of the machine, and which pawls are normally held in effective locking position above projections 521 and 522 on the hammer operating arms 408 and 489, respectively, by springs 523 and 524.

Before the cam 406 operates to rock the hammer operating arms 408 and 489 clockwise, a cam 530 (Fig. 28) fast on the drive shaft 80, rocks a lever 531 counter-clockwise. This lever is pivoted on a stud 532 and has a stud 533 at its upper end projecting across the planes of the pawls 518 and 519. The counter-clockwise movement of the lever 531 rocks the pawls clockwise to their ineffective position.

After the cam 406 rocks the hammer operating arms 408 and 489 clockwise, the cam 530 releases the pawls 518 and 519 to the action of their springs 523 and 524, respectively, which springs immediately rock their pawls counter-clockwise, pressing them against the left-hand sides of the projections 521 and 522, as viewed in Fig. 28, on the hammer operating arms 408 and 489. Now, when the shoulder 423 passes the noses 424 and 499 on the hammer operating arms 408 and 489 respectively, and the springs 421 and 500 rock the hammer operating arms sharply counter-clockwise until arrested by the cam 406, the springs 523 and 524 move their respective pawls 518 and 519 above the projections 521 and 522, so that when the platens strike their respective groups of type wheels and rebound against their respective operating arms 408 and 489, the pawls 518 and 519 hold these arms rigid against clockwise movement under the influence of the rebound of the hammers from the type wheels, thereby preventing rebound of the hammers from their operating arms to cause a second impression or smudge.

After the impressions are made, the machine is brought to rest with the parts in their home positions, having completed a single cycle, or adding operation, whereas, the amount represented by the keys depressed in the amount bank was added onto the totalizer selected under the control of the particular transaction key depressed. The amount, a symbol indicating the kind of transaction, and the consecutive number of the operation were printed on one of the two record strips and the same data and in addition thereto, the date, time and register number was printed on the inserted telegram blank.

*Releasing mechanism*

The machine is normally restrained in its home or normal position by a clutch arm 534 (Fig. 24) under the control of the starting bar 42 (Figs. 1 and 12). The hub 535 of the clutch arm 534 is journaled on a rod 536 pivotally supported in a pair of ears 537 projecting outwardly from the right side frame 30 of the machine. The bifurcated end of an arm 538 also pivoted on the rod 536 and secured to the hub 535 of the clutch arm 534, embraces a stud 539 in a projection 540 bent at right angles to a link 541 slidable vertically on two studs 542 and 543 projecting inwardly from the right side frame 30.

An ear 544 bent at right angles to the upper end of the link 541 resting upon a shoulder on an arm 545 pivoted on the stud 542, normally prevents downward movement of the link 541, thereby preventing counter-clockwise movement of the arm 538 and the clutch arm 534, as viewed in Fig. 24, thus holding a toe 546 of the clutch arm in the path of a shoulder 547 on a clutch release disk 548 journaled on a short shaft 549 suitably supported in the machine. The clutch control disk 548, when held in the position in which it appears in Fig. 24, by the toe 546 of the clutch arm 534, maintains the driving motor (not shown) disconnected from a gear 555 rotatably mounted on the short shaft 549.

After the desired amount keys 36 and the transaction key 37 are depressed, the machine is released for operation by depressing the starting bar 42 (Fig. 12), the stem of which is removably supported on two studs 557 projecting laterally from a slide 558 mounted on two studs 559 projecting inwardly from the right side frame 30 of the machine.

Depression of the starting bar 42, by a stud 560 projecting from the slide 558, rocks the arm 545 clockwise removing the shoulder thereon from beneath the ear 544 of the link 541, whereupon a spring 561 (Figs. 12 and 24) one end of which is secured to the free end of an arm 562 secured to the hub 535 of the clutch arm 534 rocks the arm 562, clutch arm 534, and the arm 538 (Fig. 24) counter-clockwise to remove the toe 546 of the clutch arm from the path of the shoulder 547 of the clutch control disk 548.

When this occurs, mechanism not shown herein, but which is fully disclosed in the above mentioned William H. Robertson Patents Nos. 1,924,290 and 1,929,652, connects the driving motor with the gear 555 to rotate this gear in a counter-clockwise direction. The gear 555 meshes with an intermediate gear 563 rotatably mounted on a suitably supported stud 564 and having secured to the side thereof a gear 565 meshing with a gear 566 journaled on a stud 567, the gear 566 being broken away to disclose a spiral gear 568 also journaled on the stud 567 and being secured to the gear 566 by a sleeve 569. The spiral gear 568 meshes with a spiral gear 570 secured to the drive shaft 80. The ratio of the train of gears just described is such that one rotation in a counter-clockwise direction is imparted to the gear 570 and to the drive shaft 80 at each operation of the machine.

Near the end of the operation of the machine a stud 571 projecting laterally from the gear 566 (Fig. 24) engages a beveled portion of a block 572 secured to the arm 562, and cams this arm in a clockwise direction, which through its connection with the hub of the clutch arm 534, rocks the clutch arm clockwise to reposition the toe 546 thereof in the path of the shoulder 547 on the clutch control disk 548, so that as the disk 548 approaches its normal position, the shoulder 547 strikes the toe 546 of the clutch arm, thereby disconnecting the motor from the train of driving gears just described, and brings the machine to rest in its home position.

The clockwise movement or rotation of the hub 535 of the clutch arm 534 under the control of the stud 571 likewise rocks the arm 538 clockwise, which, through the connection 539, raises the link 541 to position the ear 544 thereon above the shoulder on the arm 545, whereupon a spring 573 (Fig. 12) rocks the arm 545 counter-clockwise to position the shoulder thereon beneath the ear 544 to restrain the releasing mechanism in its normal position. At the same time the spring 573 rocks the arm 545 counter-clockwise, and through the engagement of this arm with the stud 560 restores the slide 558 and the starting bar 42 to their normal outward positions.

*Keylock mechanism*

Means, operated by the releasing mechanism, is provided to raise the locking bars 58 (Fig. 2) to lock the depressed amount keys 36 in the depressed position, and to lock the remainder of the amount keys against depression during operation of the machine. This mechanism includes a ball 550 (Figs. 2 and 3) carried by a pair of arms 551 (Fig. 12) and 552 (Figs. 2 and 3) journaled on the shaft 145. Another arm 553 (Fig. 12) connected by a yoke to the arm 551, is bifurcated to embrace a stud 554 on a projection of the link 541, so that when the link 541 is lowered, it rocks the arms 553, 551 and 552, and the bail 550 clockwise at which movement the bail picks up a series of slotted arms 575 (Fig. 2) and rocks them counter-clockwise about the shaft 253 on which they are journaled. There is one of the slotted arms 575 for each of the banks of amount keys. The slots in said arms embrace studs 576 projecting from the lower ends of the locking bars 58.

It can be seen that the counter-clockwise movement of the slotted arms 575 through the connection 576 raises the locking bars 58 to position the hooked projection 59 thereon over the key pins 52 of the depressed keys and under the key pins 52 of the undepressed keys, thereby preventing manipulation of the keys during the operation of the machine.

Before the machine may be released for operation it is necessary to depress a transaction key 37 or the total key 38 to rock the nose of a blocking arm 577 (Fig. 3) journaled on the shaft 253, out of the path of travel of the bail 550. This is done by a stud 529 on the lower end of the control bar 156 projecting through a slot in the arm 577. Depression of a transaction key 37 or the total key 38, it will be recalled, slides its key pin 144 along the inclined edge of the projection 155 of the control bar 156 to slide the control bar 156 downwardly, rocking the blocking bar 577 clockwise to lower the end thereof out of the path of travel of the bail 550.

Another arm 578, also pivoted on the shaft 253, is rocked by depression of any one of the transaction keys 37—38 to position the end thereof in the path of travel of the bail 550. This arm is for the purpose of preventing release of the machine for operation while a transaction key is being depressed, or, stated in another way, the arm 578 compels the operator to fully depress the transaction key before the machine may be released for operation.

A stud 579 on the lower end of the detent bar 151 projecting through a slot in the arm 578 communicates the downward movement of the detent bar 151 to the arm 578. This detent bar, upon depression of one of the transaction keys 37—38 is moved downwardly until the key pin of the particular key depressed has passed the shoulder in the projection 159 of the detent bar, whereupon the restoring spring 154 raises the detent bar. This movement of the detent bar lowers the arm 578 into the path of the bail 550, and then as soon as the key 37 or 38 is fully depressed, removes the arm 578 from the path of said bail which is now free to rock clockwise under the control of the starting bar 42 and under the influence of the spring 561 (Figs. 12 and 24).

In addition to the function of releasing the amount keys, hereinbefore described, the lever 328 (Fig. 9) has two other functions. Assuming that none of the transaction keys 37 or 38 are depressed (a condition in which the machine may be put by releasing any depressed transaction key by slightly depressing one of the other keys in the transaction bank just far enough to cause the flexible detent 151 to release the depressed key and then removing the finger from the slightly depressed key whereby this latter key will be restored to its normal outer position by its key spring), and that the operator accidentally depresses the motor bar 42. This depression of the motor bar 42 under the conditions just stated, rocks the releasing pawl 545 (Fig. 12) in a clockwise direction, thus permitting the spring 561 (Figs. 12 and 24) through connections previously described, to lower link 541 so that its flange 544 assumes a position between the releasing pawl 545, and the non-repeat pawl 741 (hereinafter described).

With the parts in these positions it is impossible to turn the operating handle, since the slight downward movement of the arm 562 (Fig. 24) is not sufficient to permit the arm 534 to be removed from the shoulder 547 of the motor locking disk 548, due to the fact that the arm 577 (Fig. 3) has not been moved from in front of the yoke member 550.

Moreover, the yoke member 550 is firmly held against the end of the arm 577 by the spring 561 thus producing sufficient friction to prevent the arm 577 from moving away from said member 550, thereby holding the parts in partially released positions.

It will be recalled that this yoke member 550 is connected to the link 541 by the arm 553 and pin 554, consequently, the slight downward movement of the link 541 just above mentioned, and also the clockwise movement of the yoke member 550, is stopped by the contact of the member 550 with the end of the arm 577, there being a slight clearance between the arm 577 and the member 550.

In order that the machine may be operated and the motor bar 42 and link 541 may be rereleased so that they may assume their normal positions, it is necessary that the operator rock the lever 328 counter-clockwise (Fig. 9) by grasping the knob 300. This movement of the lever 328, by the arm 327 thereon rocks an arm 860 (Figs. 9 and 24) through contact of the arm 327 with a stud 861 on the arm 860. This arm 860 is connected by a yoke 862 to an arm 863. The arm 863, therefore, receives a clockwise movement (Fig. 9), by the counter-clockwise movement of the lever 328. As clearly shown in Fig. 24, the arm 863 rises beneath the arm 562, and consequently rocks this latter arm in a clockwise direction and moves the arm 534 clockwise to its normal position.

Through the connection illustrated in Fig. 12, the clockwise movement of the arm 562 raises the link 541 to its normal position, whereby the flange is moved above the releasing pawl 545 whereupon the spring 573 immediately restores the motor bar 42 to its normal position. The upward movement of the link 541 also rocks the yoke member 550 counter-clockwise to its normal position.

The other function of the lever 328 is to release not only the motor bar 42, but also one of the transaction keys 37 or 38 should such key be partly depressed and the motor bar depressed. A partial depression of one of the keys 37 (the operator holding the key in such partly moved position), followed by a depression of the motor bar 42, also causes the flange 544 (Fig. 12) to assume a position between the releasing pawl 545 and the non-repeat pawl 741. The downward movement of the link 541 also causes the yoke 550 (Fig. 3) to be rocked in a clockwise direction, but this time it rocks slightly farther than during the last above described movement of the member, because the partial depression of one of the keys 37 moves its flexible detent 151 downwardly, thus rocking the arm 578 in a clockwise direction from the position shown in Fig. 3 to a position in front of, or to the left, of the yoke member 550. At the same time the arm 577, through the releasing bar 156, is moved below the yoke member 550. The arm 578, being slightly shorter than the arm 577, allows the yoke member 550 to receive a slightly greater movement than it did when stopped by the arm 577. However, even this movement is not sufficient to allow the arm 534 (Fig. 24) to be removed from the shoulder 547 of the motor locking disk 548, and consequently, the machine will not be released. The parts are held in partially released position by friction between the arm 578 and yoke 550, which friction is produced by the spring 561.

It is again necessary that the operator restore the motor bar 42 to its normal position, and also restore the partially depressed key 37 to its normal position. (At certain times when the key 37 is partially depressed it will remain depressed, and at other times it will snap out to its normal position. In either event, the machine cannot be released, and if the key 37 does stay partially depressed, it is because of friction that it is so held.) The counter-clockwise movement of the lever 328 through the arm 860 previously described, rocks the arm 863, and consequently raises the arm 562, thus moving the arm 534 clockwise to the position shown in Fig. 24, and as above described, the movement of arm 562 through connection shown in Fig. 12 raises link 541, so that its flange 544 assumes the position shown, above the releasing pawl 545, whereupon the spring 573 immediately restores the motor bar 42 to its normal position. The raising of the link 541, as above described, rocks the yoke 550 counter-clockwise, thus releasing the friction against the end of the arm 578 and permitting the detent 156 to be restored to its normal position, and camming the key 37 to its normal position if the same has remained in the partially depressed position due to friction between the parts.

There is still a third condition under which the motor bar might be depressed and not release the machine, and that is, where someone should deliberately rock the lever 328 clockwise until the arm 863 was in position just slightly beneath or just touching the arm 562 and then depress the motor bar. In this case, the link 541 would also be lowered and its flange 544 assume a position between the releasing pawl 545 and the non-repeat pawl 741, but the arm 534 could not be rocked far enough to remove its lower end from the shoulder 547 of the motor locking disk 548, consequently the machine could not be released under these conditions. All that it is necessary to do now, is for the operator to rock the lever 328 to complete its full movement so as to raise the arm 863 sufficiently to rock the arm 562 and raise the link 541, so that its flange 544 again assumes its normal position as shown in Fig. 12.

Now assuming that the machine is released and that the arm 534 is fully withdrawn from the shoulder 547 on the motor clutch disk. This lowers the arm 562 under the action of spring 561. With the parts in this condition it is possible to partly operate lever 328. However, shortly after the machine starts to operate the cam 79 (Figs. 17 and 24), which lies in the plane of the stud 861, strikes the stud 861 and cams arm 327 and the lever 328 back to its normal position. Thus if the operator should for any reason at all attempt to depress the lever 328 after the machine is released, or should the lever 328 accidentally remain in depressed position, the cam 79 will restore such lever 328 to its normal position, shortly after the machine starts to operate.

*Conditioning keys*

The machine chosen to illustrate one form of the present invention is controlled to make sub-total and total operations, by two keys 40 and 41 (Figs. 1 and 13). These keys, when depressed, control the differential adjustment of a control element 646 (Fig. 12), similar to and serving the same purpose as the control lever 165 in Fig. 5 of William H. Robertson's Patent No. 1,924,290. This control element has four positions, namely, adding, non-adding, sub-totalizing, and totalizing, to which it may be moved to control the machine. However, in previous machines of this type it was necessary to adjust this total control lever manually before the machine was released for the operation.

Also, in the previous machines of this type, the conventional total control lever, such as the one disclosed in the above-named William H. Robertson patent, controlled the machine to perform all of the different kinds of operation. In the machine of the present invention, however, failure to depress one of the keys 40—41 controls the machine to make adding operations, and depression of the "sub-total" key 40 or the "total" key 41 controls the machine to perform sub-totalizing or totalizing operations, respectively, the "non-add" function of the machine being controlled by the "non-add" key 39 (Figs. 1 and 9).

The previous machines of this type completed totalizing and sub-totalizing operations in a single cycle of operation just as the adding operations, that is, through one rotation of the main drive shaft. By replacing the manually set control lever with the more convenient depressible keys to control the machine to make these operations, it is necessary to provide a preparing cycle in addition to the regular totalizing or sub-totalizing cycle, thereby making, in the present machine, the total and sub-total operation two cycles in duration.

The conditioning keys 40 and 41 (Fig. 13) are slidably mounted in a key frame 574 secured to the side of the left side frame 31 of the machine by the screws 1574. Each of the control keys 40 and 41 (Fig. 14) carries a key pin 580, which upon depression of its key, wipes along a beveled edge of a shouldered projection 581 on the free end of a detent arm 582 of a multiple-armed lever 583 pivoted on a stud 584 projecting from the left side frame 31 of the machine, rocking the lever 583 counter-clockwise against the tension of a restoring spring 585.

As soon as the key pin 580 passes the shoulder on the associated projection 581 the restoring spring 585 rocks the multiple-armed lever 583 clockwise to hook the shoulder over the key pin 580 of the depressed key, thereby holding the key in its depressed position.

Later during the operation of the machine, mechanism is operated to rock the multiple-armed lever 583 counter-clockwise to unhook the shouldered projection 581 from its key pin 580, whereupon a key spring 586 (Fig. 13) restores the depressed key to its normal undepressed position.

Depression of the "sub-total" key 40 sets mechanism to control the machine to take the total from a selected totalizer and to replace the total on the totalizer.

The "total" key 41 when depressed, controls the mechanism to take the total from the selected totalizer, leaving the totalizer wheels standing at zero. Also, the "total" key 41 controls mechanism which, in combination with mechanism to be described later under the control of the transaction keys 37, determines that the machine is to perform a transfer-total operation, comprising three cycles of operation. It may be stated here that, as illustrated herein, a transfer total is performed during every reset operation during which a transaction key 37 is depressed. The only reset operation during which no transfer total is performed, is when resetting the grand totalizer with the grand total key 38 depressed.

*Sub-total mechanism*

A differential mechanism (Figs. 13 and 14) is operated under the control of the conditioning keys 40 and 41 to differentially position the control element 646 (Fig. 12). This differential mechanism is normally inactive, and mechanism now to be described is operated by depression of either one of the keys 40 or 41 to render the conditioning differential active.

Depression of the "sub-total" key 40, by its pin 580 contacting with the free end of an arm 587 (Fig. 21) of a lever 588 fulcrumed on a stud 589 projecting from the frame 31, rocks the lever 588 counter-clockwise. This counter-clockwise movement of the lever 588 by a stud 590 on the other arm 591 thereof being embraced by a notch 592 in a lever 593 pivoted on a stud 594 in the side frame 31, rocks the lever 593 clockwise against the tension of a restoring spring 595. A stud 596 on the lower end of the lever 593 projects through a cam slot 597 in the upper end of a clutch control link 598 supported on studs 599 projecting from the left side frame 31 of the machine.

Figure 15:
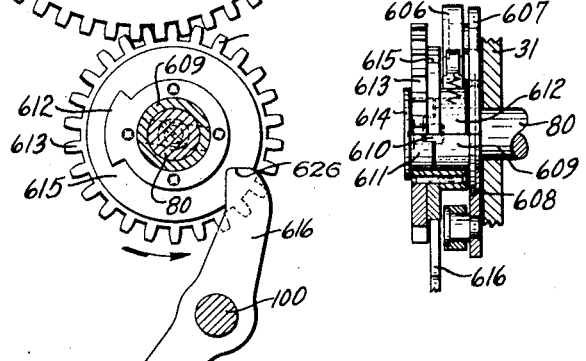
Fig. 15 is a detail view in front elevation, partly in section, of the control differential drive and coupling means.

The configuration of the cam slot 597 is such that the clockwise movement of the lever 593 by its stud 596 raises clutch control link 598 to remove a foot 605 on the lower end thereof from the tail of a clutch dog 606 carried on a cam 607 on the shaft 80. The restoring cam 607 (Fig. 15) is counterbored to receive a flange 608 of a hub 609, the flange 608 being secured to the restoring cam 607. The hub 609 carries a tenon 610 projecting into a notch in a collar 611, said notch also embracing a tenon (not shown) on the end of the shaft 80 thereby connecting the shaft to the restoring cam 607 so that these parts rotate in unison. A screw in the end of the shaft 80 holds the collar 611 in place.

The nose of the clutch dog 606 normally rests behind a shoulder on a collar 612 secured to a gear 613 (see also Fig. 14) rotatably mounted on the collar 611, and held thereon against lateral movement by a flange 614 on the collar 611. The collar 612 is spaced apart from the gear 613 by a disk 615, the collar 612, disk 615 and gear 613 being secured together. The foot 605 of the clutch control link 598, as stated above, normally rests in the path of the tail of the dog 606, so that as the restoring cam 607 rotates in a counter-clockwise direction carrying the dog 606 therewith, the tail of the dog wiping by the foot 605 of the control link 598, rocks the dog 606 clockwise about its pivot on the restoring cam 607 to remove the nose of the dog from cooperative relation with the shoulder on the collar 612, thereby disconnecting the cam 607 from the gear 613 which remains idle, being held stationary by a spring-pressed dog 616 (Figs. 13 and 14) pivoted on the shaft 100, cooperating with a notch 626 in the disk 615 secured to the side of the gear 613.

When a key 40 or 41 is depressed, as just described, the foot 605 of the clutch control link 598 is removed in the above described manner from the path of the tail of the clutch dog 606, in which case the dog 606 remains in cooperative relation with the collar 612, rotating this collar and the gear 613 therewith in a counter-clockwise direction.

The gear 613 (Fig. 14) is normally idle, and is rotated on total, sub-total and transfer-total operations to drive the differential mechanism for adjusting the control lever 646.

The gear 613 (Fig. 14) meshes with a normally idle gear 617. The gear 617 is journaled on the rock shaft 65 and has a cam 618 secured to the side thereof, said cam having a cam groove 619 in the side thereof, cooperating with an anti-friction roller 620 on a cam arm 621, pivoted on a stud 622 projecting from the left side frame 31 of the machine. A slot 623 in a differential drive arm 624, pivoted on a short shaft 630 (see Fig. 16), journaled in the left side frame 31 of the machine, and in a bracket 631 secured to the frame 31, embraces a roller 632 projecting laterally from the free end of the cam arm 621.

As stated above, totalizing and sub-totalizing operations comprise two cycles of operation, namely, a preparing cycle and a totalizing cycle. For this reason the gear 613 and the drive shaft 80 make two continuous counter-clockwise rotations at such operations while the gear 617 makes but one clockwise rotation.

The configuration of the cam groove 619 is such that very shortly after the beginning of the operation the part 626 thereof, rocks the cam arm 621 clockwise a short distance and, by the connection 632—623 rocks the differential drive arm 624 counter-clockwise. These parts rest in this partly moved position until just before the end of the first cycle of operation, when the part 627 of the cam groove 619 rocks the cam arm 621 farther clockwise to rock the differential drive arm 624 farther counter-clockwise. The arms 621 and 624 remain in these positions until near the end of the second cycle of operation, when the part 628 of the cam groove 619 rocks the cam arm 621 counter-clockwise in one continuous movement slightly past normal position, to release the keys 40 or 41 in a manner to be brought out later, and then clockwise to normal by a very small rise 625 in the cam groove 619. This movement, through the connection 632—623 rocks the differential drive arm 624 clockwise, also in one continuous movement, slightly past normal, and then counter-clockwise to home position.

A latch 633 (Fig. 14) pivoted on a stud 634, projecting from a differential arm 635, fast on the shaft 630, normally connects the differential drive arm 624 to the differential arm 635. A spring 636, coiled about the pivot stud 634 cooperates with a tail 637 on the latch 633 urging the latch to rotate counter-clockwise and holding a shoulder 639 on the latch 633 in cooperative relation with a nose 640 of the differential drive arm 624.

The drive arm 624 on its counter-clockwise travel, carries the latch 633 and thereby the differential arm 635 therewith, the part 626 of the cam groove 619 carrying the latch 633 to a position indicated by dot-and-dash lines in Fig. 14, and identified by the numeral "1", this position being known as the "non-add" position. The action of the part 627 of the cam groove 619 carries the latch 633 to a position in which the tail 637 of the latch is shown by dot-and-dash lines, and which is indicated by the numeral "3", this position being known as the "total" position. Provision is made to rock the latch clockwise about its pivot 634 to disconnect the differential arm 635 from the drive arm 624 at a point in its counter-clockwise travel, in which the tail 637, shown in dot-and-dash lines, is indicated by the numeral "2", this position being known as the "sub-total" position.

A projection 641 on the lower edge of an arm 642, pivoted on a stud 643, normally lies in the path of travel of the tail 637 of the latch 633. The arm 642 is adapted to be rocked clockwise by depression of the total key 41 to remove the projection 641 from the path of the tail 637, thereby permitting the latch 633 to maintain the connection between the drive arm 624 and the differential arm 635.

On sub-totalizing operations the sub-total key 40 is depressed, and since the "total" key is not depressed, the projection 641 remains in the path of the tail 637. When, upon movement of the latch 633 under the influence of the second action of the cam groove 619, that is, when the latch 633 moves counter-clockwise from position 1 to position 3, or from the "non-add" position toward the "total" position, the tail 637 thereof strikes the projection 641 and continued movement of the drive arm 624 rocks the latch 633 clockwise about its pivot 634, engaging a recess 644 in the arcuate edge thereof with a stud 638 projecting from the frame 31.

On the clockwise travel of the differential drive arm 624 near the end of the second cycle, a stud 645 projecting laterally from the drive arm 624 picks up the differential arm 635, and rocks it clockwise to home position, the latch 633 being reengaged with the nose 640 of the drive arm 624 by the inclined wall of the recess 644 camming against the stud 638, assisted by the spring 636, camming the latch 633 counter-clockwise.

Mechanism now to be described, transmits the movement of the differential arm 635 to the total control lever 646 (Figs. 12 and 18) to differentially position this lever under the control of the total and sub-total keys 40 and 41.

Figure 16:
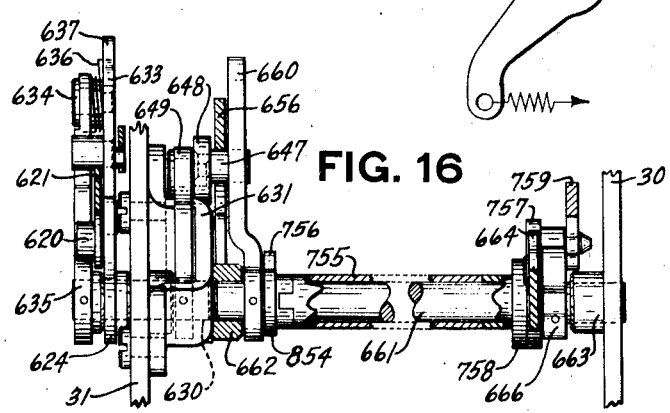
Fig. 16 is a view in front elevation of a part of the control differential.

A stud 647 (Figs. 9 and 16) on the end of a link 648, having its opposite end pivotally connected to the free end of an arm 649 fast on the short shaft 630 on the opposite end of which is secured the differential arm 635, projects through a concentric slot 655 in the rear end of an arm 656 of a "non-add" key lever 657 journaled on the rock shaft 65, the other arm 658 of the key lever 657 carrying the non-add key 39. The stud 647 also projects through a cam slot 659 in an arm 660 fast on a shaft 661 having one of its ends journaled in a bearing 662, secured to the bracket 631. The other end of the shaft 661 is journaled in a bearing 663 secured to the side frame 30 (see Fig. 16). The shaft 661 is in axial alignment with the short shaft 630 and is adapted to rock independently thereof. A bifurcated, rearwardly extending arm 664 (Fig. 12) of the total control lever 646 straddles a stud 665 on an arm 666 fast on the shaft 661 near its opposite end from the arm 660 (Fig. 16).

The differential movement of the arm 635 (Figs. 13, 14 and 16), the short shaft 630, and the arm 649 is transmitted by the link 648 and the stud 647 to the arm 660 (Figs. 9, 12 and 16), shaft 661, and arm 666, to differentially adjust the total control lever 646 (Figs. 12 and 18), the stud 647 being held to a concentric path by the slot 655 in the rear arm 656 of the non-add key lever 657.

As stated above, the differential arm 635 (Fig. 14) and the latch 633 has four positions, that in which it appears in Fig. 14 being the adding position, the next position toward the left being the "non-add" position, then the "sub-total" and "total" positions. The total control lever 646 (Fig. 12) also has four positions which correspond to the positions of the differential arm 635 and to which said lever is moved by the differential movement of the arm 635 under the control of the conditioning keys 40 and 41.

Figure 18:
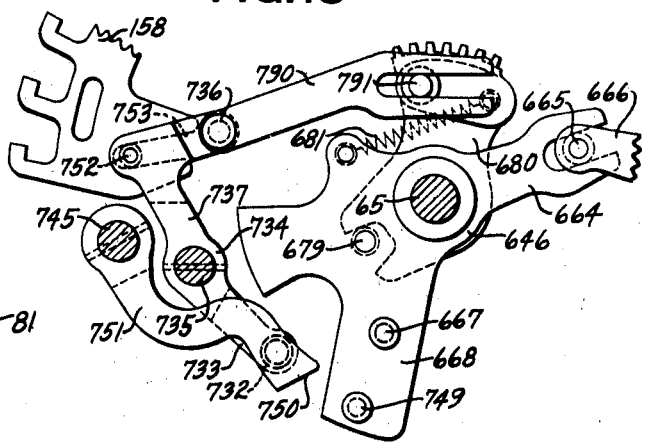
Fig. 18 is a detail view of the means for locking the transaction keys when the control lever is moved out of its adding position.
Figure 19:
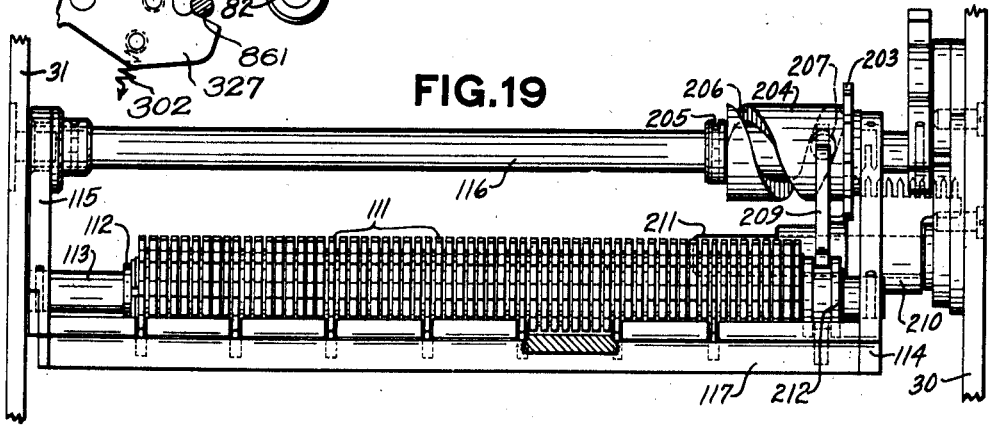
Fig. 19 is a top plan view of the interspersed totalizers and the totalizer shifting cam.

The total control lever 646 normally rests in its adding position, in which position it appears in Figs. 12 and 18, and is rocked clockwise by the leverage described above to its non-add, sub-total and total positions.

This movement of the total lever 646 determines which one of the totalizer engaging arms 94, 126 or 219 is to function to engage and disengage the selected totalizer. A stud 667 on an arm 668 of the total control lever projects through a slot 669 in the previously described totalizer engaging control lever 133, so that clockwise movement of the total control lever from its adding position to its non-add or one of its totalizing positions rocks the engaging controlling lever 133 also clockwise, which movement, by the stud 132 likewise rocks the totalizer engaging link 128 clockwise about its pivot on the arm 129. This movement removes the stud 127 from the recess 130 in the ear 131 of the totalizer adding-engaging arm 126 and positions said stud 127 either between the ear 131 on the arm 126 and an ear 672 on the sub-total engaging arm 219, in a recess 673 in the ear 672 on the sub-total engaging arm 219, or in a recess 674 in the total engaging arm 94, depending upon whether the "non-add" key 39, the "sub-total" key 40, or the "total" key 41 (Fig. 1) was depressed.

On total and sub-total taking operations, as described above, tne cam groove 619 (Fig. 14) rocks the drive arm 624 and, by the latch connection 633, rocks the differential arm 635 counter-clockwise first to its "1" or "non-add" position which, in the above described manner, rocks the total control lever 646 clockwise to its corresponding position to adjust the stud 127 on the totalizer engaging link 128 to its position interjacent the ear 131 on the arm 126 and the ear 672 on the arm 219, thereby disabling the totalizer engaging mechanism for this, the first cycle of operation, of a total or sub-totalizing operation.

Printer disabling mechanism

Movement of the total control lever 646 to its non-add position on the first cycle of sub-totalizing operations, operates mechanism in the printer to disable all of the slip hammers, both detail record hammers, the consecutive number advancing means, and the detail record strip feeding mechanism. The mechanism for disabling the consecutive number advancing means will now be described.

A stud 679 (Fig. 12) on the total control lever 646 projects through a bifurcated projection on a segment gear 680, journaled on the rock shaft 65 alongside of the total control lever, and normally pressed against the top of the stud 679 by a spring 681. The segmental gear 680 meshes with a partial gear 682 secured to the inner end of the outer sleeve 136. The clockwise rotation of the total control lever 646 by the stud 679 rocks the segmental gear 680 also clockwise and this gear rocks the partial gear 682 counter-clockwise correspondingly.

A cam 683 (Fig. 12) secured to the side of the partial gear 682 cooperates with an anti-friction roller 684 on a cam arm 685 pivoted at 686 on a shouldered disk 687 (see also Fig. 37) journaled on the largest tube 136. Clockwise movement of the total control lever 646 rocks the cam 683 counter-clockwise, which, due to its engagement with the roller 684, rocks the cam arm 685 counter-clockwise about its pivot 686, engaging a nose 688 on the arm 685 with a stud 689 (Fig. 37) on an arm 690 secured to a shaft 691, journaled in the right side frame 30 of the machine, and in the printer frame 240.

The counter-clockwise movement of the cam arm 685 cams the stud 689 and the arm 690 clockwise, rocking the shaft 691 also clockwise against the tension of a restoring spring 692 having one of its ends secured to the free end of an arm 693, secured to the shaft 691. The spring 692 constantly urges the arm 693, shaft 691, and the arm 690 counter-clockwise to press the stud 689 against the shoulder on the disk 687.

A stud 694 (Fig. 37) in a downwardly extending arm 695, fast on the shaft 691, projects through the slotted end of an arm 696 of a lever journaled on the stud 273 and having its other arm 697 bifurcated to embrace a stud 698 projecting laterally from the consecutive number drive link 271 (Fig. 36).

The clockwise movement of the arm 695, imparted thereto by the shaft 691, due to the connection 694, rocks the lever 696—697 counter-clockwise about its pivot on the stud 273. This counter-clockwise movement of the lever 696—697, due to the connection 698, rocks the consecutive number operating link 271 counter-clockwise about its pivot on the arm 272, disengaging the notch 270 in the link 271 from the stud 269 in the cam arm 267, which cam arm, therefore, on both cycles of a totalizing operation, rocks idly as it is not desired to advance the consecutive number on totalizing operations.

Disabling slip hammers on non-add operations

The control shaft 691, as it is rocked clockwise by the cam arm 685, under the influence of the cam 683, actuated by movement of the total control lever from its adding position to its non-adding position, also operates mechanism to disable all of the slip printing hammers (Figs. 29 and 30).

The ends of a spring 705 coiled about the shaft 691 (Figs. 30 and 36) extend upwardly to embrace a stud 706 in an arm 707, fast on the shaft 691. The ends of the spring 705 also embrace a stud 708, projecting laterally from a hammer disabling dog 709 journaled on the shaft 691, in such a manner that either the arm 707 or the dog 709 may be rocked in either direction independently of the other.

It will be remembered that at the same time the type carriers are set differentially under the control of the several depressed keys, the cam 406 (Fig. 30) rocks the hammer operating lever 489, including the upwardly extending arm 508 thereof, clockwise to retract the slip hammers. However, shortly after the beginning of a subtotal or total operation, the cam groove 619 (Fig. 14) operates the differential arm 635 to move the total control lever to its non-add position, at which time the segment 680 rocks the cam 683 (Fig. 12), counter-clockwise to rock the arm 690 (Fig. 37), the shaft 691, and the arm 707 (Figs. 30 and 36) clockwise. This tensions the spring 705 in a clockwise direction and rocks the disabling dog 709 slightly clockwise, pressing it downwardly against the end of the arm 508. Now, when the cam 406 rocks the hammer operating lever 489, including the upwardly extending arm 508 clockwise to retract the slip hammers, the spring 705 urges the hammer disabling dog 709 further clockwise to position the nose thereof on a shoulder in the upper end of the arm 508.

When the shoulder 423 passes the nose 499 on the hammer operating lever 489 the spring 487 is now ineffective to rock the hammers counter-clockwise since the nose of the hammer disabling dog 709 rests against the shoulder in the upper end of the arm 508, thereby restraining the hammer operating lever 489 in its retracted position against the tension of the spring 487. Thus it can be seen that all of the slip printing hammers are disabled on sub-total and total taking operations.

At the end of total taking operations the tension of the hammer operating spring 487 pressing the shouldered end of the arm 508 against the dog 709 holds the dog in its restraining position against the tension of the restoring spring 692, thus holding the hammer operating lever 489—508 in its retracted position against the tension of its spring 487.

When, at the following operation, the cam 406 (Fig. 30) rocks the lever 489—508 clockwise slightly beyond the position in which it is restrained by the dog 709, the spring 692 rocks the dog 709, arm 707, shaft 691 counter-clockwise to their normal positions. This frees the hammer operating lever 489—508 for operation, and through the arm 695 and stud 694 rocks the lever 696—697 clockwise to reconnect the consecutive number operating link 271 to its drive arm 267.

*Disabling detail hammers*

It is also desired to disable both of the detail hammers on the first cycle of sub-total and total taking operations. This is accomplished by movement of the total control lever 646 when it is moved to its "total" or "sub-total" position by the differential arm 635 under the control of the "total" and "sub-total" keys 41 and 40.

A stud 710 (Figs. 12 and 36) projecting from a disk 711, fast on the sleeve 136 associated with the total control lever 646 is embraced by a bifurcated arm 712 of a lever 713 (Fig. 36) pivoted on a stud 714, projecting from the right side frame 30 of the machine. A spring 715 normally presses a face 716 on a lever 717, also pivoted on the stud 714, against a stud 718 on the other arm 719 of the lever 713.

The counter-clockwise movement of the disk 711, under the influence of the total control lever, as this lever moves from its "add" position to its "non-add" position by the connection 710, rocks the lever 713 clockwise. The spring 715 draws the lever 717 therewith to position a wedge-shaped block 720 on an arm 721 of the lever 717 in the path of a stud 722 on the upper end of an arm 723 of the multiple-armed lever 412 (Fig. 28), which, it will be remembered, is rocked counter-clockwise by the hammer operating arm 408 under the influence of the cam 406 to retract the detail printing hammers.

As the stud 722 (Fig. 36) is carried toward the left by the counter-clockwise movement of the lever 412, the stud 722 wipes by the block 720 on the arm 721, rocking the lever 717 slightly counter-clockwise against the tension of the spring 715 until the stud 722 passes the block 720, whereupon the spring 715 rocks the lever 717 clockwise until the face 716 encounters the stud 718 in the arm 719 thereby arresting the lever 717 with the block 720 in the clockwise path of the stud 722.

As the cam 406 (Fig. 28) continues its counter-clockwise rotation and the shoulder 423 passes the nose 424 on the cam arm 408, the block 720 (Fig. 36) restrains the arm 723 and the lever 412 against clockwise rotation under the influence of the spring 421. This, through the connection 410, holds the hammer operating arm 408 against counter-clockwise rotation to hold the detail hammers in their retracted position, thus effectually disabling the detail hammers on the first cycle of a sub-total or total taking operation.

Near the end of the first cycle of "sub-total" and "total" taking operations, the cam groove 619 (Fig. 14) through the mechanism previously described, rocks the total control lever in a clockwise direction from its "non-add" position to its "total" or "sub-total" position depending upon which key 40 or 41 was depressed, which movement, through the segment gear 680 and the partial gear 682 (Fig. 12), rocks the cam 683 and the disk 711 further counter-clockwise. This additional movement, through the connection 710 (Fig. 36), rocks the lever 713 further clockwise, against the tension of the spring 715. The friction of the stud 722 pressed against the block 720 by the spring 421, is sufficient to prevent further clockwise movement of the lever 717 at this time.

When, on the second cycle of a totalizing operation, the cam 406 again rocks the multiple-armed lever 412 counter-clockwise, it carries the stud 722 away from the block 720 releasing the tension of the stud 722 (Fig. 36) against the left-hand end of the block 720, whereupon the spring 715 immediately rocks the lever 717 clockwise out of the path of the stud 722. Now, when the shoulder 423 on the cam 406 passes the nose 424 on the arm 408 (Fig. 28), the spring 421 becomes effective to rock the hammer, selected under the control of the group "A" or group "B" keys, to take the impression from its associated group of type wheels.

It is also desired to impart but one feeding movement to the detail record strip on total and sub-total taking operations. It will be remembered that the selected detail strip is fed at each operation of the machine by the multiple-armed lever 412 (Fig. 28), as this lever is rocked counter-clockwise by the cam 406 to retract the detail printing hammers. The arms 441 and 415 of the lever 412 carry the detail feed pawls 439 and 440 respectively. The selected detail record strip is fed on the first cycle of a total taking operation by the counter-clockwise movement of the multiple-armed lever 412, and, since this lever is held in its moved position by the block 720 on the arm 721, as described above, and does not receive a second counter-clockwise movement on total and sub-total taking operations, it is obvious that only one feed will be given the selected detail record strip at such operation.

Conditioning key release

The depressed conditioning key 40 or 41 is released near the end of the second cycle of the total or sub-total operation by the control differential (Fig. 14).

As stated above, the cam groove 619 (Fig. 14) near the end of a total or sub-total operation, rocks the drive arm 624 and, by the stud 645 therein, rocks the differential arm 635 clockwise slightly past normal, and then counter-clockwise to normal position.

As the latch 633, drawn by the differential arm 635, approaches its home position on its clockwise travel, a stud 724 projecting laterally from the free end of the latch 633 picks up a finger 730 on an arm 731 of the lever 583 and rocks this lever counter-clockwise against the tension of its restoring spring 585, to unhook the shoulder on the particular projection 581 on the arm 582 of the lever 583, from the pin 580 of the particular key 40 or 41 depressed, whereupon the key spring 586 immediately restores the depressed key to its normal outward position. The cam groove 619 just at the end of the operation, rocks the drive arm 624 counter-clockwise, drawing the latch 633 therewith to normal position to permit the spring 585 to rock the multiple-armed lever 583 clockwise to its normal position.

Total, sub-total and non-add type wheels

A type wheel 600 (Fig. 27), having engraved thereon the characters "Z", "X", and "N", is provided on each type wheel shaft 237 and 238 (Fig. 28) to print on the record strips 391 and 397 to designate when a total, sub-total, or non-add operation is performed. The type wheels 600 are adjusted under control of the keys 40, 41 or 39, which keys, as above described, differentially control the positioning of the segment 680 and gear 682. The gear 682 is secured to, and adjusts a sleeve 136. Also secured to the sleeve 136 is a gear 601 similar to the gears 230 (Fig. 28) for the amount type wheels, and the gear 601 meshes with pinions secured to the type wheels 600, and therefore any adjustment of the gear 682 is transmitted to the two type wheels 600 to bring the proper character to the printing line.

Control of machine to make multiple cycle operations

In addition to add and non-add operations comprising a single cycle, the machine is organized to make total, sub-total and transfer total taking operations comprising two or more consecutive and uninterrupted cycles. Means will now be described to control the machine to make a plurality of uninterrupted cycles.

It will be remembered that near the end of an adding operation of the machine the stud 571 (Fig. 24) on the gear 566 strikes the beveled surface of the block 572, dropped in the path thereof upon release of the machine for operation, and rocks the arm 562 clockwise to reengage the toe 546 of the clutch arm 534 with the shoulder 547 on the clutch release disk 548 to stop the machine in its home position at the completion of the operation. The clockwise movement of the clutch arm 534 and its hub 535 also rocks the arm 538 clockwise to raise the link 541, (Fig. 12), positioning the ear 544 above the shoulder on the arm 545 (Fig. 12).

To prevent stopping the machine in this manner at the end of the first cycle of a sub-total or total taking operation, means is provided to prevent repositioning the release arm 545 (Fig. 12) beneath the ear 544 on the link 541. In this case the spring 561 (Fig. 24), immediately after the stud 571 clears the block 572, rocks the arm 562 and the clutch arm 534 counter-clockwise to remove the toe 546 of the arm 534 from the path of the shoulder 547 without interrupting the continuity of the operation.

Near the end of the first cycle of a sub-total taking operation the total control lever 646 (Fig. 12) is rocked by the cam groove 619 (Figs. 13 and 14) from its non-add position to its sub-total position, at which movement the left-hand edge of the arm 668 of the total lever strikes a roller 732 (Figs. 12 and 18) on an arm 733 of a lever 734 fast on a shaft 735 journaled in the machine side frames 30 and 31, and rocks the lever 734 and its shaft 735 clockwise. A stud 736 on an angular arm 737 of the lever 734, at the clockwise movement of said lever engages the upper edge of a hook 738 extending downwardly from the release arm 545 and holds the release arm against counter-clockwise movement when the link 541 (Fig. 12) is shoved upwardly near the end of the first cycle of the sub-total or total taking operation, preventing the releasing arm 545 from moving beneath the ear 544 on the releasing link 541.

The stud 736 on the clockwise movement of the lever 734 also positions itself beneath the tail 740 of a non-repeat pawl 741, adapted normally to be positioned beneath the ear 544 if the motor release bar is held depressed at the end of an operation to prevent a repeat operation of the machine, and holds this non-repeat pawl in its ineffective position.

It was stated above, in connection with the description of the bank of transaction keys 37 and 38, that a special locking bar 158 (Fig. 3) is provided to lock the keys 37 and 38 in their respective positions during that period near the end of the first cycle of the sub-total, total or transfer-total operation when said keys are otherwise free for manipulation. This locking bar 158 is operated by the total control lever 646 when it is moved from its non-add position to either its sub-total position or total position. Movement of the total control lever from its non-add position to its sub-total position by the cam groove 619 near the end of the first cycle of operation engages the left-hand edge of the arm 668 thereof with the roller 732 on the arm 733 and rocks the lever 734 clockwise, at which movement a stud 752 (Figs. 3, 12 and 18) on the angular arm 737 projecting through a slot 753 in the special locking bar 158, cams this bar upwardly to position the hooked projection 159 thereon beneath the key pin 144 of the undepressed keys 37—38 and above the key pin of the depressed key, thereby locking these keys against manipulation.

When the total control lever 646 is restored to its add position near the end of the second cycle of operation, the arm 668 releases the lever 734 and shaft 735 to the action of the spring 742 (Figs. 13 and 21). This spring immediately rocks the shaft 735 counter-clockwise to normal position, the stud 752 on the arm 737 camming the locking bar 158 downwardly to unlock the keys 37 and 38.

Near the end of the operation the cam groove 619 restores the total control lever counter-clockwise to its normal position and on the counter-clockwise movement of the total control lever, as it arrives at the non-add position, the arm 668 thereof releases the roller 732 on the lever 734 thereby freeing the lever 734 and the shaft 735 to the action of a restoring spring 742 (Fig. 13), one end of which is attached to a lever 743 fast on the shaft 735, which spring 742 immediately rocks the lever 743 and shaft 735 and the lever 734 counter-clockwise to normal position, withdrawing the stud 736 from between the tail 740 of the non-repeat pawl 741 (Fig. 12) and the hook 738 of the release arm 545, freeing these members to the action of their respective restoring springs. As soon, on the second cycle, as the stud 571 (Fig. 24) coacts with the block 572 to rock the arm 562 clockwise to raise the link 541, clearing the ear 544 above the release arm 545, the spring 573 (Fig. 12) acts to rock the releasing arm 545 counter-clockwise to position the shoulder thereon beneath the ear 544, at the same time by the stud 560 restoring the starting bar to its normal outward position.

Totalizer engaging control

On sub-total taking operations, at which time the totalizer wheels are turned backward to zero and then reset to their former positions, it is necessary to engage the selected totalizer with the actuator segments 68 before these actuators are advanced by their springs 77 under the control of the universal rod 75.

Also, it is necessary, in order to replace the total on the totalizer, to leave the totalizer in engagement with the actuators 68 until they are restored to normal position by the rod 75. To do this it is necessary to change the timing of the engagement and disengagement of the totalizers with the actuators 68. This is accomplished by the total control lever 646 through the medium of the engaging controlling lever 133 (Fig. 12).

As stated above, movement of the total control lever 646 (Fig. 12) from its add position, in which it appears in this figure, to its non-add position on the first cycle of a sub-total taking operation, positions the stud 127 on the counter engaging link 128 intermediate the ear 131 on the adding-engaging arm 126 and the ear 672 on the sub-total engaging arm 219. This is done because it is not desired to engage the totalizer with the tooth adding racks 68 on the preparatory cycle of a sub-total taking operation.

At the end of the first cycle of the totalizing operation the total control lever 646 receives its second clockwise movement, this time from its non-add position to its sub-total position. At this movement, by the pin and slot connection 667—669, the total control lever rocks the engaging controlling lever 133 clockwise to position the stud 127 on the link 128 within the recess 673 in the ear 672 of the sub-total engaging arm 219. Now as the drive shaft 80 and the cam 226 (Fig. 10) commence their second counter-clockwise rotation at the beginning of the second cycle of the sub-total taking operation, the cam groove 225 immediately rocks the sub-total engaging arm 219 clockwise to engage the selected totalizer with the adding racks 68 at the very beginning of the second cycle of operation.

On the first or preparatory cycle of a sub-total taking operation, the adding racks 68 are stopped in their zero position by the zero stop arms 61 since no amount keys 36 are depressed to rock the stop arms to their ineffective position. In case, however, of accidental depression of one of the amount keys, its corresponding adding segment 68 would be rocked clockwise by its spring 77 until stopped by the depressed amount keys, but since the totalizer is not engaged on the first cycle of the sub-total taking operation, the amount will not be added on the totalizer.

The printing mechanism is disabled on this cycle, and does not print the amount which is, therefore, only set on the indicators.

On the second cycle of the sub-total taking operation it is desired that the adding segment 68 be advanced under the control of their respective totalizer wheels 111. But since no key 36 in the amount bank is depressed to withdraw the zero stop arms to their ineffective position, means is provided, under the influence of the total control lever, to slide the stop bars 66 (Fig. 2) radially toward the rock shaft 65, removing the ears 70 thereon from beneath the stop arms 61, thereby rendering said stop arms ineffective to arrest the adding segments 68. This mechanism includes a series of bifurcated arms 744 (Fig. 2) fast on a shaft 745 journaled in the side frames 30 and 31 of the machine. The arms 744 embrace studs 746 on a series of arms 747 journaled on the shaft 735. Upwardly extending arms 747 are forked to embrace ears 748 on the stop bars 66.

Movement of the total control lever 646 (Fig. 12) from its non-add position to its sub-total position, at the end of the first cycle of the sub-total taking operation, engages a stud 749 on the arm 668 thereof with the end 750 of an arm 751 fast on the shaft 745, rocking the arm 751 and shaft 745 counter-clockwise. This counter-clockwise movement of the shaft 745 (Fig. 2) by the arms 744 and studs 746 rocks the arms 747 clockwise to slide the stop bars 66 radially toward the rock shaft 65, thereby rendering the zero stop arm 61 ineffective to stop the tooth adding segments 68 on their clockwise advancement at the beginning of the second cycle of a sub-total taking operation.

The totalizer wheels 111, being engaged with the adding segments 68, as these segments are rotated clockwise at the beginning of the second cycle of the sub-total taking operation, are rotated in a counter-clockwise direction until stopped by the tripping tooth striking the pawls 120, thus restraining the adding segments 68 against further movement by their springs 77. The universal rod 75 continues its clockwise movement, restoring the setting segments 90 to their normal or zero position. It will be remembered that just before the rod 75 commences its clockwise movement, the coupling pinions 86 are rocked counter-clockwise to disengage them from the setting segments 90 and adding segments 68, so that the adding segments 68 may be adjusted by their springs 77 under the control of the totalizer wheels, and the setting segments 90 may be restored to their zero position by the clockwise travel of the rod 75.

Also, after these parts have been set, as above described, the coupling pinions 86 are reengaged with the adding segments 68 and the setting segments 90, so that counter-clockwise movement of the rod 75 rotates the segments 68 and 90 in unison a like number of spaces of movement, thereby restoring the amount to the totalizer which was taken therefrom on the clockwise rotation of the segment 68, and setting the setting segments 90, thereby setting the indicators and type wheels correspondingly.

After the adding segments 68 and setting segments 90 are set as just described, the totalizer is rocked out of engagement with the adding segment 68, and then near the end of the operation the cam groove 619, through the train of mechanism described above, rocks the total control lever 646 (Fig. 12) counter-clockwise in one continuous movement from its sub-total taking position to its adding position, releasing the shaft 735 to the action of the spring 742 (Fig. 13), which immediately rocks this shaft counter-clockwise to its normal position, withdrawing the stud 736 (Fig. 12) from its position between the tail 740 of the non-repeat pawl 741 and from above the hook 738 of the releasing arm 545, permitting the releasing arm to reassume its position wherein the shoulder thereon rests beneath the ear 544 on the releasing link 541, thereby retaining the machine in its home position at the end of the operation.

This counter-clockwise movement of the total control lever to its add position, also withdraws the stud 749 from the contact with the arm 751, whereupon a spring 652 (Fig. 21) attached to the free end of an arm 653 of a bell crank 754 fast on the shaft 745, rocks the bell crank 754 and shaft 745 clockwise to normal position, at which movement the shaft 745 through the arms 744 and connections 746 rocks the arms 747 counter-clockwise to draw the stop bars 66 radially outward to their effective position with the ears 70 beneath the zero stop arms 61, in which position the adding segments 68 are placed again under the control of the zero stop arm 61 or the depressed amount key 36, as the case may be.

When the total control lever 646 is rocked counter-clockwise to its add position, the spring 681 draws the segment 680 therewith rocking the gear 682 and the cam 683 clockwise to release the arm 690 (Fig. 37) and shaft 691, to the action of the restoring spring 692, which immediately rocks this shaft counter-clockwise to reengage the consecutive number operating link 271 (Fig. 36) with its drive stud 269. The counter-clockwise movement of the shaft 691, under the influence of the spring 692, also rocks the arm 707 counter-clockwise tensioning the spring 705 in a counter-clockwise direction, so that when, on the next succeeding operation, the cam 406 (Fig. 30) rocks the operating lever 489 clockwise relieving the strain of the spring 487 from the nose of the dog 709, the spring 705 rocks the dog counter-clockwise to normal ineffective position.

The clockwise movement of the cam disk 683 also rocks the disk 711 (Fig. 36) clockwise to restore the detail hammer disabling lever 717 to its normally ineffective position. Restoration of the total control lever 646 (Fig. 12) to its adding position likewise restores the link 128 counter-clockwise to reposition the stud 127 in the notch 130 of the ear 131 of the adding engaging arm 126.

This completes the sub-total taking operation, and leaves the machine in condition to perform any of the several operations of which it is capable, under the control of the several manipulative devices.

Total taking

As herein stated, whenever the total key 41 is depressed in combination with a control key 37, a three cycle transfer total is performed. The only time a two cycle clearing operation takes place is when the grand total key 38 is depressed in combination with the total key 41. Therefore the description of a two cycle clearing operation is limited to a clearing of the grand totalizer with the key 38 depressed.

The operation of the machine under the control of the total key 41, to clear the grand totalizer differs from the operation under the control of the sub-total key 40 only in that the totalizer is disengaged from the adding segments immediately after they are set under the control of the totalizer wheels, thereby turning the totalizer wheels to zero and retaining them in the zero position at the end of the operation.

To operate the machine, therefore, to clear the grand totalizer, the operator depresses the conditioning key 41 to control the machine to perform a totalizing operation. He also depresses the total key 38 in the bank of transaction keys to select the grand totalizer, and then depresses the starting bar 42 to release the machine for operation.

Depression of the total key 41 engages its pin 580 with the arm 587 (Figs. 13 and 21) of the lever 588, rocking said lever counter-clockwise as when the sub-total key 40 is depressed, to raise the control link 598, permitting the disk 607 by the dog 606 to rotate the control gear 613 and the control cam groove 619.

The key pin 580 on the total key 41, when this key is depressed, also encounters an arm 760 (Figs. 13 and 14) of a lever 761, pivoted on the stud 589. A stud 762 on the other arm 763 of the lever projects through a recess in the control arm 642. Depression of the total key 41 rocks the lever 761 counter-clockwise thereby raising the control arm 642 and removing the projection 641 thereon from the path of travel of the tail 637 on the latch member 633, so that when the cam groove 619 rocks the drive arm 624 counter-clockwise, the tail 637 does not strike the projection 641, and is, therefore, swung to its total position, as shown by dot-and-dash lines, and indicated by the numeral "3" in Fig. 14.

On totalizing operations, as on sub-totalizing operations, the cam groove 619 on the first cycle rocks the differential arm 635 to its "1" or non-add position. Then at the end of the first cycle the differential arm 635 is carried to its "3" or totalizing position. This movement, through the shaft 630, arm 649, cam arm 660 (Fig. 12), shaft 661, and the arm 666 fast thereon, rocks the total control lever 646 clockwise to its totalizing position.

This movement of the total control lever through the pin-and-slot connection 667—669 rocks the engaging controlling lever 133, and this lever, through the connection 132, rocks the totalizer engaging link 128 clockwise about its pivot on the arm 129 to position the stud 127 in the notch or recess 674 in the total engaging arm 94. The timing of the cam groove 91, which operates the total engaging arm 94, is such that it rocks the arm 94 clockwise at the beginning of each cycle of operation to engage the totalizer with the adding segment 68 (Fig. 2), and then as soon as these segments are differentially positioned, rocks the arm 94 counter-clockwise to disengage the totalizers, leaving the totalizer wheels standing at zero.

It will be remembered, however, that on the first cycle of the total taking operation the total control lever is rocked to its non-add position, thereby positioning the stud 127 between the ear 131 on the arm 126 and the ear 672 on the arm 219, thereby rendering the totalizer engaging mechanism ineffective on this cycle. At the end of the first cycle, when the total control lever receives its additional movement to the total position, the stud 127 is given an additional movement from its non-add position to engagement with the notch 674 in the arm 94. On the second cycle of the total taking operation, therefore, the totalizer is engaged at the beginning of the second cycle under the influence of the cam 92, and as soon as the totalizer wheels 111 have been restored to zero by the clockwise movement of the adding segment 68, the cam 92 disengages the totalizer, leaving the wheels 111 standing at zero.

The total key 41 is released near the end of a total taking operation in the same manner as the sub-total key 40.

Near the end of the total taking operation the stud 724 (Fig. 14) on the latch 633 engages the finger 730 on the arm 731, as the differential arm 635 approaches its home position and rocks the multiple-armed lever 583 counter-clockwise against the tension of the restoring spring 585, thereby rocking the arm 582 counter-clockwise to remove the shoulder on the projection 581 associated with the total key 41 from the key pin 580. This releases the key 41 to the action of its spring 586, which immediately restores the key to its normal outward position. The cam groove 619 then rocks the differential arm 635 slightly counter-clockwise to its normal position, releasing the finger 730, whereupon the spring 585 immediately restores the lever 583 clockwise to its normal position.

The printer controls function on total taking operations in identically the same manner as on sub-total taking operations. The slip printing mechanism is disabled on both the first and second cycles of the operation, and the detail printing and detail feed mechanism is disabled on the first cycle. The selected hammer and detail feed mechanism function on the second cycle of operation. The consecutive number advancing means is also disabled on both cycles of operation for the totalizing operation.

*Transfer total*

One of the novel features of the present invention is a device which, when the machine is operated with the total key 41 depressed in combination with any one of the transaction keys 37, controls the machine to make a three-cycle operation, known herein as a transfer-total operation. The first cycle of such an operation, is the preparatory cycle. At the second cycle the total is taken from a selected transaction totalizer, and the amount of the total is set on the indicators and printed on the detail record strip selected under the control of the depressed transaction key. On the third cycle, the machine automatically selects the grand totalizer and adds therein the total taken at the second cycle from the selected transaction totalizer.

In the present illustration, which is designed to fit a system in a particular business, it is impossible to reset a transaction totalizer under control of the transaction keys 37, without transferring the total to the grand totalizer. However, by changing the outline of disk 781 (Fig. 21), hereinafter described, by providing a notch therein corresponding to the location of any desired key 37, such reset could be accomplished, but then it would be impossible to transfer the total corresponding to such key into the grand totalizer. Therefore, the machine must be built to either automatically reset and transfer the total, or to simply reset without transferring the total. As above stated, in the present illustration the totals corresponding to keys 37 are automatically transferred to the grand totalizer upon being reset.

The transfer total control device is normally held in its ineffective position and is rendered effective under the control of the total key 41 and the transaction keys 37. When the total key 41 and a transaction key 37 are depressed, and the machine operated, the device, including the transfer total control lever 107 (Figs. 13 and 21), is rocked to prevent the shafts 735 and 745 from restoring and to condition the machine to make an effective repeat operation.

Depression of the total key 41, of course, conditions the machine to make a totalizing operation of two cycles to clear the selected transaction totalizer and partially frees the transfer total control lever 107 to the action of its spring 769. Other means including a bell crank 773 (Figs. 13 and 21) under the control of the transaction keys 37 continues to restrain the lever 107 until a transaction key 37 is depressed and the machine operated.

When, however, a key 37 is depressed in combination with the total key 41 and the machine operated, the bell crank 773 is operated to free the lever 107 to the spring 769. The lever 107 does not immediately become effective, however, due to other restraining means to be described later.

It will be remembered that depression of the total key 41 (Fig. 14) rocks the lever 761 counter-clockwise and, by the stud 762, rocks the arm 642 clockwise to remove the projection 641 from the path of the tail 637 of the latch 633. This also removes the end 764 of the arm 642 from the path of movement of an ear 765 (Figs. 13 and 14) on the curved end of an arm 766 projecting upwardly from the transfer total control lever 107 pivoted on the stud 108 projecting from the left side frame 31 of the machine. The spring 769, having one of its ends attached to the free end of the arm 106 of the lever 107, normally presses the ear 765 against the end 764 of the arm 642, and also against the end 771 (Figs. 13 and 21), of an arm 772 of a bell crank 773 pivoted on the stud 643. The other arm 774 of the bell crank carries a stud 780 cooperating with a disk 781 fast on the shaft 141 which, it will be remembered, is set differentially under the control of the transaction keys 37—38 (see Fig. 3).

As illustrated in Figs. 13 and 21, the stud 780 on the arm 774 rests within a recess in the periphery of the disk 781. This condition obtains only on operations wherein the grand totalizer was selected and a total or sub-total taken therefrom, or one of the totalizers selected under the control of the transaction keys 37 was reset to zero and the total transferred to the grand totalizer, which is automatically selected on the third cycle of such operations, as will be hereinafter described.

It can be seen, therefore, that the end 771 of the arm 772 may be either in the path of the ear 765 or just below the path thereof, depending upon the nature of the last operation and upon the key depressed in the transaction bank to control that operation.

Let it be assumed that the last operation of the machine was one in which the grand totalizer was selected. After the depression of the total key 41 has removed the end 764 of the arm 642 from the path of the ear 765, the arm 772 still restrains the lever 107 against the influence of its spring 769. When, on the first cycle of a transfer total operation, the transaction differential (see Fig. 3) under the control of the particular key 37 depressed, sets the indicator 202 for this bank of keys, the shaft 141 and disk 781 (Figs. 13 and 21) are rotated therewith to rock the bell crank 773 counter-clockwise against the tension of a spring 782, lowering the end 771 out of the path of the ear 765 on the arm 766.

Before this occurs, clockwise rotation of the gear 617, which remains coupled with the gear 613 on the drive shaft due to the raising of the link 598 upon depression of the total key 41, rotates the cam 618 to move the concentric portion of the periphery of the cam 618 beneath a roller 783 on a projection 784 of the arm 766, thereby preventing clockwise rotation of the lever 107 under the influence of the spring 769, when the arms 642 and 772 are spread apart.

As stated above, the arm 668 of the total lever 646 (Fig. 12), when said total lever moves from its "non-add" to its "total" position on the first cycle of a totalizing operation, rocks the lever 734 and the shaft 735 clockwise. At this movement of the lever 734 the stud 736 is positioned between the tail 740 of the non-repeat pawl 741 and hook 738 of the release arm 545, thereby preventing restoring movement of these parts at the end of the first cycle of operation. This provides for continuous operation of the machine through the two cycles of operation necessary to take the total from the selected transaction totalizer.

However, near the end of the second cycle of the total-taking operation, the cam groove 619 (Fig. 13) operating through the differential mechanism, including the differential arm 635, rocks the total control lever 646 (Fig. 12) counter-clockwise to its add position, freeing the shaft 735 and the shaft 745 to the action of their springs 742 and 652 (Fig. 13), respectively. It is, therefore, necessary to provide other means to prevent restoring movement of the arms 545 and the non-repeat pawl 741 to provide for continuous operation of the machine at the end of the second cycle, and through the third cycle of operation, necessary on a transfer total operation.

The clockwise rotation of the cam 618, it will be remembered, early in the first cycle of operation, actuates the total control lever differential arm 635 to adjust the total control lever 646 (Fig. 12) to the non-add position, and then near the end of the first cycle rocks the differential arm 635 further to adjust the total control lever to the reset position. Movement of the total control lever to the reset position through engagement of the arm 668 of the total lever with the roller 732 on the lever 734, rocks this lever and the shaft 735 clockwise, and by engagement of the stud 749 on the arm 668 with the end 750 of the arm 751, rocks the shaft 745 counter-clockwise.

The clockwise movement of the shaft 735 rocks the lever 743 (Figs. 13 and 21) clockwise to remove a hooked arm 785 thereof against the tension of the spring 742, out of the path of an ear 787 on the projection 784 of the lever 107.

The counter-clockwise movement of the shaft 745 rocks a hooked arm 788 of the bell crank 754 counter-clockwise against the tension of a spring 652, out of the path of the ear 787.

When, near the end of the second cycle of operation, the cam 618 presents the recess in the periphery thereof, opposite the roller 783, the spring 769 acts to rock the transfer-total control lever 107 clockwise positioning the ear 765 between the ends 764 and 771 of the arms 642 and 772, respectively, and positions the ear 787 between the hooked arms 785 and 788 of the lever 743 and the bell crank 754 respectively.

The ear 787, therefore, holds the shaft 735, (Fig. 12), lever 737, and stud 736 in their moved positions, thus holding the non-repeat pawl 741 and release arm 545 in their moved positions to maintain the machine in released condition. The ear 787 also holds the shaft 745, yoke 553 and link 541 in its elevated position. Therefore as long as the ear 787 remains between the upper ends of the arms 785 and 788, the machine will continue to operate through a third cycle upon completion of the second cycle.

To reaccumulate the totals taken from the transaction totalizer selected under the control of the depressed transaction key 37 on the second cycle of the transfer total operation, it is necessary to restore the total control lever 646 to its add position, that is, it is necessary to position the totalizer engaging stud 127 (Fig. 12) in the notch 130 of the ear 131 on the adding-engaging arm 126 (Figs. 11 and 12) so that the totalizer will be engaged with the adding segments 68 at the proper time to accumulate the amount of the total thereon. This is accomplished, as above described, by the cam groove 619 (Figs. 13 and 14) driving the differential arm 635 and therethrough the total control lever 646.

However, in order to maintain the printer controls in the disabled position so that the reaccumulated total or total transferred to the grand totalizer will not be printed on a slip, to disable the consecutive number advancing means and further, to select a particular one of the detail hammers and the corresponding detail record strip advancing means for operation, the segment gear 680 is flexibly connected to the total control lever.

The partial gear 682 (Fig. 2), and cam 683 are held in their non-add position when the total control lever 646 is restored to its add position. This is done by a link 790, having one of its ends pivoted at 736 to the arm 737 of the lever 734, and having its other end bifurcated to embrace a stud 791 in the segment gear 680.

When the total lever 646 (Fig. 18) is adjusted to its totalizing position, it rocks the lever 734 clockwise, the arm 737 shoves the link 790 toward the right in the direction of its length to position the left-hand wall of the bifurcation in the correct position to stop the counter-clockwise movement of the segment gear 680 in the non-add position when the total control lever is restored to its add position at the end of the second cycle of a transfer total operation. When this occurs, that is, when the total control lever is restored to its add position, the stud 791 strikes the left-hand wall of the bifurcation in the link 790 and is arrested in the non-add position, thereby restraining the partial gear 682 and the cam 683 in their position wherein they are effective to continue the disabled condition of the several parts in the printing mechanism controlled thereby.

The total key 41 is released at the end of the second cycle of a transfer total operation, and is immediately restored to its undepressed position by its spring 586. The spring 595 at once rocks the lever 593 counter-clockwise to lower the link 596, placing the foot 605 thereof in the path of the tail of the coupling dog 606. On the third cycle the gear 617 and cam groove 619 are therefore inactive.

At the end of the second cycle of a three-cycle or transfer total taking operation the stud 124 (Fig. 14) on the latch member 633 on its restoring movement picks up the finger 730 on the arm 731 and rocks the lever 583 counter-clockwise to disengage the shoulder on the projection 581 from the key pin 580 on the total key 41, which is immediately restored to its normal outward position by its spring 586. The restoring spring 654 urges the lever 761 clockwise to its normal position, the spring 654, however, being restrained against rocking the lever 761 by the control arm 642, the end 764 of which at this time rests on top of the ear 765 of the arm 766, thereby preventing the restoring movement of this arm and of the lever 761.

As stated above, the amount added into the totalizer under the control of the amount keys 36 is set on the indicators by the segments 90 (Fig. 2) which also remain in their adjusted positions at the end of the operation. This is also true when a total or sub-total is taken from the totalizer, that is, the segments 90 remain in the position to which they are set under the control of the totalizer wheels.

It is obvious, by inspection of Fig. 2, that with an amount set on the indicator 142 and the segment 90, that, if the machine is operated with the coupling pinions 86 maintained in mesh with the adding segments 68 and the segments 90, these two segments will be rocked clockwise under the influence of the spring 77 until stopped by a concentric clearance slot 792 in the gear 138 striking a stop rod 793 carried between the side frames 30 and 31 of the machine. This restores the segment 90 to its normal position and under the control of the gear 138 and stop rod 793, the distance moved from the position to which it was set to its normal position being equal in steps of movement to the amount set thereon under the control of the totalizer wheel 111 on the preceding total taking operation. Likewise, this clockwise movement of the setting segment 90, as just described, through the coupling pinion 86 sets the adding segment 68 a like distance in a clockwise direction.

After the adding segment 68 is so positioned, the totalizer is rocked into engagement therewith as on adding operations, and the rod 75 is then moved counter-clockwise to its normal position, restoring the adding segment 68 to its normal position and again setting the segment 90 to the position it occupied at the beginning of the operation, at the same time adding the amount on the engaged totalizer.

Reference to the above-mentioned William H. Robertson patents Nos. 1,924,290 and 1,929,652, issued August 29, 1933, and October 10, 1933, respectively, discloses the above described method of performing a repeat operation. However, in the Robertson patents just mentioned, the mechanism is controlled to make a repeat operation by depression of a repeat key. In the present application all of the functions of this repeat key are taken care of automatically.

One of the functions of the total transfer lever 107 is to disable the coupling pinion operating means. It will be recalled that the coupling pinion shaft 89 (Fig. 21) is rocked by a link 101 connecting the arm 102, free on the shaft 100 and the arm 103 fast on the coupling pinion shaft 89. The stud 104 on the link 105 normally couples the arm 102 to its drive arm 109 fast on the shaft 100 rocked under the influence of the cam race 91 in the cam 92 (Fig. 12).

When, near the end of the second cycle of the transfer total operation the recess in the periphery of the cam 618 (Fig. 13) on the side of the gear 617 arrives opposite the roller 783 on the arm 766 of the control lever 107, the spring 769 rocks the lever 107 clockwise to position the ear 765 on the arm 766 between the ends 764 and 771 of the arms 642 and 772, and the ear 787 between the arms 785 and 788. At this time the arm 106 of the lever 107 lowers the link 105, moving the coupling stud 104 out of the hooked end of the drive arm 109 into the lower end of the slot in the upper end of the arm 102. Now, on the third cycle of the transfer total operation the arm 109 rocks idly, and the stud 104 entering a slot (not shown) in the frame 31, holds the arm 102, link 101, arm 103 and the shaft 89 against movement in either direction, thereby holding the coupling pinions 86 in mesh with the adding segments 68 and the setting segments 90, throughout the third cycle of the transfer total operation.

Near the end of the operation a lobe 795 on the restoring cam 607 strikes a roller 796 on the arm 106 of the lever 107 and rocks the lever 107 counter-clockwise slightly past its normal position, to permit the spring 654 (Fig. 13) to rock the lever 761 clockwise to reposition the nose 764 of the arm 642 in the path of the ear 765.

The counter-clockwise movement of the lever 107 by the link 105 draws the stud 104 upwardly into the hooked end of the arm 109, thereby coupling the arms 102 and 109 together, so that on the next subsequent operation the arm 109 will function to rock the coupling pinions 86 out of mesh with the adding segments 68 and setting segments 90 in the normal manner.

As soon as the total key 41 (Fig. 13) is released and restored to its normal outward position, the spring 595 rocks the lever 593 counter-clockwise to its normal position, at the same time the stud 596 moving counter-clockwise in the cam slot 597 in the upper end of the control link 598 lowers this link to replace the foot 605 on the lower end thereof in the path of the tail on the driving dog 606, so that when the drive shaft 80 rotates on the third cycle of operation, the tail of the dog 606 wiping by the foot 605 rocks the dog free of the shoulder on the collar 612, thereby preventing further rotation of the control gear 617. As the gear 617 and the gear 613 meshing therewith arrive in their home position, the retaining pawl 616 drops into the notch 626 in the periphery of the flange 615 secured to the side of the gear 613, thereby retaining these gears in their home position.

As stated above, when the total key 38 is depressed, the disk 781 (Fig. 21) is adjusted to position the notched periphery opposite the stud 780. Therefore, even though the total control key 41 is depressed a transfer total operation cannot be obtained, because, when the stud 780 lies in the notch of disk 781, nose 771 maintains the transfer control bar 107 in the position shown in Fig. 21. As explained above, when the control arm 107 is thusly held no transfer operation is possible. Thus, it follows that only the keys 37 control the machine to perform a transfer total operation.

Automatic selection of grand totalizer

The totalizer, from which the total is to be taken on the second cycle of the three-cycle or transfer total operation, is selected in the usual manner under the control of the particular transaction key 37 depressed. After the machine is released for the operation no other key in the transaction bank may be depressed. Likewise, the depressed key may not be released during the operation of the machine, for which reason, and in order to reaccumulate the total taken on the second cycle thereon, other and automatic means is provided to select the grand totalizer on the third cycle of the transfer total taking operation.

This means comprise a hooked arm 797 (Figs. 3, 4 and 5) journaled on the shaft 735 and connected by a yoke 798 to an arm 799 also journaled on the shaft 735. A spring 800 (Figs. 5 and 8) normally presses a stud 801 in the arm 799 against the left-hand edge of the arm 737, as viewed in Fig. 5, in which position a stud 802 on the arm 799 is held just clear of the arcuate edge of a sector 803 projecting forwardly from the total control lever 646.

When the total control lever 646 is rocked to its non-add position at the beginning of the first cycle of a total or sub-total taking operation or a three-cycle operation, and then near the end of the first cycle is rocked to the "read" or "reset" position, the sector 803 is presented in the path of the stud 802, thereby restraining the yoked arms 797—799 against influence of the spring 800 when the edge of the arm 668 of the total control lever, contacting the roller 732 on the arm 733, rocks the lever 734 clockwise.

Near the end of the second cycle of a transfer total or three-cycle operation when the total control lever 646 is restored counter-clockwise to its normal position, it will be remembered that the shaft 735 and lever 734 are held against counter-clockwise movement to normal position by the hooked arm 785 (Figs. 13 and 21), pressing against the ear 787 of the projection 784 on the arm 766 under the influence of the spring 742. As soon, then, as the sector 803 (Fig. 5), when the total control lever 646 is rocked counter-clockwise to its add position, clears the stud 802, the spring 800 rocks the yoked arms 799 and 797 (Fig. 4), clockwise to position the hook on the arm 797 in the path of a stud 804 projecting laterally from the latch arm 160. When the differential arm 162 commences its upward movement at the beginning of the third cycle of operation, the stud 804 engages the hooked arm 797, and continued clockwise movement of the actuator 168 rocks the latch arm 160 counter-clockwise to disengage the ear 166 from the flange 167 on the actuator 168, thereby stopping the differential in the position corresponding to the total key 38 to automatically select the grand totalizer.

On transfer total operations, as on total and subtotal taking operations, it is desired to withdraw the stop bar 66 to prevent stopping the adding segment 68 under the control of any of the amount keys accidentally depressed prior to the operation. This is accomplished in the same manner as on sub-total and total taking operations, and was fully described above in connection with such operations.

This mechanism comprises the shaft 745, arms 744 and arms 747 (Fig. 2). The shaft 745, as above described, is rocked by the total control lever as it is moved to its total taking position, and which is held against restoring movement at the end of the second cycle of a transfer total operation by the arm 788 on the shaft 745 engaging the ear 787 which was previously moved in the path thereof. The adding segment 68 and setting segment 90 are now free to move under the control of the indicator setting gears 138 and 200, as above described, to set the adding segment 68 to a position corresponding in value to the amount taken from the totalizer on the second cycle of the transfer total operation.

Since the total control lever 646 was restored to its normal, or adding, position at the end of the second cycle of the transfer total taking operation, the totalizer will be engaged with the adding segments 68 at the timing for adding operations after they are set as above described, so that, when the universal rod 75 restores the adding segments 68 to their normal position, the amount of the total cleared from the selected transaction totalizer will be added onto the grand totalizer selected as above described. The amount of this total will also be reset on the indicators under the control of the setting segment 90, and through the coupling pinions 86, which it will be remembered are not disengaged from the segments 68 and 90 on the third cycle of the transfer total operation.

When the lever 107 (Fig. 13) is rocked counter-clockwise near the end of the third cycle, to restore it to its normal position, the ear 787 is removed from the bath of the curved arms 785 and 788 (Figs. 13 and 21), which immediately rock to their normal position under the influence of their springs 742 and 652, respectively. The counter-clockwise movement of the shaft 735 under the influence of this spring 742, rocks the lever 734 counter-clockwise, on which movement the arm 737 picks up the stud 801 (Fig. 5) and rocks the yoke arms 799 and 797 counter-clockwise, removing the hook on the arm 797 from the path of the stud 804, so that the latch 160 may now be operated under the control of the transaction keys 37 or 38.

Also, the counter-clockwise movement of the lever 734 (Fig. 18) withdraws the link 790 toward the left, as viewed in this figure, removing the end of the slot therein from the stud 791, to permit the spring 681 to rock the segment gear 680 counter-clockwise until it is arrested by the stud 679 in the total control lever 646.

The counter-clockwise movement of the segment gear 680 rocks the partial gear 682 and the cam 683 clockwise to their normal position restoring the printer controls to their normal positions.

The counter-clockwise movement of the arm 737 also withdraws the stud 736 (Fig. 12) from between the tail 740 of the non-repeat pawl 741 and the hook 738 of the release arm 545, to permit these members to assume their normal position.

*Non-add operation*

The non-add key 39 is provided so that when a customer sends a batch of telegrams, the total charge may be entered at the time of the transaction, and then later, when time permits, the clerk may certify the telegrams. It is during this certification of the telegrams that the non-add key 39 is used, in order to prevent entering duplicate charges for the telegrams in the machine.

It can be seen from the above description that the total control lever is automatically moved to its non-add position on the first cycle of the sub-total, total and transfer total taking operations. With the total control lever in its non-add position the totalizer does not engage with the actuators, and therefore, any amount which may be set up on the keyboard will not be added into the totalizer.

It is also desired to move the total control lever 646 to its non-add position manually so that the machine may be controlled to make a non-add operation comprising a single cycle.

Depression of the non-add key 39 (Fig. 9) rocks the non-add lever 657 counter-clockwise against the tension of its restoring spring 810, raising the hooked rear end of the rearwardly extending arm 656 of the non-add lever. The upward movement of the rearwardly extending arm 656 of the non-add key lever 657 carries the stud 647 therewith in the cam slot 659, thereby camming the arm 660 counter-clockwise, the link 648 pivoting on the arm 649, which at this time is held against movement by the differential arm 635 (Fig. 13). The arm 660 through the shaft 661 and arm 666 rocks the total control lever 646 clockwise to its non-add position.

This clockwise movement of the total control lever to its non-add position in the above described manner sets the stud 127 (Fig. 12) on the totalizer engaging link 128 between the ear 131 on the adding-engaging arm 126 and the ear 672 on the sub-total engaging arm 219.

The counter-clockwise movement of the non-add key lever upon depression of the non-add key is limited by the stud 647 striking the upper end of the slot 659 in the arm 660 (Fig. 9). When the non-add key lever 657 arrives in this position, a spring 811 (Fig. 9) rocks a detent arm 812 journaled on a stud 813 projecting from the left side frame 31 of the machine, counter-clockwise to hook a shoulder 814 thereon over a stud 815 on the arm 658 of the non-add key 657 to retain the non-add key lever in its depressed position during the no-add operation. The stud 815 projects through a clearance slot in the frame 31, the detent arm 812 being located on the opposite side of the frame from the non-add key.

During the non-add operation of the machine the adding segments 68 are differentially positioned under the control of their respective amount keys 36, as on adding operations, and the setting segment 179 for the transaction bank (Fig. 3) is differentially positioned under the control of the transaction key 37 to select the totalizer, which totalizer, however, is not engaged with the adding segment 68. The amount represented by the depressed amount keys, therefore, will not be accumulated on the totalizer.

The printing mechanism functions the same as on the first cycle of total and sub-total taking operations. That is, the slip printing mechanism is entirely disabled on such an operation. The amount and transaction set up on the keyboard are printed on the detail strip selected under the control of the particular transaction key 37 depressed.

The non-add key is released at the end of a non-add operation by the same mechanism (Fig. 9) that releases the depressed amount keys.

It will be recalled that near the end of the operation the cam 220 (Fig. 9) shoves the pitman 222 toward the left to rock the arm 223 counter-clockwise and the arm 252 clockwise to release the depressed amount keys. On its clockwise movement of the arm 252, a stud 301 thereon, projecting through a clearance slot in the frame 31, strikes a tail 816 of the detent arm 812, rocking this arm clockwise against the tension of its spring 811 to unhook the shoulder 812 from the stud 815, thereby releasing the non-add key lever 816 to the action of a spring 810, which immediately rocks the lever clockwise to its normal position. The rearwardly extending arm 656 thereof carries the stud 647 to the bottom of the slot 659 in the arm 660, rocking this arm clockwise to restore the total control lever 646 counter-clockwise to its normal position. This, as above described, restores the totalizer engaging stud 127 (Fig. 12) on the totalizer engaging link 128, to its position in the notch 130 in the ear 131 of the totalizer adding-engaging arm 126.

*Printer control by non-add key*

When the machine is operated under the control of the non-add key 39, as above described, it is desired to print the characters, representing the keys depressed, on the particular detail record strip selected under the control of the transaction key 37 depressed, but it is not desired to print on an inserted slip, nor is it desirable to advance the consecutive numbering devices on such operations. Mechanism is therefore provided under the control of the non-add key 39 to disable the slip printing hammers and to uncouple the consecutive number operating means from its driving means.

Depression of the non-add key 39 by a projection 853 on the rearwardly extending arm 656 being embraced by a slotted arm 854 fast on one end of a sleeve 755 surrounding the shaft 661, rocks the slotted arm 854 and said sleeve counter-clockwise. When the key 39 is fully depressed, a lip 756 on the slotted arm 854 rests against the projection 853 to prevent retrograde or clockwise rotation of the arm 854 and the sleeve 755. The sleeve 755 extends into the printer where an arm 757 (Fig. 37) is secured to a flange 758 on the sleeve.

Figure 20:
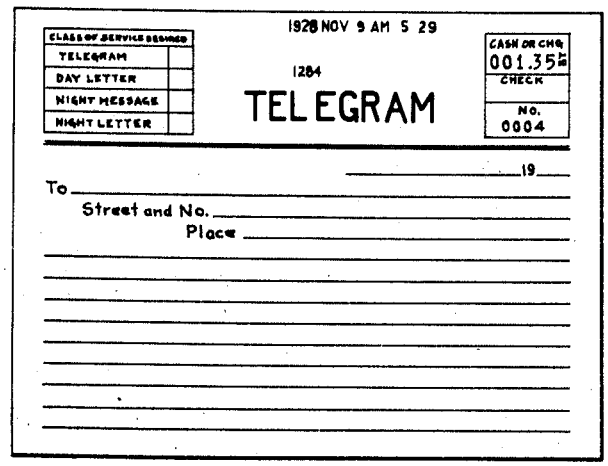
Fig. 20 is a facsimile of a conventional telegram blank form showing the position of the printed amount and other data, as printed by the machine of the present invention.

The counter-clockwise movement of the sleeve 755 (Fig. 37) by the arm 757 is transmitted by a connecting link 759 to the disk 687, previously described. This movement rocks the disk 687 clockwise, as viewed in Fig. 37, to cam the arm 690 and the shaft 691 clockwise, which, it will be recalled, uncouples the consecutive number drive link 271 (Fig. 36) from its cam arm 267, and tensions the spring 705 (Fig. 36) to disable the slip hammer operating lever 489—508 (Fig. 20).

In addition to controlling the printer as just described, the non-add key 39, when depressed, disables the detail hammer disabling means, which, as described above, is operated by movement of the total control lever 646 to the non-add position under the control of the non-add key, to prevent operation of the detail hammers on the first cycle of a multiple-cycle operation.

It will be recalled that movement of the total control lever 646 (Fig. 12) to its non-add position, through the segment gear 680, rocks the partial gear 682, cam 683 and disk 711 slightly counter-clockwise. This movement of the disk 711, by the stud 710 thereon, rocks the lever 713 (Fig. 36) clockwise to draw the lever 717 also clockwise, positioning the block 720 thereon in the path of travel of the stud 722 whereby the multiple-armed detail hammer operating lever 412 (Figs. 28 and 36) is restrained in its retracted position to disable the detail hammers.

Depression of the non-add key 39, however, removes the block 720 from the path of travel of the stud 722, thereby rendering the selected detail hammer effective and to feed the detail strip on non-add operations.

The disk 687 (Fig. 37) is fast on the end of a sleeve 775 surrounding the tubes 136, and having secured to its opposite end an arm 776 extending horizontally beneath a stud 777 projecting from the other arm 778 of the lever 717.

At the same time the non-add key 39, as it is depressed, rocks the lever 713 clockwise through the segment gear 680, partial gear 682 (Fig. 12), and the disk 711 (Figs. 12 and 36), to position the block 720 in the path of the stud 722, it also rocks the arm 776 clockwise through the projection 853 (Fig. 9), arm 754, sleeve 755, arm 757 (Fig. 37), link 759 and the sleeve 775. The arm 776 as it rotates clockwise picks up the stud 777 as said stud travels clockwise, and reverses the movement of the lever 717, restoring the lever 717 to its normal ineffective position with the block 720 out of the path of travel of the stud 722. The lever 713 continues in its clockwise travel to its non-add position merely stretching the spring 715 connecting the levers 713 and 717.

When the shoulder 423 (Fig. 28) on the cam 406 now passes the nose 424 on the hammer operating arm 408, the spring 421 is free to operate the selected detail hammer in the above described manner.

Near the end of the operation, when the non-add key is released, as above described, the spring 810 (Fig. 9) restoring the key lever 657 clockwise to normal position, rocks the slotted arm 854, sleeve 755 and arm 757 (Fig. 37) clockwise to normal, the link 759 rocking the disk 687, sleeve 775 and arm 776 counter-clockwise to normal position. At the same time the disk 711 is rocked clockwise, the restoring movement of the total control lever 646 rocks the lever 713 counter-clockwise, the stud 777 on the lever 717 follows the arm 776 until the stud 718 on the lever 713, picks up the lever 717 and restores it to normal position.

Conditioning key interlock

An interlock is provided between the non-add key and the sub-total and total keys 40 and 41, to prevent depression of the non-add key when either the sub-total key 40 or the total key 41 is depressed, and vice versa, to prevent depression of the sub-total or total key when the non-add key is depressed.

This interlock comprises a lever 675 (Fig. 9), journaled on a stud 676 in the side frame 31 of the machine, and having its upwardly extending arm 677 bifurcated to embrace a stud 678 projecting from the arm 587 (Fig. 21) of the lever 588. This lever is rocked counter-clockwise upon depression of either of the keys 40 or 41. The left-hand edge of the other arm 671 (Fig. 9), of the lever 675 is normally concentric to the rock shaft 65 on which the non-add key lever 657 is pivoted, and the stud 815, when the non-add key is depressed, wipes along the concentric edge of the arm 671, thereby preventing clockwise rotation of the lever 675, which, by the stud 678, prevents counter-clockwise movement of the lever 588. The arm 587 of the lever 588, lying in the path of the key pin 580 for the sub-total keys 40 and 41, locks these keys against depression until the non-add key is released and restored to its normal position. In this position the stud 815 lies opposite a recess 699 in the edge of the arm 671 of the lever 675.

If the key 40 or 41 is depressed first, that is, before the non-add key is depressed, its key pin 580 rocks the lever 588 counter-clockwise and, by the stud 678, rocks the lever 675 clockwise to engage the recess 699 with the stud 815 on the arm 658, thereby preventing depression of the non-add key until the particular conditioning key 40 or 41 is released and restored to its normal position. When the depressed conditioning key is released, spring 595 (Fig. 21) rocks the lever 593 counter-clockwise, and through the connection 590, rocks the lever 588 clockwise to normal. This rocks the lever 675 counter-clockwise, removing the recess 699 from engagement with the stud 815, thus freeing the non-add key for operation.

Provision is also made to prevent depression of the non-add key after the machine is released for operation and during the operation of the machine. A lever 700 (Fig. 9) journaled on the shaft 745, and having an arm 701 secured to the arm 552 supporting the bail 550, is rocked clockwise by the bail, when said bail is operated to lock the amount and transaction keys by the releasing slide 541 (Fig. 12). This clockwise movement of the lever 700 positions the end of an upwardly extending arm 702 thereof beneath, and in the path of travel, of a stud 703 on the arm 658 of the non-add key lever 657, thereby preventing depression of the non-add key until the bail 550 is rocked counter-clockwise near the end of the operation.

Means is provided to lock the total and sub-total keys 40 and 41 against manipulation during the operation of the machine. To this end a stud 725 on a curved arm 726 (Fig. 14) journaled on the shaft 745 and secured to the arm 701 of the lever 700, when the lever 700 is rocked clockwise by the bail 550, enters a slot 727 in the lower end of an arm 728 of the lever 583. This prevents movement of this lever to release the depressed key 40 to 41 and to prevent depression of either one of these keys until the bail 550 is restored counter-clockwise to its normal position near the end of the operation, thereby removing the stud 725 on the arm 726 from the slot 727 in the arm 728 of the three-armed lever 583.

Special counters

It is desirable in machines of this type that the proprietor know the number of times the machine has been operated to take a total or sub-total from the totalizer. In order that this information may be available to the proprietor, two counters 819 and 820 (Fig. 13) of the Veeder type, mounted in a bracket 821 secured to the frame 31, are operated by depression of the keys 40 and 41 respectively, to add one on the counter each time its respective key 40 or 41 is depressed.

A link 822 connects a crank arm 823 secured to the counter-shaft 824 of the Veeder counter 819 with an arm 825 of a bell crank 826 journaled on a stud 827 projecting from the left side frame 31 of the machine. The other arm 828 of the bell crank 826 is bifurcated to straddle the key pin 580 for the sub-total key 40.

Depression of this key 40 by the connection 580 rocks the bell crank 826 clockwise. This lowers the link 822 and actuates the counter 819 to advance this counter one step each time the sub-total key 40 is depressed.

Similarly, a link 829 (Fig. 13) connects a crank arm 830 secured to a counter-operating shaft 831 for the counter 820 with an arm 832 of a bell crank 833 journaled on the shaft 735. The other arm 834 of the bell crank 833 is bifurcated at its upper end and straddles a stud 835 in a projection 836 of the arm 760, which, it will be recalled, is rocked counter-clockwise by depression of the total key 41. The counter-clockwise movement of the arm 760 of the lever 761, through the stud 835, rocks the bell crank 833 clockwise to lower the link 829, thereby rocking the crank 830 and shaft 831 to advance the counter 820 one step at each operation of the key 41.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new, is:

1. In a machine of the class described; the combination with a plurality of keys; and a plurality of totalizers; of a conditioning element; means to set the conditioning element differentially to control the machine to make operations of a varying number of cycles; means under the control of the keys to select any one of the totalizers on one of the cycles; and means under the control of the conditioning means to select a particular totalizer on another of the cycles.

2. In a machine of the class described; the combination with a plurality of totalizers; of a conditioning element; means to set the conditioning element differentially to control the machine to make operations of a varying number of cycles; means to select any one of the totalizers on one of the cycles; means to reset the selected totalizer to zero; means under the control of the conditioning element to select a particular one of the totalizers on another cycle; and means to control an element of the resetting means to reaccumulate the total standing on the first selected totalizer, on the second selected totalizer at one continuous automatic operation of the machine.

3. In a machine of the class described; the combination with a plurality of totalizers; of a conditioning element; means to set the conditioning element differentially to control the machine to make operations of a varying number of cycles; means to select a totalizer; means to control the selecting means on one of the cycles; and means operable by the conditioning element to control the selecting means on another of the cycles.

4. In a machine of the class described; the combination with a plurality of totalizers; and a conditioning element; of means to set the conditioning element differentially to control the machine to make operations of a varying number of cycles; means to select a totalizer; manipulative devices to control the selecting means on one of the the cycles; and automatic means to control the selecting means to select a particular one of the totalizers on another of the cycles.

5. In a machine of the class described; the combination with a plurality of totalizers; differential means to select the totalizers; and a conditioning element; of differential means to set the conditioning element to control the machine to make operations of a plurality of cycles; manipulative devices to control the differential means to select a totalizer; and means operable under the control of the manipulative devices to control the machine to make an additional cycle, said additional cycle being continuous with the first-mentioned cycles.

6. In a machine of the class described; the combination with a conditioning element; of differential means to set the conditioning element to control the machine to make operations of a plurality of cycles, manipulative devices to control the conditioning element differential; means to control the machine to make an additional cycle, said additional cycle being continuous with the first mentioned cycles, and manipulative devices to control the last named means.

7. In a machine of the class described; the combination of a conditioning element; differential means to set the conditioning element to control the machine to make operations of a plurality of cycles; and means to control the machine to make an additional cycle, said additional cycle being continuous with the first mentioned cycles.

8. In a machine of the class described; the combination with a conditioning member having a plurality of positions to control the machine to make different kinds of operations; of a differential to set the conditioning member; manipulative devices to control the extent of movement of the differential; means to operate the differential; normally inactive means to drive the operating means; and means operated by the manipulative devices to render the driving means active.

9. In a machine of the class described; the combination with a conditioning member having a plurality of positions to control the machine to make adding and totalizing operations; a differential to set the conditioning member; and manipulative devices to determine the position to which the control member is to be set; of normally inactive means to operate the differential; means under the control of the manipulative devices to render the operating means active; an element normally ineffective to control the machine to make an adding operation following and continuous with a totalizing operation; and means under the control of certain of the manipulative devices to render the control element effective.

10. In a machine of the class described; the combination with totalizer selecting keys; a conditioning member to control the machine to make adding and totalizing operations; means to set the conditioning member; and manipulative devices to control the setting of the conditioning member; of a control element normally ineffective to control the machine to make an adding operation following and continuous with a totalizing operation; means under the control of certain of the totalizer selecting keys to restrain the control element; and means under the control of the manipulative devices to restrain the control element.

11. In a machine of the class described; the combination with a conditioning member having a plurality of positions to control the machine to make adding and totalizing operations; a differential to set the conditioning member; and manipulative devices to determine the position to which the conditioning member is to be set; of an element normally ineffective to control the machine to make an adding operation following and continuous with a totalizing operation; and means under the control of the conditioning means to restrain the control element in its ineffective position.

12. In a machine of the class described; the combination with a conditioning member having a plurality of positions to control the machine to make adding and totalizing operations; a differential means to set the conditioning member; and manipulative devices to control the setting means; of normally inactive means to operate the setting means; means under the control of the manipulative devices to render the operating means active; an element normally ineffective to determine that the machine is to make an adding operation following and continuous with a totalizing operation; a plurality of means to restrain the control element in ineffective position; means to remove the restraining means; and means on the operating means to determine the time when the control element is to become effective.

13. In a machine of the class described; the combination with a plurality of totalizers; actuators for the totalizers; and manipulative devices to select the totalizers; of a key controlled differentially set means to condition the machine for adding or resetting operations; and means to control the machine to make an adding cycle of operation following and continuous with a plurality of resetting cycles of operation to reaccumulate the total taken from the reset totalizer into another totalizer.

14. In a machine of the class described; the combination with a plurality of totalizers; actuators for the totalizers; and a plurality of keys to select the totalizers; of differentially set means to condition the machine for adding or totalizing operations; means under the control of the selecting keys to cause the machine to make an adding operation following and continuous with a totalizing operation; means to control the actuators to add the amount taken from the totalizer reset to zero at the totalizing operation into a particular one of the totalizers; and automatic means to select the totalizer to receive said total.

15. In a machine of the class described; the combination with a plurality of totalizers; and actuators for the totalizers; of differentially set means to condition the machine for adding and resetting operations; means operable during a resetting operation to control the machine to make an adding operation following and continuous with a resetting operation; and means operated by the control means to cause the actuators to reaccumulate on a particular totalizer the amount taken from the totalizer during said resetting operation.

16. In a machine of the class described; the combination with a conditioning lever having an adding position and a resetting position; of members normally ineffective to control the machine to make an adding operation following and continuous with a resetting operation; an arm to normally restrain the control members in ineffective position; means actuated by the conditioning lever to render the arm ineffective to restrain the control members; a spring to move the control members to effective position; and key controlled means to determine the effectiveness by the control members.

17. In a machine of the class described; the combination with a conditioning lever having an adding position and a resetting position; of a control member to control the machine to make an additional operation following and continuous with a resetting operation; and differential means to set the conditioning lever to its resetting position on resetting operations and to its adding position on said additional operation.

18. In a machine of the class described; the combination with a conditioning lever having an adding position and a resetting position; and key controlled means to set the conditioning lever; of a control member to control the machine to make an operation following a resetting operation; and means to cause said operation to be continuous with the resetting operation.

19. In a machine of the class described; the combination with a conditioning lever having an adding position and a resetting position; of a control member to control the machine to make an additional operation following a resetting operation; means to cause said additional operation to be continuous with the resetting operation; manipulative devices to determine the position to which the conditioning lever is to be set on the resetting operation; and automatic means to control the setting of the conditioning lever on the additional operation.

20. In a machine of the class described; the combination with a conditioning lever having an adding position and a resetting position; of a control member to control the machine to make an additional operation following a resetting operation; means to cause the additional operation to be continuous with the resetting operation; manipulative devices to control the setting of the conditioning lever to the resetting position on resetting operations; and automatic means to cause the conditioning lever to be set at its adding position on the additional operation.

21. In a machine of the class described; the combination with totalizers; actuators for the totalizers; and a plurality of means to engage the totalizers with the actuators; of a conditioning means to control the machine to make operations of a varying number of cycles; and means operated by the conditioning means to render all of said engaging means ineffective on one cycle of operation, to select a certain one of the engaging means on another cycle of operation, and to select a second engaging means on a third cycle of operation.

22. In a machine of the class described; the combination with totalizers; manipulative devices; actuators for the totalizers; and a plurality of differently timed means to engage the totalizers with the actuators; of a differentially set conditioning element to control the machine to make a plurality of kinds of operations; means normally inactive to set the conditioning element; and means under the control of the manipulative devices to render the setting means active to set the conditioning element to determine which one of the engaging means is to engage the totalizers.

23. In a machine of the class described; the combination with totalizers; and actuators for the totalizers; of a plurality of arms to engage the totalizers with the actuators, each of said arms being provided with a recess; a pivoted link having a projection thereon; a conditioning element to control the machine to make operations of a varying number of cycles; a differential means to set the conditioning element; and means operated by the conditioning element to rock the link to enter the projection in the recess in a particular one of the totalizer engaging arms.

24. In a machine of the class described; the combination with totalizers; actuators for the totalizers; and a plurality of recessed arms to engage the totalizers with the actuators; a pivoted link having a projection thereon; a conditioning element to control the machine to make operations of a varying number of cycles; and a lever operated by the conditioning element to rock the link to neutral position on one cycle of operation, and move the projection into the recess of a certain engaging arm on a second cycle of operation, and to move the projection into the recess of another engaging arm on a third cycle of operation, said cycles being a continuous operation of the machine.

25. In a machine of the class described, the combination with a plurality of totalizers; and a plurality of printing mechanisms; of means to reset any one of the totalizers to zero; means to select the totalizer to be reset to zero; means to print the total standing on the totalizer; means to select the printing mechanism to print the total; means to reaccumulate the total standing on the selected totalizer; automatic means to select the totalizer on which to reaccumulate the total; means to print the reaccumulated total; and means to select the printing means to print the reaccumulated total on a continuous automatic operation of the machine.

26. In a machine of the class described; the combination with a plurality of totalizers; and a conditioning element to control the machine to add amounts on the totalizers and to reset the totalizers to zero; of means to control the machine to make an additional operation following and continuous with a resetting operation; a potential repeat mechanism; and means to render the repeat mechanism effective on the additional operation to reaccumulate the total standing on the totalizer on the reset operation.

27. In a machine of the class described; the combination with a plurality of totalizers; and a conditioning element to control the machine to add amounts on the totalizers and to reset the totalizers to zero; of means to control the machine to make an additional operation following and continuous with resetting operations; a potential repeat mechanism; means to render the repeat mechanism effective on the additional operations to reaccumulate the total standing on the totalizer on the reset operation; a plurality of printing devices; means to disable all of the printing devices on a part of the reset operation; means to select one of the printing devices on another part of the resetting operation to print the total; and means to select a certain one of the printing devices on the additional operation to print the amount of the reaccumulated total.

28. In a machine of the class described; the combination with a plurality of totalizers; and a conditioning element to control the machine to make adding and resetting operations; of means to control the machine to automatically make an additional operation following and continuous with a resetting operation; a potential repeat mechanism; and means operated by the control means to cause the repeat mechanism to function on the additional operation to add the amount of the total, standing on the totalizer at the reset operation; on a particular one of the totalizers in one continuous automatic operation of the machine.

29. In a machine of the class described; the combination with a conditioning element having a normal position and a plurality of positions to which it is adapted to be differentially set to control the machine to make operations of a varying number of cycles; and printing mechanism; of means operated by the conditioning element to disable the printing mechanism; means to restore the conditioning element to normal position; and means operated by the conditioning element to prevent restoration of the disabling means.

30. In a machine of the class described; the combination with a conditioning element to control the machine to make adding and totalizing operations; and means to automatically set the conditioning element; of means to control the machine to make an additional operation following and continuous with a totalizing operation; printing mechanism; printer disabling mechanism connected to the conditioning element, said connection being flexible in one direction; a projection on the conditioning element to operate the disabling mechanism when said conditioning element is moved to its totalizing position; means to restore the conditioning element; means set by this conditioning element as it is moved to totalizing position to restrain the disabling mechanism in its disabling position.

31. In a machine of the class described; the combination with a conditioning element having an adding position and a totalizing position; and means to automatically set the conditioning element to its totalizing position and to restore said element to its adding position; of means to control the machine to make an additional operation following and continuous with a totalizing operation; printer disabling mechanism connected to the conditioning element, said connection being flexible in one direction; a projection on the conditioning element to operate the disabling mechanism when the conditioning element is moved to its totalizing position; means operated by the conditioning element as said element is moved to totalizing position to restrain the disabling mechanism in its operated position; means to restore the restraining means; and means to delay the restoration of the restraining means.

32. In a machine of the class described; the combination with a conditioning element to control the machine to make adding and totalizing operations; and means to differentially set the conditioning element; a control member to control the machine to make an additional operation following and continuous with a totalizing operation; a potentially effective repeat mechanism; means on the control member to render the repeat mechanism effective on the additional operation; a printing mechanism; normally ineffective means operated by the conditioning element to disable the printing mechanism; means operated by the conditioning element to restrain the disabling mechanism in disabling position; and means on the control member to hold the restraining means in its restraining position.

33. In a machine of the class described; the combination with a plurality of totalizers; and a plurality of printing devices; of means to reset the totalizers to zero; means to select the totalizer to be reset to zero; means to print the total standing on the totalizers; means to select the printing mechanism to print the total; means to control the machine to reaccumulate the total standing on the selected totalizer; automatic means to select the totalizers on which to reaccumulate the total; means to select the printing device to print the reaccumulated total; and means to disable all of the printing devices on certain parts of the operation.

34. In a machine of the class described; the combination with a plurality of totalizers; and a plurality of printing devices; of means to reset the totalizers to zero; means to print the total standing on the totalizer; means to control the machine to reaccumulate the total; means to print the reaccumulated total; means to disable all of the printing devices; and selective means to render certain of the printing devices effective.

35. In a machine of the class described; the combination with a plurality of totalizers; and a plurality of printing devices; of means to control the machine to reset the totalizers to zero; means to control the machine to make an operation following and continuous with a resetting operation to reaccumulate the total standing on the totalizer; means to disable all of the printing means; means to select a certain printing means to print the total on the resetting operation; and means to select another of the printing means to print the reaccumulated total.

36. In a machine of the class described; the combination with a conditioning element having an adding position and a resetting position; a shaft; means operated by the conditioning element as said element is moved to its resetting position to rock the shaft; and means operated by the shaft to prepare the machine for resetting operations; of normally ineffective means to control the machine to make an operation following and continuous with a resetting operation; automatic means to move the control means to effective position; an arm on the shaft; and means on the control means to obstruct restoring movement of the arm and shaft.

37. In a machine of the class described; the combination with a plurality of totalizers; a conditioning element having an adding position and a resetting position; a pair of shafts; means carried by one of the shafts to prepare the machine to reset the totalizers to zero; means on the other shaft to cause the machine to make operations in two continuous cycles; and means operated by the conditioning element, when said element is moved to its resetting position to rock the shafts in opposite directions; of arms on the shafts, the ends of the arms normally overlapping and being adapted to be separated when the shafts rock; a normally ineffective lever to cause the machine automatically to make a third cycle of operation following and continuous with the resetting operation; and means on the lever to obstruct restoring movement of the shafts.

38. In a machine of the class described, the combination of a group of totalizers interspersed on a common support; total taking means; means to select the totalizers for total taking operations; a differential device; and means, controlled by the total taking means and cooperating with the differential device, to automatically select one of said totalizers for a transfer total operation.

39. In a machine of the class described, the combination of a group of totalizers interspersed on a common support; total taking means; means, including a differential device, to select the totalizers for total taking operations; and means cooperating with the differential device to control the totalizer selecting means for a transfer total operation following a total taking operation.

40. In a machine of the class described, the combination of a group of totalizers interspersed on a common support; total taking means; means to select totalizers for total taking operations; means to control the totalizer selecting means for a transfer total operation following a total taking operation; and means, including a differential device cooperating with the total taking means, to condition the machine for said transfer total operation.

41. In a machine of the class described, in combination with a group of interspersed totalizers, of means to control the various functions of the machine, and means, including a differential device, cooperating with the controlling means, to cause a total to be transferred from one totalizer to another totalizer in a continuous operation of the machine.

42. In a machine of the class described, adapted to transfer totals in one continuous operation of the machine, the combination of a group of totalizers interspersed on a common axis; a total control device; a differential contrivance to variously position the total control device during a transfer total operation to condition the machine first for a total taking cycle and then for an adding cycle; means to select the totalizers for total taking in the total taking cycle; means to cause the total, so taken, to be transferred in the adding cycle; and means governed by the total control device and effective during the adding cycle to cause the selecting means to select one of the totalizers to receive the total obtained during the total taking cycle.

WILLIAM H. ROBERTSON.